(12) United States Patent
Yoshida et al.

(10) Patent No.: US 7,471,790 B2
(45) Date of Patent: Dec. 30, 2008

(54) ENCRYPTION METHOD, CRYPTOGRAM DECODING METHOD, ENCRYPTOR, CRYPTOGRAM DECODER, AND COMMUNICATION SYSTEM

(75) Inventors: Setsuo Yoshida, Kawasaki (JP); Osamu Hirota, Yokohama (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/439,367

(22) Filed: May 24, 2006

(65) Prior Publication Data
US 2007/0183593 A1     Aug. 9, 2007

(30) Foreign Application Priority Data
Oct. 31, 2005   (JP)   ............................. 2005-317823
Feb. 3, 2006    (JP)   ............................. 2006-027749

(51) Int. Cl.
*H04L 9/28* (2006.01)
*H04K 1/00* (2006.01)
(52) U.S. Cl. ......................................... 380/28; 380/44
(58) Field of Classification Search .................. 380/44, 380/28
See application file for complete search history.

(56) References Cited

U.S. PATENT DOCUMENTS

| | | | |
|---|---|---|---|
| 5,515,438 A * | 5/1996 | Bennett et al. ............... | 380/278 |
| 7,181,011 B2 * | 2/2007 | Trifonov ...................... | 380/256 |
| 2004/0032954 A1 * | 2/2004 | Bonfrate et al. .............. | 380/263 |
| 2004/0076295 A1 | 4/2004 | Kojima et al. ................ | 380/201 |
| 2004/0109564 A1 | 6/2004 | Cerf et al. .................... | 380/256 |
| 2005/0157875 A1 * | 7/2005 | Nishioka et al. .............. | 380/46 |
| 2005/0172129 A1 * | 8/2005 | Tajima et al. ................. | 713/171 |
| 2006/0083376 A1 * | 4/2006 | Kawamoto et al. .......... | 380/256 |
| 2007/0140495 A1 * | 6/2007 | Berzanskis et al. .......... | 380/278 |

FOREIGN PATENT DOCUMENTS

| | | |
|---|---|---|
| EP | 0 877 508 A1 | 11/1998 |
| EP | 1 653 654 A1 | 5/2006 |

OTHER PUBLICATIONS

Menezes, Alfred et al., "Handbook of Applied Cryptography", 1997 CRC Press, pp. 171-172.*

(Continued)

*Primary Examiner*—Matthew B Smithers
*Assistant Examiner*—Michael Pyzocha
(74) *Attorney, Agent, or Firm*—Hanify & King, P.C.

(57) ABSTRACT

An encryption technique having a greater encryption strength than conventional mathematical encryption by using classic physical random numbers etc., including a step for modulating one-bit input data into a coded signal by associating it with a discrete value of at least two bits determined by pseudo random numbers and physical random numbers and a step for channel-coding and outputting the coded signal, wherein 1) the coded signal can be demodulated into the input data by the pseudo random number, 2) the number of sets of input data, pseudo random number, and physical random number corresponding to a particular discrete value is equal for two values of the input data, and 3) the number of sets of pseudo random number and physical random number corresponding to respective values of the input data and respective values of the discrete value is equally associated also with any set of them.

24 Claims, 36 Drawing Sheets

OTHER PUBLICATIONS

Extended European search report, Jun. 13, 2007, Application No. 06011085.5-2415, Reference No. 115 496 a/lga, 7 pgs.

H.P. Yuen "KCQ: A New Approach to Quantum Cryptography" quant-ph/0311061 v6, Jul. 30, 2006.

O. Hirota, et al. "Quantum Stream Cipher Based on Optical Communications" Quantum Communications and Quantum Imaging II, Proc. Of SPIE, vol. 5551, pp. 206-219.

T. Tsuchimoto, et al. "Property of Optimum Quantum Detection for Mixed-States by DSR" The 27th Symposium on Information Theory and Its Applications (SITA2004), vol. 1, pp. 359-362 (English Translation).

Extended European Search report, Jun. 13, 2007, Reference 115 496 a/lga; Application No. 06011085.5-2415, (7-pages).

* cited by examiner

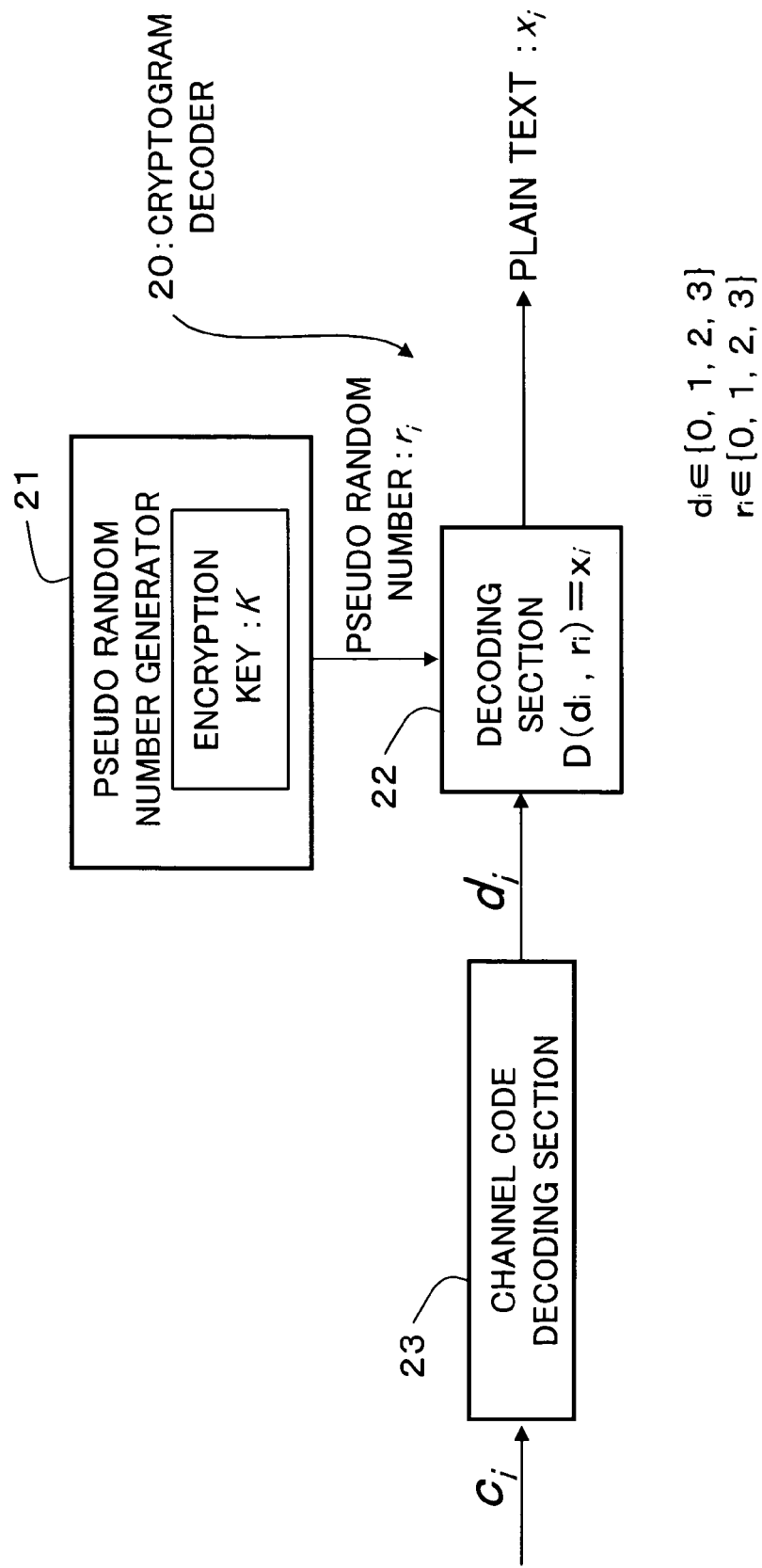

FIG. 3

2-2-2 TYPE ENCODE TABLE

| PLAIN TEXT $x_i$ | PSEUDO RANDOM NUMBER $r_i$ | PHYSICAL RANDOM NUMBER $f_i$ | EXAMPLE (1) OUTPUT $s_i$ | EXAMPLE (2) OUTPUT $s_i$ | EXAMPLE (3) OUTPUT $s_i$ |
|---|---|---|---|---|---|
| 0 | 0 | 0 | 0 | 0 | 1 |
|   |   | 1 | 1 | 1 | 1 |
|   | 1 | 0 |   |   |   |
|   |   | 1 |   |   |   |
| 1 | 0 | 0 | 1 | 0 |   |
|   |   | 1 | 0 | 1 |   |
|   | 1 | 0 |   |   |   |
|   |   | 1 |   |   |   |

IT IS IMPOSSIBLE TO DECODE ONLY WITH PSEUDO RANDOM NUMBER (Examples 1, 2)

KNOWN PLAIN TEXT ATTACK DETERMINES PSEUDO RANDOM NUMBER UNIQUELY. PHYSICAL RANDOM NUMBER DOES NOT FUNCTION. (Example 3)

2-2-4 TYPE ENCODE TABLE

| PLAIN TEXT $x_i$ | PSEUDO RANDOM NUMBER $r_i$ | PHYSICAL RANDOM NUMBER $f_i$ | EXAMPLE (1) OUTPUT $s_i$ | EXAMPLE (2) OUTPUT $s_i$ | EXAMPLE (3) OUTPUT $s_i$ | EXAMPLE (4) OUTPUT $s_i$ | EXAMPLE (5) OUTPUT $s_i$ |
|---|---|---|---|---|---|---|---|
| 0 | 0 | 0 | 0 | 0 | 1 | 0 | 0 |
|  | 0 | 1 | 1 | 1 |   | 1 | 1 |
|  | 1 | 0 |   |   |   | 2 | 0 |
|  | 1 | 1 |   |   |   | 3 | 1 |
| 1 | 0 | 0 | 1 | 0 | 1 |   | 2 |
|  | 0 | 1 | 0 | 1 |   |   | 3 |
|  | 1 | 0 |   |   |   |   | 2 |
|  | 1 | 1 |   |   |   |   | 3 |

| IT IS IMPOSSIBLE TO DECODE ONLY WITH PSEUDO RANDOM NUMBER | KNOWN PLAIN TEXT ATTACK DETERMINES PSEUDO RANDOM NUMBER UNIQUELY. PHYSICAL RANDOM NUMBER DOES NOT FUNCTION | KNOWN PLAIN TEXT ATTACK DETERMINES PSEUDO RANDOM NUMBER UNIQUELY. | PLAIN TEXT COINCIDES WITH CIPHER TEXT. |
|---|---|---|---|

4-2-4 TYPE ENCODE TABLE

| PLAIN TEXT $x_i$ | PSEUDO RANDOM NUMBER $r_i$ | PHYSICAL RANDOM NUMBER $f_i$ | EXAMPLE (1) OUTPUT $s_i$ | EXAMPLE (2) OUTPUT $s_i$ | EXAMPLE (3) OUTPUT $s_i$ | EXAMPLE (4) OUTPUT $s_i$ | EXAMPLE (5) OUTPUT $s_i$ | EXAMPLE (6) OUTPUT $s_i$ | EXAMPLE (7) OUTPUT $s_i$ |
|---|---|---|---|---|---|---|---|---|---|
| 0 | 0 | 0 | 0 | 0 | 0 | 0 | 1 | 0 | 0 |
| 0 | 0 | 1 | 1 | 1 | 1 | 1 | 1 | 1 | 1 |
| 0 | 1 | 0 | 1 | 0 |   |   |   | 2 | 3 |
| 0 | 1 | 1 | 0 | 1 |   |   |   | 3 | 2 |
| 0 | 2 | 0 | 2 | 2 |   |   |   | 0 | 2 |
| 0 | 2 | 1 | 3 | 3 |   |   |   | 1 | 3 |
| 0 | 3 | 0 | 3 | 2 | 0 | 1 |   | 2 | 1 |
| 0 | 3 | 1 | 2 | 3 | 1 | 0 |   | 3 | 0 |
| 1 | 0 | 0 | 2 | 2 |   |   |   | 2 | 2 |
| 1 | 0 | 1 | 3 | 3 |   |   |   | 3 | 3 |
| 1 | 1 | 0 | 2 | 2 |   |   |   | 0 | 1 |
| 1 | 1 | 1 | 3 | 3 |   |   |   | 1 | 0 |
| 1 | 2 | 0 | 0 | 0 |   |   |   | 2 | 0 |
| 1 | 2 | 1 | 1 | 1 |   |   |   | 3 | 0 |
| 1 | 3 | 0 | 1 | 0 |   |   |   | 0 | 1 |
| 1 | 3 | 1 | 0 | 1 |   |   |   | 1 | 2 |

| (1) OK | (2) THERE IS SEEMINGLY CORRELATION BETWEEN OUTPUT AND PHYSICAL RANDOM NUMBER, HOWEVER, KNOWN PLAIN TEXT ATTACK CANNOT GUESS PSEUDO RANDOM NUMBER, THEREFORE, THIS IS OK. | (3)(4) IT IS IMPOSSIBLE TO DECODE ONLY WITH PSEUDO RANDOM NUMBER. | (5) KNOWN PLAIN TEXT ATTACK DETERMINES PSEUDO RANDOM NUMBER UNIQUELY. PHYSICAL RANDOM NUMBER DOES NOT FUNCTION | (6)(7) OK. AS TO CORRESPONDENCE RELATIONSHIP BETWEEN PSEUDO RANDOM NUMBER AND OUTPUT IN EXAMPLE (2), EQUIVALENT TO REPLACEMENT BETWEEN PSEUDO RANDOM NUMBERS 1 AND 2. |

| PLAIN TEXT $x_i$ | PSEUDO RANDOM NUMBER $r_i$ | PHYSICAL RANDOM NUMBER $f_i$ | OUTPUT $s_i$ |
|---|---|---|---|
| 0 | 0 | 0 | 0 |
| 0 | 0 | 1 | 1 |
| 0 | 1 | 0 | 1 |
| 0 | 1 | 1 | 0 |
| 0 | 2 | 0 | 2 |
| 0 | 2 | 1 | 3 |
| 0 | 3 | 0 | 3 |
| 0 | 3 | 1 | 2 |
| 1 | 0 | 0 | 2 |
| 1 | 0 | 1 | 3 |
| 1 | 1 | 0 | 3 |
| 1 | 1 | 1 | 2 |
| 1 | 2 | 0 | 0 |
| 1 | 2 | 1 | 1 |
| 1 | 3 | 0 | 1 |
| 1 | 3 | 1 | 0 |

| DECODED SIGNAL $d_i$ | PSEUDO RANDOM NUMBER $r_i$ | PLAIN TEXT $x_i$ |
|---|---|---|
| 0 | 0 | 0 |
| 0 | 1 | 0 |
| 0 | 2 | 1 |
| 0 | 3 | 1 |
| 1 | 0 | 0 |
| 1 | 1 | 0 |
| 1 | 2 | 1 |
| 1 | 3 | 1 |
| 2 | 0 | 1 |
| 2 | 1 | 1 |
| 2 | 2 | 0 |
| 2 | 3 | 0 |
| 3 | 0 | 1 |
| 3 | 1 | 1 |
| 3 | 2 | 0 |
| 3 | 3 | 0 |

FIG. 6(C)

| DECODED SIGNAL $d_i$ | PSEUDO RANDOM NUMBER $r_i$ | PLAIN TEXT $x_i$ |
|---|---|---|
| 00 | 00 | 0 |
| 00 | 01 | 0 |
| 00 | 10 | 1 |
| 00 | 11 | 1 |
| 01 | 00 | 0 |
| 01 | 01 | 0 |
| 01 | 10 | 1 |
| 01 | 11 | 1 |
| 10 | 00 | 1 |
| 10 | 01 | 1 |
| 10 | 10 | 0 |
| 10 | 11 | 0 |
| 11 | 00 | 1 |
| 11 | 01 | 1 |
| 11 | 10 | 0 |
| 11 | 11 | 0 |

FIG. 7(A)

| PLAIN TEXT $x_i$ | PSEUDO RANDOM NUMBER $r_i$ | PHYSICAL RANDOM NUMBER $f_i$ | OUTPUT $s_i$ |
|---|---|---|---|
| 0 | 0 | 0 | 0 |
|   |   | 1 | 1 |
|   | 1 | 0 | 3 |
|   |   | 1 | 2 |
|   | 2 | 0 | 2 |
|   |   | 1 | 3 |
|   | 3 | 0 | 1 |
|   |   | 1 | 0 |
| 1 | 0 | 0 | 2 |
|   |   | 1 | 3 |
|   | 1 | 0 | 1 |
|   |   | 1 | 0 |
|   | 2 | 0 | 0 |
|   |   | 1 | 1 |
|   | 3 | 0 | 3 |
|   |   | 1 | 2 |

FIG. 7(B)

| DECODED SIGNAL $d_i$ | PSEUDO RANDOM NUMBER $r_i$ | PLAIN TEXT $x_i$ |
|---|---|---|
| 0 | 0 | 0 |
|   | 3 | 1 |
|   | 2 | 0 |
|   | 1 | 1 |
| 1 | 0 | 1 |
|   | 3 | 0 |
|   | 2 | 1 |
|   | 1 | 0 |
| 2 | 0 | 1 |
|   | 3 | 0 |
|   | 2 | 1 |
|   | 1 | 0 |
| 3 | 0 | 1 |
|   | 3 | 0 |
|   | 2 | 1 |
|   | 1 | 0 |

FIG. 7(C)

| DECODED SIGNAL $d_i$ | PSEUDO RANDOM NUMBER $r_i$ | PLAIN TEXT $x_i$ |
|---|---|---|
| 00 | 00 | 0 |
|    | 11 | 1 |
|    | 10 | 0 |
|    | 01 | 1 |
| 01 | 00 | 1 |
|    | 11 | 0 |
|    | 10 | 1 |
|    | 01 | 0 |
| 10 | 00 | 1 |
|    | 11 | 0 |
|    | 10 | 1 |
|    | 01 | 0 |
| 11 | 00 | 1 |
|    | 11 | 0 |
|    | 10 | 1 |
|    | 01 | 0 |

FIG. 10

8-2-4 TYPE ENCODE TABLE

EXAMPLE (1)

| PLAIN TEXT $x_i$ | PSEUDO RANDOM NUMBER $r_i$ | PHYSICAL RANDOM NUMBER $f_i$ | OUTPUT $s_i$ |
|---|---|---|---|
| 0 | 0 | 0 | 0 |
| 0 | 0 | 1 | 1 |
| 0 | 1 | 0 | 1 |
| 0 | 1 | 1 | 0 |
| 0 | 2 | 0 | 0 |
| 0 | 2 | 1 | 1 |
| 0 | 3 | 0 | 1 |
| 0 | 3 | 1 | 0 |
| 0 | 4 | 0 | 2 |
| 0 | 4 | 1 | 3 |
| 0 | 5 | 0 | 3 |
| 0 | 5 | 1 | 2 |
| 0 | 6 | 0 | 2 |
| 0 | 6 | 1 | 3 |
| 0 | 7 | 0 | 3 |
| 0 | 7 | 1 | 2 |
| 1 | 0 | 0 | 2 |
| 1 | 0 | 1 | 3 |
| 1 | 1 | 0 | 3 |
| 1 | 1 | 1 | 2 |
| 1 | 2 | 0 | 2 |
| 1 | 2 | 1 | 3 |
| 1 | 3 | 0 | 3 |
| 1 | 3 | 1 | 2 |
| 1 | 4 | 0 | 0 |
| 1 | 4 | 1 | 1 |
| 1 | 5 | 0 | 1 |
| 1 | 5 | 1 | 0 |
| 1 | 6 | 0 | 0 |
| 1 | 6 | 1 | 1 |
| 1 | 7 | 0 | 1 |
| 1 | 7 | 1 | 0 |

| SLOT NUMBER | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| PSEUDO RANDOM NUMBER $r''_i$ | 0 1 1 | | | | | | | | 1 0 1 | | | | | | | |
| PSEUDO RANDOM NUMBER $r_i$ | | | | 1 1 | | 0 1 | | | | | | | | | | |
| PHYSICAL RANDOM NUMBER $f_i$ | | | | 1 | | | | | | | | | | 0 | | |
| PSEUDO RANDOM NUMBER $r'_i$ | 1 | 0 | 0 | 0 | | | | | 0 | 1 | 1 | 0 | 0 | | | |
| PLAIN TEXT $x_i$ | 0 | 1 | 0 | 0 | 1 | 1 | 0 | 1 | 1 | 0 | 1 | 1 | 0 | 1 | 0 | 0 |
| OUTPUT $s_i$ | 1 | 1 | 0 | 0 | 1 | 0 | 1 | 1 | 1 | 1 | 0 | 1 | 0 | 1 | 0 | 1 |

FIG. 16

| SLOT NUMBER | 0 | | | | | | | | 1 | | | | | | | |
|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 |
| PSEUDO RANDOM NUMBER R$_i$ | 0 | 1 | 1 | 1 | 1 | 1 | 0 | 0 | 1 | 1 | 0 | 1 | | | | |
| | 1 | 0 | 1 | 0 | 1 | 0 | 1 | 1 | 0 | 0 | 0 | 1 | | | | |
| THREE BITS FROM THE FIRST BIT TO THE THIRD BIT FROM THE TOP OF PSEUDO RANDOM NUMBER R$_i$ | 0 | 1 | 1 | | | | | | 1 | 0 | 1 | | | | | |
| TWO BITS FROM THE FOURTH BIT TO THE FIFTH BIT FROM THE TOP OF PSEUDO RANDOM NUMBER R$_i$ | | | | 1 | 1 | | | | | | | 0 | 1 | | | |
| PHYSICAL RANDOM NUMBER f$_i$ | | | | 1 | | | | | | | | 0 | | | | |
| SEVEN BITS FROM THE SIXTH BIT TO THE LOWEST BIT FROM TOP OF PSEUDO RANDOM NUMBER R$_i$ | 1 | 0 | 0 | 0 | 1 | 1 | 0 | 1 | 0 | 1 | 1 | 0 | 0 | 1 | 0 | 1 |
| PLAIN TEXT x$_i$ | 0 | 1 | 0 | 0 | 0 | 1 | 0 | 1 | 1 | 0 | 1 | 1 | 0 | 1 | 0 | 0 |
| OUTPUT s$_i$ | 1 | 1 | 0 | 0 | 1 | 0 | 1 | 1 | 1 | 1 | 0 | 1 | 0 | 0 | 0 | 1 |

FIG. 20

| PLAIN TEXT $x_i$ | PSEUDO RANDOM NUMBER $r_i$ | PHYSICAL RANDOM NUMBER $f_i$ | TYPICAL ELEMENT 1 OUTPUT $s_i$ | TYPICAL ELEMENT 2 OUTPUT $s_i$ | TYPICAL ELEMENT 3 OUTPUT $s_i$ | TYPICAL ELEMENT 4 OUTPUT $s_i$ | TYPICAL ELEMENT 5 OUTPUT $s_i$ | TYPICAL ELEMENT 6 OUTPUT $s_i$ |
|---|---|---|---|---|---|---|---|---|
| 0 | 0 | 0 | 0 | 0 | 0 | 0 | 0 | 0 |
|   |   | 1 | 1 | 1 | 1 | 2 | 2 | 3 |
|   | 1 | 0 | 0 | 0 | 0 | 0 | 0 | 0 |
|   |   | 1 | 1 | 2 | 3 | 2 | 3 | 3 |
|   | 2 | 0 | 2 | 1 | 1 | 1 | 1 | 1 |
|   |   | 1 | 3 | 3 | 2 | 3 | 2 | 2 |
|   | 3 | 0 | 2 | 2 | 3 | 1 | 3 | 1 |
|   |   | 1 | 3 | 3 | 2 | 3 | 3 | 2 |
| 1 | 0 | 0 | 2 | 1 | 1 | 1 | 1 | 1 |
|   |   | 1 | 3 | 3 | 2 | 3 | 3 | 2 |
|   | 1 | 0 | 0 | 0 | 0 | 0 | 0 | 0 |
|   |   | 1 | 1 | 2 | 3 | 2 | 3 | 3 |
|   | 2 | 0 | 0 | 0 | 0 | 0 | 0 | 0 |
|   |   | 1 | 1 | 1 | 1 | 2 | 2 | 3 |

$r_i = \{0, 1, 2, 3\}$
$f_i = \{0, 1\}$
$s_i = \{0, 1, 2, 3\}$

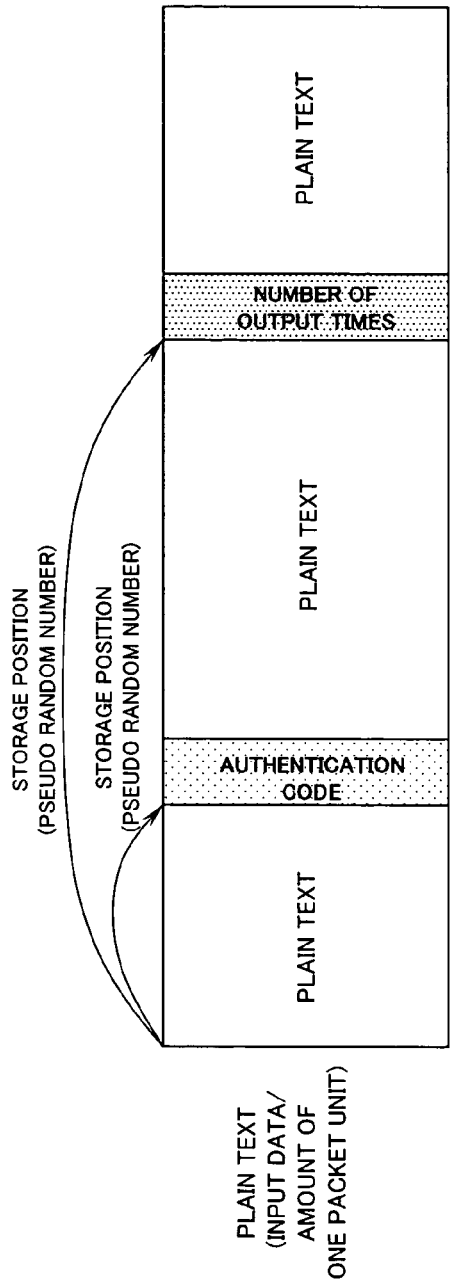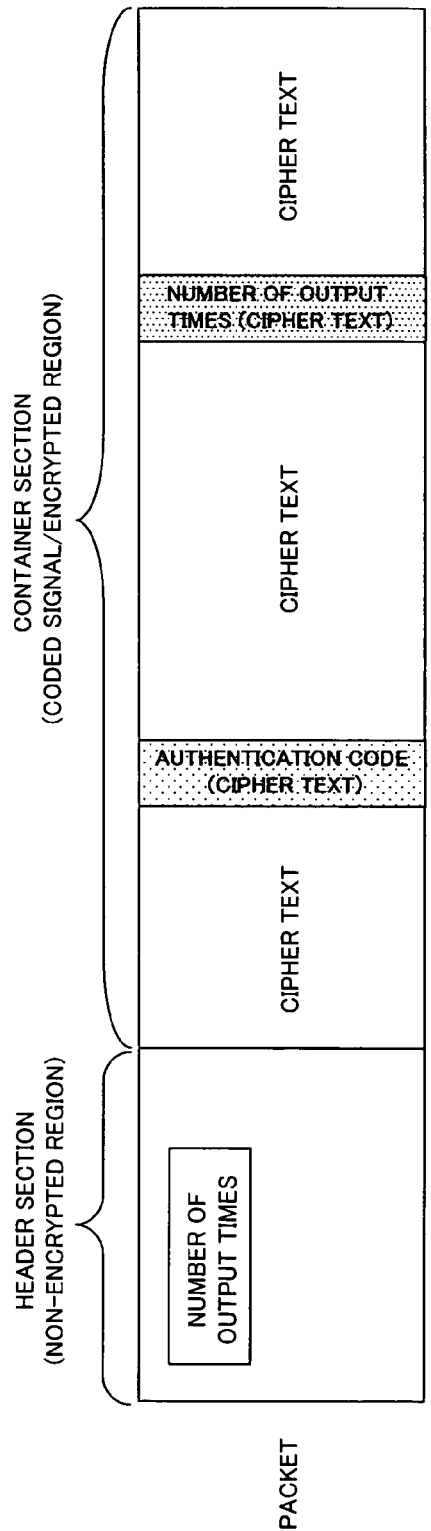

ENCRYPTION METHOD, CRYPTOGRAM DECODING METHOD, ENCRYPTOR, CRYPTOGRAM DECODER, AND COMMUNICATION SYSTEM

BACKGROUND OF THE INVENTION (1) Field of the Invention

The present invention relates to an encryption/cryptogram decoding technique used in a system in which information is encrypted before being transmitted and received and, more particularly, to an encryption/cryptogram decoding technique having a far greater encryption strength than conventional mathematical encryption by using the classic physical random number etc. instead of quantum fluctuation in the Yuen quantum cryptography scheme and capable of being applied to a variety of media.

(2) Description of the Related Art

In a network at present, as an encryption method, mathematical encryption such as shared key encryption is used. Typical examples include stream cipher (classic encryption). FIG. 18 is a block diagram showing a configuration of a general transmission/reception system to which the stream cipher has been applied, and a transmission/reception system 100 shown in FIG. 18 is configured so as to provide an encryptor 110 on the side of a legitimate transmitter that encrypts a plain text and a cryptogram decoder 120 on the side of a legitimate receiver that decodes the cipher text transmitted via a network etc.

Here, the encryptor 110 is configured so as to provide a pseudo random number generator 111 and an encryptor (an exclusive OR arithmetic unit). The pseudo random number generator 111 generates and outputs a pseudo random number $r_i$ based on a encryption key K set in advance and, for example, if the encryption key K is a binary number of 100 bits, as a pseudo random number $r_i$, a binary number of $(2^{100}-1)$ bits, that is, a pseudo random number with a period of $(2^{100}-1)$ bits is generated. The modulation section 112 calculates an exclusive OR (XOR) of plain text $x_i$ to be encrypted and the pseudo random number generated by the pseudo random number generator 111 and outputs it as cipher text $c_i$. In other words, the plain text $x_i$ is encrypted by the modulation section 112 based on the pseudo random number $r_i$ and output as cipher text $c_i$.

The cryptogram decoder 120 is configured so as to provide a pseudo random number generator 121 and a demodulation section (an exclusive OR arithmetic unit) 122. The pseudo random number generator 121 generates and outputs a pseudo random number $r_i$ in synchronization with the pseudo random number generator 111 based on the same encryption key K as that of the pseudo random number generator 111 of the encryptor 110. The demodulation section 122 calculates an exclusive OR (XOR) of cipher text $c_i$ transmitted from the encryptor 110 and a pseudo random number $r_i$ generated by the pseudo random number generator 121 and outputs it as plain text $x_i$. In other words, the cipher text $c_i$ is decoded by the demodulation section 122 based on the pseudo random number $r_i$ (the pseudo random number generated based on the same encryption key as the encryption key K used to generate the pseudo random number $r_i$ on the encryptor 110 side) in synchronization with the pseudo random number $r_i$ on the encryptor 110 side and output as plain text $x_i$.

In the transmission/reception system 100 to which such stream cipher has been applied, there is the possibility that cipher text $c_i$ may be decoded by an attack method called a known plain text attack. The known plain text attack is an attack method by which an interceptor not only intercepts cipher text $c_i$ but also acquires plain text $x_i$ before encrypted into the cipher text $c_i$ and obtains a pseudo random number by collating the cipher text $c_i$ and the plain text $x_i$ and using the pseudo random number, decodes the cipher text other than the part the plain text of which has been acquired.

Since the pseudo random number generator 111 calculates and outputs a numerical sequence that seems to be a random number in a pseudo manner based on the encryption key K, if the pseudo random number sequence output from the pseudo random number generator 111 is acquired with a length more than the number of digits of the encryption key K, the encryption key K is calculated inversely from the pseudo random number sequence and all of the pseudo random numbers are reproduced as a result. For example, if 100 bits of cipher text and 100 bits of plain text corresponding to the cipher text are acquired, the 100 bits of the encryption key is calculated inversely and other cipher text is decoded.

In such a situation, recently, a quantum cipher technique is considered as impossible to decode (unconditionally safe) against any attack method including the above-mentioned known plain text attack. For example, in the following patent documents 1 and 2, a technique called Yuen cipher (Y-00 scheme quantum cryptography) or a technique called quantum stream cipher is proposed. The Y-00 scheme quantum cryptography is quantum cipher communication using a number of quantum states in a quantum-mechanically non-orthogonal state as a multi-valued signal.

A case where Y-00 scheme quantum cryptography is realized with a multilevel phase modulation scheme by using light beams in a coherent state as a quantum state is explained below with reference to FIG. 19.

Coherent light beams arranged with adjoining phase angles are assigned with plain text of one bit "0" and plain text of one bit "1" by turns. In an example shown in FIG. 19, the coherent light beams arranged at phase angles $\phi_{i-1}, \phi_i, \phi_{i+1}$, and $\phi_{i+2}$ are assigned with plain text "0", "1", "0", "1", . . . , respectively.

When the light intensity expressed by the number of photons is about 10,000, the interval of arrangement of phase multilevel signals is designed so that coherent light beams the phase angles of which are close cannot be distinguished from each other due to quantum fluctuation (coherent noise) by performing multilevel phase modulation of about 200 levels. In the example shown in FIG. 19, the interval of arrangement of phase multilevel signals is designed so that the two coherent light beams arranged at adjoining phase angles $\phi_{i-1}, \phi_{i+1}$, respectively, are within quantum fluctuation by performing multilevel phase modulation of the coherent light with phase angle $\phi_i$.

On the other hand, coherent light beams 180 degrees different in phase angle from each other are assigned with plain text with inverted bits. For example, when the coherent light beam at a phase angle of 0 degree is assigned with plain text of one bit "0", the coherent light beams at a phase angle of 180 degrees is assigned with plain text of one bit "1". With these coherent light beams 180 degrees different in phase angle from each other as a set, which one of sets is used to express plain text of one bit is determined using a pseudo random number with which a transmitter side and a receiver side are synchronized and the pseudo random number is switched to another one for each communication of plain text of one bit.

In the example shown in FIG. 19, the respective coherent light beams at the phase angles $\phi_{i-1}, \phi_i, \phi_{i+1}, \phi_{i+2}, \ldots$, are assigned with plain text "0", "1", "0", "1", . . . , and the coherent light beams 180 degrees different in phase angle from each other, that is, the respective coherent light angles at the phase angles $\phi_{i-1}+180°, \phi_i+180°, \phi_{i+1}+180°, \phi_{i+2}$ +180°, ..., are assigned with plain text "1", "0", "1", "0", .... At this time, when N (N is even) of the coherent light beams different in phase angle to one another are set, N/2 of sets of coherent light beams 180 degrees different in phase angle are set, as a result, and a value among N/2 of integer values, for example, among 0 to (N/2−1), is generated as a pseudo random number. Then, when plain text of one bit "1" is transmitted, if, for example, "i" is generated as a pseudo random number, the set of coherent light beams as the phase angles $\phi_i$ and $\phi_i+180°$ is selected and multilevel phase modulation of the coherent light beam at a phase angle of $\phi_i$ is performed so that the coherent light beams at a phase angle of $\phi_i$ and the adjoining coherent light beams as phase angles of $\phi_{i-1}$ and $\phi_{i+1}$ are within quantum fluctuation, and thus an optical signal after multilevel phase modulation is transmitted.

Since the reception side knows which set of coherent light beams is used using the pseudo random number synchronized with the transmission side, therefore, it is possible to judge whether the plain text is "1" or "0" by discriminating the two states 180 degrees different in phase angle.

At this time, since the quantum fluctuation is small, discrimination of coherent light beams at phase angles close to each other (discrimination distance is small) is impeded, however, when discrimination of which one of the two coherent light beams 180 degrees apart in phase angle is received is not impeded. However, an interceptor does not know the pseudo random number that the legitimate transmitter and receiver use, therefore, it is not possible for him/her to know which one of sets of coherent light beams is used in communication.

Because of this, in order to decode the intercepted cryptogram, it is necessary for the interceptor to correctly know the phase of the coherent light beam the transmitter has sent to demodulate the light signal having been subjected to multilevel phase modulation, however, it is not possible for the interceptor to discriminate the coherent light beam indicative of the state of plain text ("1" or "0") from the coherent light beam the phase angle of which is close to that of the coherent light beam in question for demodulation even if the interceptor has intercepted the coherent light beam flowing through the transmission channel because it is buried in the quantum fluctuation.

For example, if the reception side receives a light signal having been subjected to multilevel phase modulation so that the coherent light beam at the phase angle $\phi_i$ and the coherent light beams at the phase angles $\phi_{i-1}$ and $\phi_{i+1}$ are within the quantum fluctuation, it is necessary for the interceptor to discriminate between the coherent light beams at the phase angles $\phi_{i-1}$, $\phi_i$, and $\phi_{i+1}$ (coherent light beams with small discrimination distance), therefore, decoding is impossible. In contrast to this, it is possible for the legitimate receiver to know that the set of coherent light beams at the phase angles $\phi_i$ and $\phi_i+180°$ is used based on the pseudo random number synchronized with that of the transmitter side, therefore, it is possible to discriminated between the two states of the phase angles 180 degrees different, to demodulate to know that the plain text is "1", and to decode the cryptogram.

As described above, according to Y-00 scheme quantum cryptography, an extremely high safety can be secured compared to the classic cryptography without quantum fluctuation because information is devised so that discrimination is impossible by means of quantum fluctuation. As a technique for further improving safety, the Deliberate Signal Randomization (DSR) theory that irregularly varies a multilevel signal to be transmitted has been developed (refer to the non-patent documents 1 and 3).

On the other hand, the above-mentioned scheme cannot be used with electric signals or electromagnetic waves because it uses a quantum-mechanical communication medium. Although inferior to a quantum system as to safety, a scheme called classic Y-00 scheme that performs such cryptography in a classic physical system has been researched in Tamagawa University etc.

[Non-patent document 1] H. P. Yuen, "A New Approach to Quantum Cryptography", quant-ph/0311061 v6 (30 Jul. 2004)

[Non-patent document 2] O. Hirota, K. Kato, M. Sohma, T. Usuda, K. Harasawa, "Quantum stream cipher based on optical communications", Proc. On Quantum communication and quantum imaging, Proc. of SPIE, vol-5551, pp206-219, 2004

[Non-patent document 3] T. Tsuchimoto, T. Tomari, S. Usami, T. Usuda, I. Takumi, "Quantum optimum detection properties for mixed state by DSR", The 27th Information Theory and Applications Symposium, vol-1, pp. 359-362, December, 2004.

It is necessary to use a communication medium having quantum-mechanical properties in order to perform the above-mentioned Y-00 scheme in a quantum system, therefore, its application range is limited. In such a situation, the applicants of the present invention have proposed a classic Y-00 scheme for performing the Y-00 scheme using pseudo random numbers and physical noises in the classic physical system (for example, Japanese Patent Application No. 2004-260512 etc.) However, the embodiments of the classic Y-00 scheme so far apply analog DSR, therefore, its output is necessarily a multilevel signal and application of the encryption technique is not possible to a recording media such as an electric memory, a flexible disc, a CD (Compact Disc), and a DVD (Digital Versatile Disc), etc.

Then, the applicants of the present invention have proposed a technique having a far greater encryption strength than conventional mathematical encryption by using the classic pseudo random number instead of quantum fluctuation in the Yuen quantum cryptography scheme and capable of realizing the classic Yuen cryptography applicable to a variety of media (refer to Japanese Patent Application No. 2005-276117). In this technique, the output of multilevel modification by a pseudo random number is further subjected to modulation in which a discrete DSR technique by a physical random number is performed, therefore, a discrete signal output is obtained and thus it is made possible to perform desired channel coding. Due to this, the classic Y-00 scheme encryption has been proposed, which has a far greater encryption strength than the conventional mathematical encryption and capable of being stored as data in electric memories and a variety of recording media that can be used in electromagnetic wave communication and electrical communication and further capable of minimizing the influence on the communication rate without being influenced by noises.

This time, the applicants of the present invention have newly developed an encryption/cryptogram decoding technique applicable to a variety of media and having a far greater encryption strength than the conventional mathematical encryption (the same encryption strength as that of the above-mentioned classic Y-00 scheme cryptography) by using a method different from the above-mentioned classic Y-00 scheme cryptography. Thus, it is an object of the present invention to disclose and provide the encryption/cryptogram decoding technique.

SUMMARY OF THE INVENTION

In order to attain the above-mentioned object, an encryption method of the present invention is characterized by comprising:

a modulation step for modulating one-bit input data into a coded signal by associating the one-bit input data with a discrete value of at least two bits determined by a pseudo random number and a physical random number and for generating the discrete value as the coded signal; and a channel coding step for channel-coding the coded signal and outputting the coded data channel-coded as encrypted data, wherein:

1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value.

Further, an encryption method of the present invention is characterized by comprising a modulation step for modulating one-bit input data into a coded signal by associating the one-bit input data with a discrete value determined by a pseudo random number and a physical random number and for generating the discrete value as the coded signal, wherein:

1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value; and wherein:

the modulation step generates the coded signal premised that the number of states of the pseudo random number is 4, the number of states of the physical random number is 2, and the number of states of the discrete value is 4.

At this time, a second pseudo random number generated based on an encryption key periodically or non-periodically changed to a value determined by a physical random number may be used as the physical random number.

A cryptogram decoding method of the present invention is characterized by comprising a demodulation step for demodulating a coded signal, the coded signal being obtained by performing modulation to associate one-bit input data with a discrete value determined by a pseudo random number and a physical random number, the modulation premising that:

the number of states of the pseudo random number is 4, the number of states of the physical random number is 2, and the number of states of the discrete value is 4; and 1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value, wherein: the demodulation step demodulates the coded signal into the input data by a pseudo random number based on the same encryption key as the encryption key having generated the pseudo random number used in the modulation.

An encryptor of the present invention is characterized by comprising:

a pseudo random number generation section for generating a pseudo random number based on an encryption key;

a physical random number generation section for generating a physical random number based on a physical phenomenon; and a modulation section for generating a coded signal by performing modulation to associate one-bit input data with a discrete value determined by the pseudo random number generated by the pseudo random number generation section and the physical random number generated by the physical random number generation section, wherein the modulation section premises that:

the number of states of the pseudo random number is 4, the number of states of the physical random number is 2, and the number of states of the discrete value is 4; and 1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value.

In such an encryptor, the pseudo random number generation section, the physical random number generation section, and the modulation section may be arranged in a tamper-resistant region for suppressing the probability distribution variations by physical disturbance in the physical random number generated by the physical random number generation section as well as suppressing the leakage of the encryption key and the pseudo random number, or the pseudo random number generation section may be configured so as to prohibit reset and repetition of the pseudo random number generation operation. Further, the encryptor of the present invention may comprise:

a nonvolatile first hold section for holding the number of input times of a clock signal for causing the pseudo random number generation section to perform the pseudo random number generation operation as the number of output times of pseudo random number and outputting the number of output times to the outside of the tamper-resistant region in response to a command from the outside of the tamper-resistant region; and a synchronization adjustment section for adjusting the number of output times of pseudo random number from the pseudo random number generation section based on the number of output times read from the first hold section in order to synchronize the pseudo random number generation operation by the pseudo random number generation section with a demodulation pseudo random number generation operation by a demodulation pseudo random number generation section of a cryptogram decoder in a destination communication device of the coded signal. Furthermore, the encryptor of the present invention may comprise:

a nonvolatile second hold section for holding the same random number table as that of the destination communication device;

a cryptogram transmission section for encrypting the number of output times of pseudo random number read from the first hold section into encrypted synchronization information based on the random number table held in the second hold section and transmitting the encrypted synchronization information to the destination communication device; and a decoding reception section for decoding the encrypted synchronization information received from the destination communication device into the number of output times of demodulation pseudo random number based on the random number table held in the second hold section, and the synchronization adjustment section, when the number of output times of demodulation pseudo random number on the destination communication device side decoded by the decoding reception section is greater than the number of output times of pseudo random number read from the first hold section, may adjust the number of output times of pseudo random number from the pseudo random number generation section to the number of output times of demodulation pseudo random number on the destination communication device side.

Further, an encryption method of the present invention is characterized by comprising a modulation step for modulating one-bit input data into a coded signal by associating the one-bit input data with a discrete value determined by a pseudo random number and a physical random number and for generating the discrete value as the coded signal, wherein:

1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value, wherein:

the modulation step generates the coded signal premised that the state of the pseudo random number is one of four states, that is, 0, 1, 2, and 3, the state of the physical random number is one of two states, that is, 0 and 1, and the state of the discrete value is one of four states, that is, 0, 1, 2, and 3;

wherein:

if it is premised that a serial number given to each one bit of the input data is i, a number assigned to a set pattern of input data, a pseudo random number, a physical random number, and a discrete number is k (k is an integer from 0 through 15), the input data is $x_{k,i}$, the pseudo random number is $r_{k,i}$, the physical random number is $f_{k,i}$, and the discrete value is $s_{k,i}$, and when k is any one of integers from 0 through 7, the input data $x_{k,i}=0$; when k is any one of integers from 8 through 15, the input data $x_{k,i}=1$; when k is any one of integers 0, 1, 8, and 9, the pseudo random number $r_{k,i}=0$; when k is any one of integers 2, 3, 10, and 11, the pseudo random number $r_{k,i}=1$; when k is any one of integers 4, 5, 12, and 13, the pseudo random number $r_{k,i}=2$; when k is any one of integers 6, 7, 14, and 15, the pseudo random number $r_{k,i}=3$; when k is an even number, the physical random number $f_{k,i}=0$; and when k is an odd number, the physical random number $f_{k,i}=1$, then a typical set $S_j=(s_{0,i}, s_{1,i}, s_{2,i}, s_{3,i}, s_{4,i}, s_{5,i}, s_{6,i}, s_{7,i}, s_{8,i}, s_{9,i}, s_{10,i}, s_{11,i}, s_{12,i}, s_{13,i}, s_{14,i}, s_{15,i})$ (j is an integer from 1 through 6) of the discrete value $s_{k,i}$ is $S_1=(0, 1, 0, 1, 2, 3, 2, 3, 2, 3, 2, 3, 0, 1, 0, 1)$
$S_2=(0, 1, 0, 2, 1, 3, 2, 3, 2, 3, 1, 3, 0, 2, 0, 1)$
$S_3=(0, 1, 0, 3, 1, 2, 2, 3, 2, 3, 1, 2, 0, 3, 0, 1)$
$S_4=(0, 2, 0, 2, 1, 3, 1, 3, 1, 3, 1, 3, 0, 2, 0, 2)$
$S_5=(0, 2, 0, 3, 1, 2, 1, 3, 1, 3, 1, 2, 0, 3, 0, 2)$
$S_6=(0, 3, 0, 3, 1, 2, 1, 2, 1, 2, 1, 2, 0, 3, 0, 3)$, and wherein:

the modulation step generates the coded signal using any one of the six kinds of the typical sets $S_1$ to $S_6$.

At this time, the encryption method of the present invention may be one in which:

two numerical values respectively given as any one of integers from 0 through 3 are defined as u and v, respectively, and a numerical value given as an integer not selected as the numerical value u or v among integers from 0 through 3 is defined as w; and the modulation step generates the coded signal using a set $S'_j=(s'_{0,i}, s'_{1,i}, s'_{2,i}, s'_{3,i}, s'_{4,i}, s'_{5,i}, s'_{6,i}, s'_{7,i}, s'_{8,i}, s'_{9,i}, s'_{10,i}, s'_{11,i}, s'_{12,i}, s'_{13,i}, s'_{14,i}, s'_{15,i})$ obtained by performing the following replacement as to the discrete value $s_{k,i}$ of the six kinds of the typical set $S_j$ $s'_{2u,i}=s_{2v,i}$
$s'_{2u+1,i}=s_{2v+1,i}$
$s'_{2u+8,i}=s_{2v+8,i}$
$s'_{2u+9,i}=s_{2v+9,i}$
$s'_{2w,i}=s_{2w,i}$
$s'_{2w+1,i}=s_{2w+1,i}$
$s'_{2w+8,i}=s_{2w+8,i}$
$s'_{2w+9,i}=s_{2w+9,i}.$ Further, the encryption method of the present invention may be one in which:

a numerical value given as an integer among integers from 0 through 7 is defined as m and a numerical value given as an integer not selected as the numerical value m among integers from 0 through 7 is defined as n; and the modulation step generates the coded signal using a set $S''_j=(s''_{0,i}, s''_{1,i}, s''_{2,i}, s''_{3,i}, s''_{4,i}, s''_{5,i}, s''_{6,i}, s''_{7,i}, s''_{8,i}, s''_{9,i}, s''_{10,i}, s''_{11,i}, s''_{12,i}, s''_{13,i}, s''_{14,i}, s''_{15,i})$ obtained by performing the following replacement as to the discrete value $s'_{k,i}$ of the six kinds of the typical set $S'_j$ $s''_{2m+1,i}=s'_{2m,i}$
$s''_{2m,i}=s'_{2m+1,i}$
$s''_{2n,i}=s'_{2n,i}$
$s''_{2n+1,i}=s'_{2n+1,i}.$ A cryptogram decoder of the present invention is characterized by demodulating a coded signal, the coded signal being obtained by performing modulation to associate one-bit input data with a discrete value determined by a pseudo random number and a physical random number, the modulation premising that:

the number of states of the pseudo random number is 4, the number of states of the physical random number is 2, and the number of states of the discrete value is 4; and 1) the coded signal can be demodulated into the input data by the pseudo random number;

2) the number of sets of the input data, the pseudo random number, and the physical random number corresponding to a particular value of the discrete value is equal in number for respective two values of the input data; and 3) the number of sets of the pseudo random number and the physical random number corresponding to respective values of the input data and respective values of the discrete value is equally associated also with any set of the input data and the discrete value, into the input data: comprising:

a demodulation pseudo random number generation section for generating demodulation pseudo random number based on the same encryption key as the encryption key having generated the pseudo random number used in the modulation; and a demodulation section for demodulating the coded signal into the input data by the demodulation pseudo random number generated by the demodulation pseudo random number generation section.

In such a cryptogram decoder, the demodulation pseudo random number generation section and the demodulation section may be arranged in a tamper-resistant region for preventing leakage of the encryption key and the demodulation pseudo random number, or the demodulation pseudo random number generation section may be configured so as to prohibit reset and repetition of the demodulation pseudo random number generation operation. Further, the cryptogram decoder of the present invention may comprise:

a nonvolatile first hold section for holding the number of input times of a clock signal for causing the demodulation pseudo random number generation section to perform the demodulation pseudo random number generation operation as the number of output times of demodulation pseudo random number and outputting the number of output times to the outside of the tamper-resistant region in response to a command from the outside of the tamper-resistant region; and a synchronization adjustment section for adjusting the number of output times of demodulation pseudo random number from the demodulation pseudo random number generation section based on the number of output times read from the first hold section in order to synchronize the demodulation pseudo random number generation operation by the demodulation pseudo random number generation section with a pseudo random number generation operation by a pseudo random number generation section of an encryptor in a sender communication device of the coded signal. Furthermore, the cryptogram decoder of the present invention may comprise:

a nonvolatile second hold section for holding the same random number table as that of the sender communication device;

a cryptogram transmission section for encrypting the number of output times of demodulation pseudo random number read from the first hold section into encrypted synchronization information based on the random number table held in the second hold section and transmitting the encrypted synchronization information to the sender communication device; and a decoding reception section for decoding the encrypted synchronization information received from the sender communication device into the number of output times of pseudo random number based on the random number table held in the second hold section, wherein the synchronization adjustment section, when the number of output times of pseudo random number on the sender communication device side decoded by the decoding reception section is greater than the number of output times of demodulation pseudo random number read from the first hold section, adjusts the number of output times of demodulation pseudo random number from the demodulation pseudo random number generation section to the number of output times of pseudo random number on the sender communication device side.

A communication system of the present invention is characterized by comprising:

the encryptor according to any one of claim 5 and claims 9 to 12 comprised in a sender communication device of the coded signal and which transmits the coded signal to a destination communication device as a plurality of packets; and the cryptogram decoder according to any one of claims 13 to 17 comprised in the destination communication device of the coded signal and which decodes the coded signal in each packet received from the encryptor of the sender communication device, wherein:

a serial number about the plurality of packets or the number of output times of pseudo random number used in the modulation of the coded signal in the container section of each packet is described in the header section of each packet to be transmitted from the encryptor to the cryptogram decoder; and the cryptogram decoder comprises:

a packet hold section for holding the plurality of packets from the encryptor; and a permutation section for permutating the plurality of packets held in the packet hold section into an order in accordance with the serial number or the number of output times described in the header section of each packet and inputting it to the demodulation section.

In such a communication system, the serial number or the number of output times may be included in the coded signal in the container section of each packet to be transmitted from the encryptor to the cryptogram decoder and the cryptogram decoder may comprise:

a first comparison section for comparing the serial number or the number of output times described in the header section of each packet with the serial number or the number of output times included in the demodulation result of the coded signal by the demodulation section; and a packet discard section for discarding the packet when the result of comparison by the first comparison section is that the serial numbers or the numbers of output times do not coincide.

Further, in such a communication system, a pseudo random number sequence generated by the pseudo random number generation section may be included as an intrinsic authentication code about the packet in the coded signal in the container section of each packet to be transmitted from the encryptor to the cryptogram decoder and the cryptogram decoder may comprise:

a second comparison section for comparing the authentication code included in the demodulation result of the coded signal by the demodulation section with a demodulation pseudo random number sequence corresponding to the authentication code generated by the demodulation pseudo random number generation section; and a packet discard section for discarding the packet when the result of comparison by the second comparison section is that the authentication codes do not coincide.

According to the present invention described above, the discrete DSR technique using a physical random number is performed and a discrete signal output of two bits can be obtained, therefore, it is made possible to perform desired channel coding and because of this, it is possible to provide an encryption/cryptogram decoding technique having a far greater encryption strength than the conventional mathematical encryption (the same encryption strength as that of the above-mentioned classic Y-00 scheme cryptography) and capable of being stored as data in electric memories and a variety of recording media that can be used in electromagnetic wave communication and electrical communication and further of minimizing the influence on the communication rate without being influenced by noises.

BRIEF DESCRIPTION OF THE DRAWINGS

FIG. 2 is a block diagram showing a configuration of a cryptogram decoder as the first embodiment of the present invention.

FIG. 3 is a diagram showing an example of a (2-2-2 type) modulation three-variable function (encode table) when the number of states of pseudo random number is 2, the number of states of physical random number is 2, and the number of states of modulation output (discrete value) is 2.

FIG. 4 is a diagram showing an example of a (2-2-4 type) modulation three-variable function (encode table) when the number of states of pseudo random number is 2, the number of states of physical random number is 2, and the number of states of modulation output (discrete value) is 4.

FIG. 5 is a diagram showing an example of a (4-2-4 type) modulation three-variable function (encode table) when the number of states of pseudo random number is 4, the number of states of physical random number is 2, and the number of states of modulation output (discrete value) is 4.

FIG. 6(A) is a diagram showing an encode table as to an example (1) of output shown in FIG. 5, FIG. 6(B) is a diagram showing a decode table (demodulation two-variable function) corresponding to the encode table shown in FIG. 6(A), and FIG. 6(C) is a diagram showing the decode table shown in FIG. 6(B) rewritten into binary numbers.

FIG. 7(A) is a diagram showing an encode table as to an example (7) of output shown in FIG. 5, FIG. 7(B) is a diagram showing a decode table (demodulation two-variable function) corresponding to the encode table shown in FIG. 7(A), and FIG. 7(C) is a diagram showing the decode table shown in FIG. 7(B) rewritten into binary numbers.

FIG. 10 is a diagram showing an example of a (8-2-4 type) modulation three-variable function (encode table) when the number of states of pseudo random number is 8, the number of states of physical random number is 2, and the number of states of modulation output (discrete value) is 4.

FIG. 13 is a diagram for specifically explaining the encryption operation by the encryptor shown in FIG. 11.

FIG. 16 is a diagram for specifically explaining the encryption operation by the encryptor shown in FIG. 14.

FIG. 20 is a diagram for explaining all of the examples of a (4-2-4 type) modulation three-variable function (encode table) when the number of states of pseudo random number is 4, the number of states of physical random number is 2, and the number of states of modulation output (discrete value) is 4.

FIG. 26(A) is a diagram showing an example of incorporation of an authentication code and the number of output times into input data (plain text) in the fourth embodiment and FIG. 26(B) is a diagram showing an example of packeted input data (plain text) shown in FIG. 26(A).

DESCRIPTION OF THE PREFERRED EMBODIMENTS

Embodiments of the present invention will be explained below with reference to drawings.

[1] Configuration of the Encryptor in the First Embodiment

Figure 1:
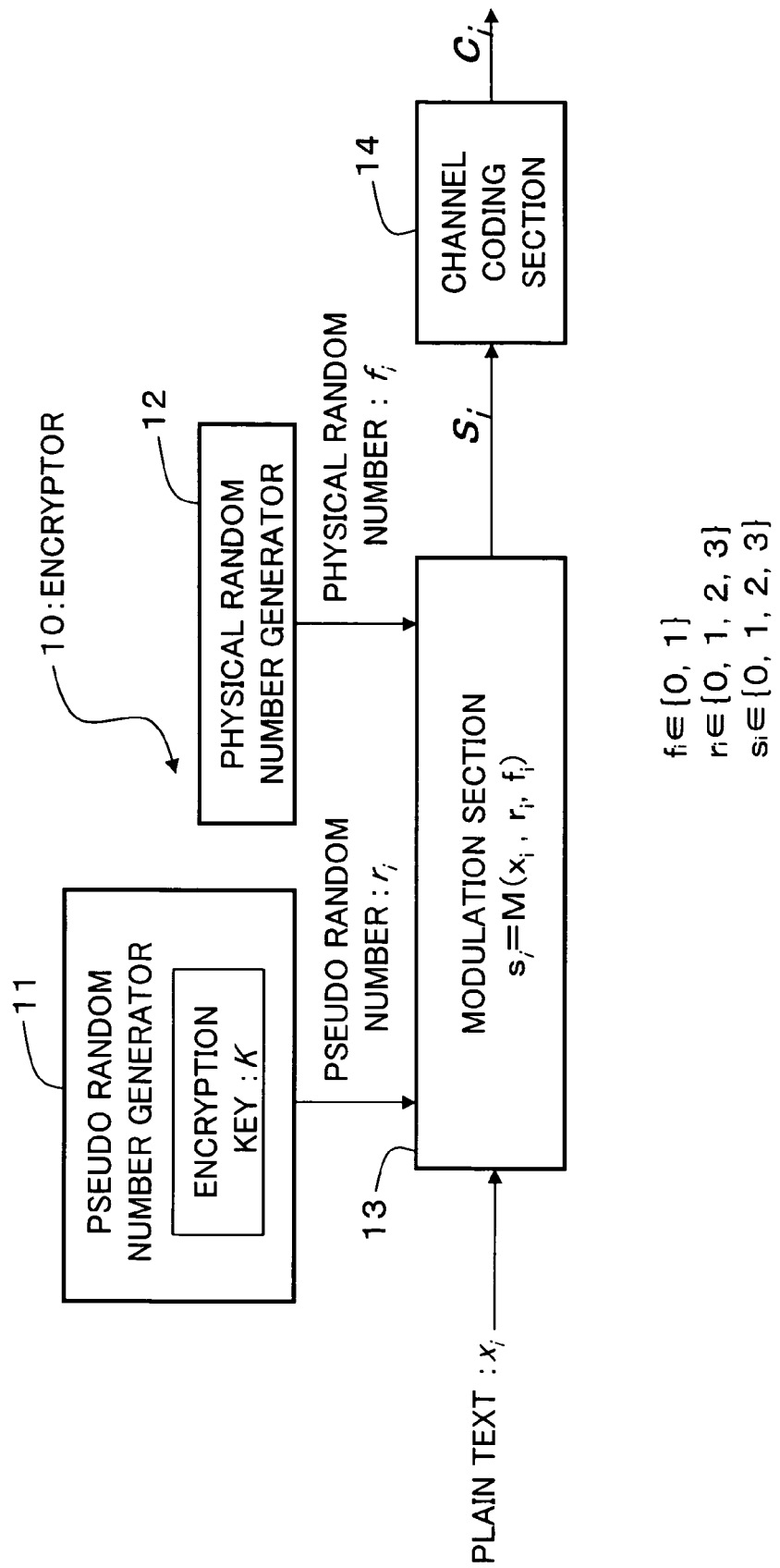
FIG. 1 is a block diagram showing a configuration of an encryptor as a first embodiment of the present invention.

FIG. 1 is a block diagram showing a configuration of an encryptor as a first embodiment of the present invention and as shown in FIG. 1, an encryptor 10 in the first embodiment is configured so as to provide a pseudo random number generator 11, a physical random number generator 12, a modulation section 13, and a channel coding section 14.

The pseudo random number generator (first pseudo random number generation section, modulation pseudo random number generation section) 11 generates and outputs a modulation pseudo random number (first pseudo random number) $r_i$ based on an encryption key K set in advance. For example, if the encryption key K is a 100-bit binary number, a $(2^{100}-1)$-bit binary number, that is, a pseudo random number with a period of $(2^{100}-1)$ bits is generated from the physical random number generator 11. The output from the physical random number generator 11 is dealt with as a pseudo random number $r_i$. In the present embodiment, the pseudo random number $r_i$ has four integers 0, 1, 2, and 3 as its state. In other words, $r_i \in \{0, 1, 2, 3\}$.

The physical random number generator (physical random number generation section) 12 generates a physical random number $f_i$ based on a physical phenomenon. As a physical phenomenon, an essentially random phenomenon such as noises in the natural world, cosmic rays, thermal fluctuation (thermal noises), and decay of radioactive isotopes is used and by using such a physical phenomenon, it is possible for the physical random number generator 12 to generate a random number sequence that requires no encryption key, having no reproductivity or periodicity, and which cannot be predicted. The output from the physical random number generator 12 is dealt with as the physical random number $f_i$. In the present embodiment, the physical random number $f_i$ has two integers 0 and 1 as its state. In other words, $f_i \in \{0, 1\}$. By the way, it is also possible to use, for example, a random number generator 18, which will be described later with reference to FIG. 17, instead of the physical random number generator 12.

The modulation section 13 modulates plain text $x_i$, which are input data of binary numbers by associating the plain text with a two-bit discrete value and outputs as modulation output $s_i$, the two bit discrete value being determined by a modulcation pseudo random number $r_i$ that are generated by the pseudo random number generator 11, and a physical random number $f_i$ that are generated by the physical random number generator 12. In the present embodiment, as described above, the number of states of pseudo random number $r_i$ is 4, the number of states of physical random number $f_i$ is 2, and the number of states of modulation output $s_i$ is 4, and in the modulation section 13, the modulation output $s_i$ is dealt with an output of a modulation three-variable function the variables of which being the plain text $x_i$, the pseudo random number $r_i$, and the physical random number $f_i$. In the present invention, the modulation three-variable function is expressed as $s_i = M(x_i, r_i, f_i)$.

Specifically, the modulation three-variable function associates the plain text $x_i$, the pseudo random number $r_i$, and the physical random number $f_i$ with the output $s_i$ based on the encode table to be described later with reference to FIG. 5 to FIG. 7 and sets a correspondence relationship between the plain text $x_i$, the pseudo random number $r_i$, the physical random number $f_i$, and the output $s_i$ so that all of the conditions in the following items [I], [II], and [III] are met simultaneously. By the way, the output (discrete value) $s_i$ has four integer values 0, 1, 2, and 3 as its state. In other words, $s_i \in \{0, 1, 2, 3\}$.

[I] A decoded signal $d_i$ obtained by channel-decoding encrypted data (cipher text $c_i$) to be described later can be demodulated into plain text $x_i$ as the input data by a pseudo random number $r_i$. In other words, it is possible for a legitimate receiver to decode the decoded signal $d_i$ only by the legitimate pseudo random number $r_i$ without the need to know the physical random number $f_i$ used by a legitimate transmitter.

[II] The respective numbers of two values (0, 1) of the plain text $x_i$ corresponding to the output (discrete value) $s_i$ are equal. The condition in the item [II] is the nature as "cryptogram" and a condition to prevent cipher text (actually, a decoded signal $d_i = s_i$ obtained by intercepting the cipher text $c_i$) from corresponding uniquely to the plain text $x_i$. By meeting the condition in the item [II], it is seemed to an interceptor that does not know the pseudo random number $r_i$ or the physical random number $f_i$ used by the legitimate transmitter and receiver that any one of the cipher text corresponds to the values 0 and 1 of the plain text $x_i$ with the same probability and therefore, it is not possible for the interceptor to associate the plain text $x_i$ and the cipher text uniquely. Specifically, as will be described later with reference to FIG. 8 and FIG. 9, the three-variable function (encode table) described above is set so that the number of cases where the plain text $x_i$ corresponding to the output $s_i$ of the modulation section 13 is "1" and the number of cases where the plain text $x_i$ is "0" are equal, that is, if the physical random number $f_i$ and the pseudo random number $r_i$ are random, the state of the modulation output $s_i$ is also distributed randomly.

[III] The same number (here, one for each) of plural (here, two) different pseudo random numbers is associated with the pair of the plain text (value of input data) $x_i$ and the output (discrete value) $s_i$. The condition in the item [III] is a condition to prevent the pseudo random number $r_i$ used in encryption from being determined uniquely only from the pair of the plain text $x_i$ and the cipher text encrypted from the plain text $x_i$ (actually, the decoded signal $d_i$ obtained by intercepting the cipher text $c_i$), that is, a condition for the safety against a known plain text attack. By meeting the condition in the item [III], even if an interceptor that does not know the pseudo random number $r_i$ or the physical random number $f_i$ used by the legitimate transmitter and receiver tries to predict the pseudo random number $r_i$ from the pair of the plain text $x_i$ and the cipher text, the plural different pseudo random numbers $r_i$ correspond to the pair of the plain text $x_i$ and the cipher text with the same probability, therefore, it is not possible to determine the pseudo random number $r_i$ uniquely by a known plain text attack.

By the way, it is only required that the modulation by the modulation section 13 be such one that the modulation output is a discrete multilevel signal with four levels, therefore, digital modulation such as intensity modulation, phase modulation, and PCM (Pulse Code Modulation) can be used regardless of its modulation scheme. An input signal of modulation and an output signal of modulation can also be used as long as they are a signal that can be expressed by a discrete value such as an intensity signal, a phase signal, a digital signal, a parallel signal using plural signal lines, and a serial signal to be time sequential data regardless of the type of the signal.

The channel coding section 14 performs desired channel coding suited to the communication channel of the output $s_i$ of the modulation section 13 and outputs its output $s_i$ as cipher text (encrypted data) $c_i$. For example, in order to adapt the output $s_i$ of the modulation section 13 to a communication channel that expresses information with two states, that is, the ON state and the OFF state, the output $s_i$ is converted into a binary number. Further, coding by error correction code is performed in order to add resistance to the errors in the communication channel and a series of coding processing such as processing for improving use efficiency of the code is performed if necessary. Examples of error correction code include hamming code, Reed-Solomon code, LDPC (Low Density Parity Check) code, turbo code, etc.

By the way, when the modulation section 13 with which an optimum signal is output to the communication channel as the output $s_i$ of the modulation section 13 is used already, the operation of the channel coding section 14 is expressed by identity mapping and at this time, the channel coding section 14 can be omitted.

[2] Configuration of the Cryptogram Decoder in the First Embodiment

FIG. 2 is a block diagram showing a configuration of a cryptogram decoder as a first embodiment of the present invention and as shown in FIG. 2, a cryptogram decoder 20 in the present embodiment decodes cipher text $c_i$ obtained by the encryptor 10 described above and is configured so as to provide a pseudo random number generator 21, a demodulation section 22, and a channel decoding section 23.

The channel decoding section 23 channel-decodes cipher text $c_i$ obtained by the encryptor 10 and obtains a decoded signal $d_i$. By the way, the decoded signal $d_i$ and the output $s_i$ of the modulation section 13 of the encryptor 10 corresponding to the same plain text $x_i$ are equal. Further, the operation of the channel decoding section 23 when using the demodulation section 22 capable of directly demodulating cipher text $c_i$ is expressed by identity mapping and at this time, the channel decoding section 23 can be omitted.

The pseudo random number generator (pseudo random number generation section, demodulation pseudo random number generation section) 21 generates and outputs, based on the same encryption key K as the encryption key K having generated the pseudo random number $r_i$ used in the modulation by the modulation section 13 in the encryptor 10, a demodulation pseudo random number $r_i$ in synchronization with the modulation pseudo random number $r_i$ and has the same configuration as that of the pseudo random number generator 11 in the encryptor 10.

The demodulation section 22 demodulates the decoded signal $d_i$ obtained by the channel decoding section 23 into the plain text $x_i$ as input data by the pseudo random number $r_i$ generated by the pseudo random number generator 21 and in the present embodiment, is designed so as to demodulate the decoded signal $d_i$ into the plain text $x_i$ by associating the decoded signal $d_i$ and the pseudo random number $r_i$ with the plain text $x_i$ based on the decode table, which will be described later with reference to FIG. 6(B) or FIG. 7(B). In other words, in the demodulation section 22, the plain text $x_i$ is dealt with as the output of the demodulation two-variable function with the decoded signal $d_i$ and the pseudo random number $r_i$ being as variables. In the present embodiment, the demodulation two-variable function is expressed as $x_i = D(d_i, r_i)$

[3] About the Modulation Three-Variable Function (Encode Table) and the Demodulation Two-Variable Function (Decode Table) in the First Embodiment Here, with reference to FIG. 3 to FIG. 10, that the case where the number of states of the pseudo random number is $r_i$ is 4 and the number of states of the physical random number $f_i$ is 2 and the number of states of the modulation output $s_i$ is 4 (4-2-4 type) is the minimum configuration of the modulation three-variable function (encode table) that meets the conditions in the above-mentioned items [I], [II], and [III] is explained and at the same time, specific examples of the 4-2-4 type modulation three-variable function (encode table) and the demodulation two-variable function (decode table) will be explained.

[3-1] 2-2-2 Type

FIG. 3 shows an example of the 2-2-2 type modulation three-variable function (encode table) the configuration of which is smaller than that of the 4-2-4 type, that is, an example of the modulation three-variable function (encode table) $s_i = M(x_i, r_i, f_i)$ when the number of states of the pseudo random number $r_i$ is 2 and the number of states of the physical random number $f_i$ is 2 and the number of states of the modulation output $s_i$ is 2. Here, it is assumed that $r_i \in \{0, 1\}$, $f_i \in \{0, 1\}$, and $s_i \in \{0, 1\}$. In FIG. 3, examples (1) to (3) of the output (discrete value) $s_i$ are shown for the four kinds of set of the pseudo random number $r_i$ and the physical random number $f_i$ when the plain text $x_i$ is "0" and the four kinds of set of the pseudo random number $r_i$ and the physical random number $f_i$ when the plain text $x_i$ is "1", that is, in total, for the eight kinds of set of $x_i$, $r_i$, and $f_i$.

In the example (1) of the output $s_i$ shown in FIG. 3, the setting is as follows:
when $x_i = 0$ and $r_i = 0$ and $f_i = 0$, $s_i = 0$;
when $x_i = 0$ and $r_i = 0$ and $f_i = 1$, $s_i = 1$;
when $x_i = 1$ and $r_i = 0$ and $f_i = 0$, $s_i = 1$; and
when $x_i = 1$ and $r_i = 0$ and $f_i = 1$, $s_i = 0$, however, in this example (1), at the time of demodulating of the decoded signal $d_i$ ($=s_i$) in the demodulation section 22, when the pseudo random number $r_i = 0$ for the decoded signal $d_i = 0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, with the example (1) of the output $s_i$, the condition in the above-mentioned item [I] cannot be met.

In the example (2) of the output $s_i$ shown in FIG. 3, the setting is as follows:
when $x_i = 0$ and $r_i = 0$ and $f_i = 0$, $s_i = 0$;
when $x_i = 0$ and $r_i = 0$ and $f_i = 1$, $s_i = 1$;
when $x_i = 1$ and $r_i = 0$ and $f_i = 0$, $s_i = 0$; and
when $x_i = 1$ and $r_i = 0$ and $f_i = 1$, $s_i = 1$, however, in this example (2) also, like the above-mentioned example (1), at the time of demodulating of the decoded signal $d_i$ ($=s_i$) in the demodulation section 22, when the pseudo random number $r_i = 0$ for the decoded signal $d_i = 0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, with the example (2) of the output $s_i$ also, the condition in the above-mentioned item [I] cannot be met.

Like the examples (1) and (2) of the output $s_i$ shown in FIG. 3, when the output value group assigned to the pseudo random number $r_i$ associated with the value "0" of the plain text $x_i$ and the output value group assigned to the same pseudo random number $r_i$ associated with the value "1" of the plain text $x_i$ consist of the same values (here, 0 and 1), even a legitimate receiver cannot demodulate the decoded signal $d_i$ only by the pseudo random number.

In the example (3) of the output $s_i$ shown in FIG. 3, the setting is as follows:
when $x_i = 0$ and $r_i = 0$ and $f_i = 0$, $s_i = 1$; and
when $x_i = 0$ and $r_i = 0$ and $f_i = 1$, $s_i = 1$.

however, in this example (3), the same value 1 is assigned as the two kinds of the output (output corresponding to the respective physical random number $f_i=0, 1$) $s_i$ associated with the single pseudo random number $r_i=0$, therefore, the physical random number $f_i$ does not function and the pseudo random number $r_i=0$ corresponds to both the two existing pairs of the plain text $x_i=0$ and the output $s_i=0$, hence the condition in the above-mentioned item [III] cannot be met and the pseudo random number $r_i$ can be determined uniquely by a known plain text attack.

Every setting pattern possible with the 2-2-2 type (the output $s_i$ for the set of $x_i$, $r_i$, and $f_i$) corresponds to any one of the outputs $s_i$ in the examples (1) to (3) shown in FIG. 3, therefore, the 2-2-2 type modulation three-variable function (encode table) $s_i=M(x_i, r_i, f_i)$ capable of realizing mapping that simultaneously meets all of the conditions in the above-mentioned items [I], [II], and [III] does not exist.

[3-2] 2-2-4 Type

Next, FIG. 4 shows an example of the 2-2-4 type modulation three-variable function (encode table) the configuration of which is smaller than that of the 4-2-4 type and larger than that of the 2-2-2 type, that is, an example of the modulation three-variable function (encode table) $s_i=M(x_i, r_i, f_i)$ when the number of states of the pseudo random number $r_i$ is 2 and the number of states of the physical random number $f_i$ is 2 and the number of states of the modulation output $s_i$ is 4. Here, it is assumed that $r_i \in \{0, 1\}$, $f_i \in \{0, 1\}$, and $s_i \in \{0, 1, 2, 3\}$. In FIG. 4, examples (1) to (5) of the output (discrete value) $s_i$ are shown for the four kinds of set of the pseudo random number $r_i$ and the physical random number $f_i$ when the plain text $x_i$ is "0" and the four kinds of set of the pseudo random number $r_i$ and the physical random number $f_i$ when the plain text $x_i$ is "1", that is, in total, for the eight kinds of set of $x_i$, $r_i$, and $f_i$.

The setting in the example (1) of the output $s_i$ shown in FIG. 4 is the same as that in the example (1) in FIG. 3, therefore, as described above, at the time of demodulating of the decoded signal $d_i$ ($=s_i$) in the demodulation section 22, when the pseudo random number $r_i=0$ for the decoded signal $d_i=0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, the condition in the above-mentioned item [I] cannot be met.

The setting in the example (2) of the output $s_i$ shown in FIG. 4 is the same as that in the example (2) in FIG. 3, therefore, as described above, at the time of demodulating of the decoded signal $d_i$ ($=s_i$) in the demodulation section 22, when the pseudo random number $r_i=0$ for the decoded signal $d_i=0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, the condition in the above-mentioned item [I] cannot be met.

The setting in the example (3) of the output $s_i$ shown in FIG. 4 is the same as that in the example (3) in FIG. 3, therefore, as described above, the same value 1 is assigned as the two kinds of the output (output corresponding to the respective physical random number $f_i=0, 1$) $s_i$ associated with the single pseudo random number $r_i=0$ and therefore the physical random number $f_i$ does not function, and the pseudo random number $r_i=0$ corresponds to both the two existing pairs of the plain text $x_i=0$ and the output $s_i=1$, hence the condition in the above-mentioned item [III] cannot be met and the pseudo random number $r_i$ can be determined uniquely by a known plain text attack.

In the example (4) of the output $s_i$ shown in FIG. 4, the setting is as follows:
when $x_i=0$ and $r_i=0$ and $f_i=0$, $s_i=0$;
when $x_i=0$ and $r_i=0$ and $f_i=1$, $s_i=1$;
when $x_i=0$ and $r_i=1$ and $f_i=0$, $s_i=2$; and
when $x_i=0$ and $r_i=1$ and $f_i=1$, $s_i=3$, however, in this example (4), only the single pseudo random number $r_i$ is associated with the pair of the plain text $x_i$ and the output $s_i$, therefore, the condition in the above-mentioned item [III] is not met and the pseudo random number $r_i$ can be determined uniquely by a known plain text attack.

In the example (5) of the output $s_i$ shown in FIG. 4, the setting is as follows:
when $x_i=0$ and $r_i=0$ and $f_i=0$, $s_i=0$;
when $x_i=0$ and $r_i=0$ and $f_i=1$, $s_i=1$;
when $x_i=0$ and $r_i=1$ and $f_i=0$, $s_i=0$;
when $x_i=0$ and $r_i=1$ and $f_i=1$, $s_i=1$;
when $x_i=1$ and $r_i=0$ and $f_i=0$, $s_i=2$
when $x_i=1$ and $r_i=0$ and $f_i=1$, $s_i=3$;
when $x_i=1$ and $r_i=1$ and $f_i=0$, $s_i=2$; and
when $x_i=1$ and $r_i=1$ and $f_i=1$, $s_i=3$, however, in this example (5), since the two different pseudo random numbers $r_i$ are associated with the pair of the plain text $x_i$ and the output $s_i$, therefore, the condition in the above-mentioned item [III] is met but the plain text $x_i$ corresponding to the outputs $s_i=0$ and 1 is only "0" and the plain text $x_i$ corresponding to the outputs $s_i=2$ and 3 is only "1", therefore, the condition in the above-mentioned item [II] is not met and the plain text $x_i$ corresponds to the output $s_i$ and as a result, it is possible to associated the plain text $x_i$ with the cipher text uniquely.

Every setting pattern possible with the 2-2-4 type (the output $s_i$ for the set of $x_i$, $r_i$, and $f_i$) corresponds to any one of the outputs $s_i$ in the examples (1) to (5) shown in FIG. 4, therefore, the 2-2-4 type modulation three-variable function (encode table) $s_i=M(x_i, r_i, f_i)$ capable of realizing mapping that simultaneously meets all of the conditions in the above-mentioned items [I], [II], and [III] does not exist.

[3-3] 4-2-4 Type

FIG. 5 shows an example of the 4-2-4 type modulation three-variable function (encode table), that is, an example of the modulation three-variable function (encode table) $s_i=M(x_i, r_i, f_i)$ when the number of states of the pseudo random number $r_i$ is 4 and the number of states of the physical random number $f_i$ is 2 and the number of states of the modulation output $s_i$ is 4. Here, it is assumed that $r_i \in \{0, 1, 2, 3\}$, $f_i \in \{0, 1\}$, and $s_i \in \{0, 1, 2, 3\}$. In FIG. 5, examples (1) to (7) of the output (discrete value) $s_i$ are shown for the eight kinds of set of the pseudo random number $r_i$ and the physical random number $f_i$ when the plain text $x_i$ is "0" and the eight kinds of set of the pseudo random number $r_i$ and the physical random number $f_i$ when the plain text $x_i$ is "1", that is, in total, for the 16 kinds of set of $x_i$, $r_i$, and $f_i$.

In the example (1) of the output $s_i$ shown in FIG. 5, the setting is as follows:
when $x_i=0$ and $r_i=0$ and $f_i=0$, $s_i=0$;
when $x_i=0$ and $r_i=0$ and $f_i=1$, $s_i=1$;
when $x_i=0$ and $r_i=1$ and $f_i=0$, $s_i=1$;
when $x_i=0$ and $r_i=1$ and $f_i=1$, $s_i=0$;
when $x_i=0$ and $r_i=2$ and $f_i=0$, $s_i=2$;
when $x_i=0$ and $r_i=2$ and $f_i=1$, $s_i=3$;
when $x_i=0$ and $r_i=3$ and $f_i=0$, $s_i=3$;
when $x_i=0$ and $r_i=3$ and $f_i=1$, $s_i=2$;
when $x_i=1$ and $r_i=0$ and $f_i=0$, $s_i=2$;
when $x_i=1$ and $r_i=0$ and $f_i=1$, $s_i=3$;
when $x_i=1$ and $r_i=1$ and $f_i=0$, $s_i=3$;
when $x_i=1$ and $r_i=1$ and $f_i=1$, $s_i=2$;
when $x_i=1$ and $r_i=2$ and $f_i=0$, $s_i=0$;

when $x_i=1$ and $r_i=2$ and $f_i=1$, $s_i=1$;
when $x_i=1$ and $r_i=3$ and $f_i=0$, $s_i=1$; and
when $x_i=1$ and $r_i=3$ and $f_i=1$, $s_i=0$.

This example (1) is the 4-2-4 type modulation three-variable function (encode table) $s_i=M(x_i, r_i, f_i)$ capable of realizing mapping that simultaneously meets all of the conditions in the above-mentioned items [I], [II], and [III].

Here, in the example (1), plain text $x_i=0$ corresponding to outputs $s_i=0$ is two in number and plain text $x_i=1$ corresponding to output $s_i=0$ is two in number, and this applies to other outputs $s_i=1$, 2, and 3, therefore, the condition in the above-mentioned item [III] is met. Further, in the example (1), with the pair of the plain text $x_i=0$ and the output $s_i=0$, the two different pseudo random numbers $r_i=0$ and 1 are associated one-to-one, respectively, and this applies to other pairs, therefore, the condition in the above-mentioned item [III] is met.

The encode table according to the example (1) is shown in FIG. 6(A). Further, the decode table (the demodulation two-variable function) $x_i=D(d_i, r_i)$ corresponding to the encode table shown in FIG. 6(A) is shown in FIG. 6(B). Furthermore, a table that is the decode table shown in FIG. 6(B) rewritten into binary numbers is shown in FIG. 6(C). By the way, it is apparent that the example (1) of the output $s_i$ shown in FIG. 5 meets the condition in the above-mentioned item [I] by referring to the decode table shown in FIG. 6(B) and that it meets the condition in the above-mentioned item [III] is apparent by referring to FIG. 8 to be described later. As it is apparent that the condition in the above-mentioned item [III] is met by referring to the encode table shown in FIG. 6(A) and FIG. 8 to be described later, with all of the pairs of the plain text $x_i$ and the output $s_i$, the two different pseudo random numbers $r_i$ are associated one-to-one, respectively. For example, with the pair of the plain text $x_i=0$ and the output $s_i=0$, the two different pseudo random numbers $r_i=0$, 1 are associated one-to-one, respectively, with the pair of the plain text $x_i=0$ and the output $s_i=1$, the two different pseudo random numbers $r_i=0$, 1 are associated one-to-one, respectively, and with the pair of the plain text $x_i=1$ and the output $s_i=1$, the two different pseudo random numbers $r_i=2$, 3 are associated one-to-one, respectively.

Figure 8:
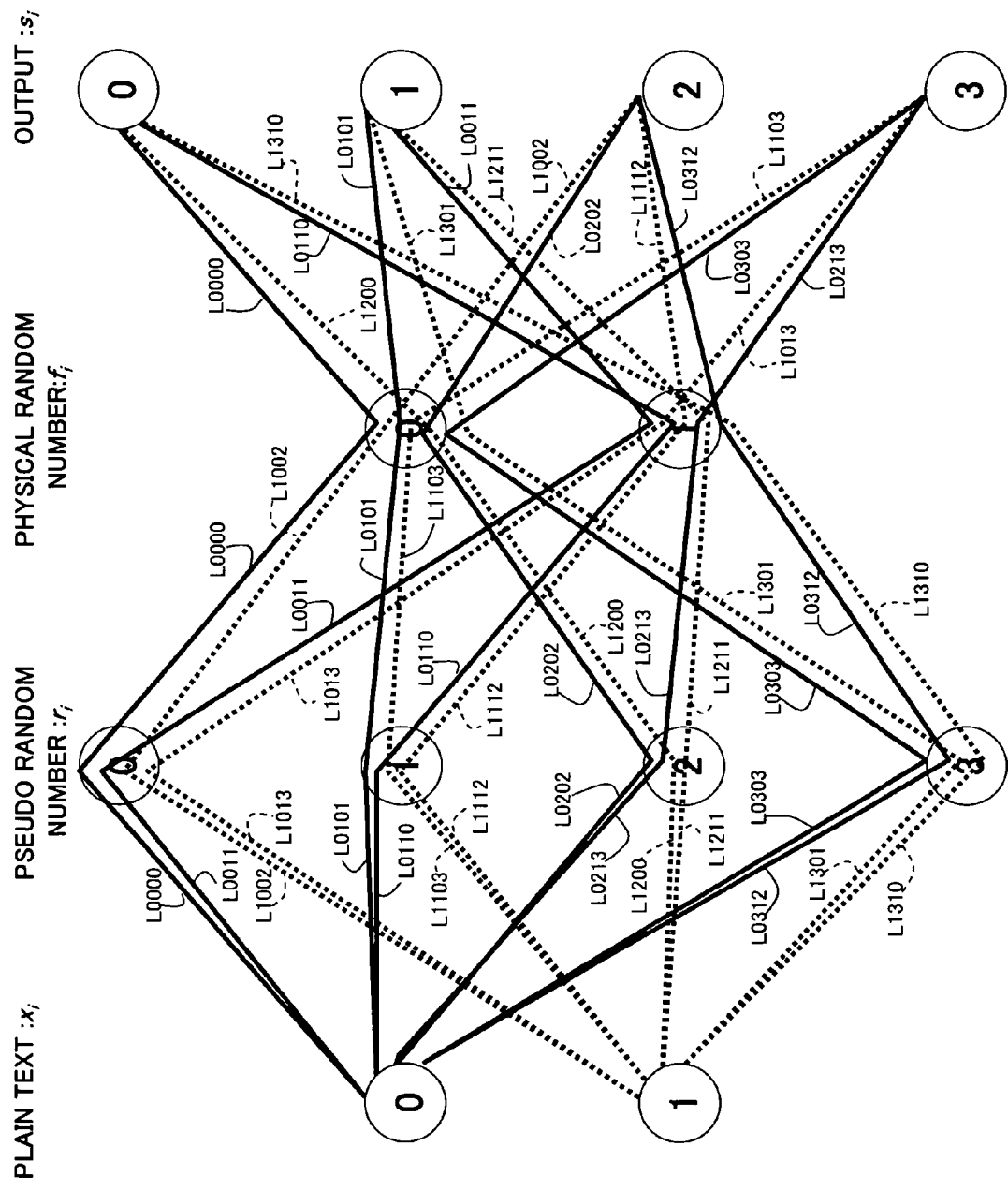
FIG. 8 is a diagram schematically showing a correspondence relationship between plain text, pseudo random number, and physical random number as to the encode table shown in FIG. 6(A).

FIG. 8 schematically shows a correspondence relationship between the plain text $x_i$, the pseudo random number $r_i$, the physical random number $f_i$, and the output $s_i$ as to the example (1) of the output $s_i$ shown in FIG. 5, that is, as to the encode table shown in FIG. 6(A). As shown in FIG. 8, according to the encode table shown in FIG. 6(A), the number of cases where the plain text $x_i$ corresponding to the output $s_i$ is "1" and the number of cases where that is "0" are equal and every correspondence relationship of the pseudo random number $r_i$ and the physical random number $f_i$ between the plain text $x_i$ and the output $s_i$ is distributed evenly (refer to the lines L0000, L0011, L0101, L0110, L0202, L0213, L0303, L0312, L1002, L1013, L1103, L1112, L1200, L1211, L1301, and L1310), and if the physical random number $f_i$ and the pseudo random number $r_i$ are random, the states of the output $s_i$ are distributed also randomly.

In the example (2) of the output $s_i$ shown in FIG. 5, the setting is as follows:
when $x_i=0$ and $r_i=0$ and $f_i=0$, $s_i=0$;
when $x_i=0$ and $r_i=0$ and $f_i=1$, $s_i=1$;
when $x_i=0$ and $r_i=1$ and $f_i=0$, $s_i=0$;
when $x_i=0$ and $r_i=1$ and $f_i=1$, $s_i=1$;
when $x_i=0$ and $r_i=2$ and $f_i=0$, $s_i=2$;
when $x_i=0$ and $r_i=2$ and $f_i=1$, $s_i=3$;
when $x_i=0$ and $r_i=3$ and $f_i=0$, $s_i=2$;
when $x_i=0$ and $r_i=3$ and $f_i=1$, $s_i=3$;
when $x_i=1$ and $r_i=0$ and $f_i=0$, $s_i=2$;
when $x_i=1$ and $r_i=0$ and $f_i=1$, $s_i=3$;
when $x_i=1$ and $r_i=1$ and $f_i=0$, $s_i=2$;
when $x_i=1$ and $r_i=1$ and $f_i=1$, $s_i=3$;
when $x_i=1$ and $r_i=2$ and $f_i=0$, $s_i=0$;
when $x_i=1$ and $r_i=2$ and $f_i=1$, $s_i=1$;
when $x_i=1$ and $r_i=3$ and $f_i=0$, $s_i=0$; and
when $x_i=1$ and $r_i=3$ and $f_i=1$, $s_i=1$.

In this example (2), a correlation is observed between the output $s_i$ and the physical random number $f_i$, however, this example (2) also meets all of the conditions in the above-mentioned items [I], [II], and [III] simultaneously, like the example (1) of the output $s_i$ shown in FIG. 5, and it is not possible to predict the pseudo random number $r_i$ by a known plain text attack, therefore, it can be used as the 4-2-4 type modulation three-variable function (encode table) $s_i=M(x_i, r_i, f_i)$.

The setting in the example (3) of the output $s_i$ shown in FIG. 5 is the same as that in the example (2) in FIG. 3, therefore, as described above, at the time of demodulating of the decoded signal $d_i$ $(=s_i)$ in the demodulation section 22, when the pseudo random number $r_i=0$ for the decoded signal $d_i=0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, the condition in the above-mentioned item [I] cannot be met.

The setting in the example (4) of the output $s_i$ shown in FIG. 5 is the same as that in the example (1) in FIG. 3, therefore, as described above, at the time of demodulating of the decoded signal $d_i$ $(=s_i)$ in the demodulation section 22, when the pseudo random number $r_i=0$ for the decoded signal $d_i=0$, for example, there are two cases where the plain text $x_i$ is "0" and "1", therefore, it is not possible to demodulate the decoded signal $d_i$ into the plain text $x_i$ by the pseudo random number $r_i$ in the demodulation section 22. In other words, the condition in the above-mentioned item [I] cannot be met.

The setting in the example (5) of the output $s_i$ shown in FIG. 5 is the same as that in the example (3) in FIG. 3, therefore, as described above, the same value 1 is assigned as the two kinds of the output (output corresponding to the respective physical random number $f_i=0$, 1) $s_i$ associated with the single pseudo random number $r_i=0$ and therefore the physical random number $f_i$ does not function, and the pseudo random number $r_i=0$ corresponds to both the two existing pairs of the plain text $x_i=0$ and the output $s_i=1$, hence the condition in the above-mentioned item [III] cannot be met and the pseudo random number $r_i$ can be determined uniquely by a known plain text attack.

In the example (6) of the output $s_i$ shown in FIG. 5, the setting is as follows:
when $x_i=0$ and $r_i=0$ and $f_i=0$, $s_i=0$
when $x_i=0$ and $r_i=0$ and $f_i=1$, $s_i=1$
when $x_i=0$ and $r_i=1$ and $f_i=0$, $s_i=2$
when $x_i=0$ and $r_i=1$ and $f_i=1$, $s_i=3$
when $x_i=0$ and $r_i=2$ and $f_i=0$, $s_i=0$
when $x_i=0$ and $r_i=2$ and $f_i=1$, $s_i=1$
when $x_i=0$ and $r_i=3$ and $f_i=0$, $s_i=2$
when $x_i=0$ and $r_i=3$ and $f_i=1$, $s_i=3$
when $x_i=1$ and $r_i=0$ and $f_i=0$, $s_i=2$
when $x_i=1$ and $r_i=0$ and $f_i=1$, $s_i=3$
when $x_i=1$ and $r_i=1$ and $f_i=0$, $s_i=0$
when $x_i=1$ and $r_i=1$ and $f_i=1$, $s_i=1$
when $x_i=1$ and $r_i=2$ and $f_i=0$, $s_i=2$
when $x_i=1$ and $r_i=2$ and $f_i=1$, $s_i=3$
when $x_i=1$ and $r_i=3$ and $f_i=0$, $s_i=0$, and
when $x_i=1$ and $r_i=3$ and $f_i=1$, $s_i=1$.

This example (6) is also the 4-2-4 type modulation three-variable function (encode table) $s_i = M(x_i, r_i, f_i)$ capable of realizing mapping that simultaneously meets all of the conditions in the above-mentioned items [I], [II], and [III], like the example (1) of the output $s_i$ shown in FIG. 5. This example (6) is equivalent to one in which the values "1" and "2" of the pseudo random number are exchanged as to the correspondence relationship between the pseudo random number $r_i$ and the output $s_i$ in the above-mentioned example (2).

In the example (7) of the output $s_i$ shown in FIG. 5, the setting is as follows:
when $x_i=0$ and $r_i=0$ and $f_i=0$, $s_i=0$
when $x_i=0$ and $r_i=0$ and $f_i=1$, $s_i=1$
when $x_i=0$ and $r_i=1$ and $f_i=0$, $s_i=3$
when $x_i=0$ and $r_i=1$ and $f_i=1$, $s_i=2$
when $x_i=0$ and $r_i=2$ and $f_i=0$, $s_i=2$
when $x_i=0$ and $r_i=2$ and $f_i=1$, $s_i=3$
when $x_i=0$ and $r_i=3$ and $f_i=0$, $s_i=1$
when $x_i=0$ and $r_i=3$ and $f_i=1$, $s_i=0$
when $x_i=1$ and $r_i=0$ and $f_i=0$, $s_i=2$
when $x_i=1$ and $r_i=0$ and $f_i=1$, $s_i=3$
when $x_i=1$ and $r_i=1$ and $f_i=0$, $s_i=1$
when $x_i=1$ and $r_i=1$ and $f_i=1$, $s_i=0$
when $x_i=1$ and $r_i=2$ and $f_i=0$, $s_i=0$
when $x_i=1$ and $r_i=2$ and $f_i=1$, $s_i=1$
when $x_i=1$ and $r_i=3$ and $f_i=0$, $s_i=3$ and
when $x_i=1$ and $r_i=3$ and $f_i=1$, $s_i=2$.

This example (7) is also the 4-2-4 type modulation three-variable function (encode table) $s_i = M(x_i, r_i, f_i)$ capable of realizing mapping that simultaneously meets all of the conditions in the above-mentioned items [I], [II], and [III], like the example (1) of the output $s_i$ shown in FIG. 5. This example (7) is equivalent to one in which the values "1" and "3" of the pseudo random number are exchanged as to the correspondence relationship between the pseudo random number $r_i$ and the output $s_i$ in the above-mentioned example (1). The encode table according to the example (7) is shown in FIG. 7(A). Further, the decode table (the demodulation two-variable function) $x_i = D(d_i, r_i)$ corresponding to the encode table shown in FIG. 7(A) is shown in FIG. 7(B). Furthermore, a table that is the decode table shown in FIG. 7(B) rewritten into binary numbers is shown in FIG. 7(C).

Figure 9:
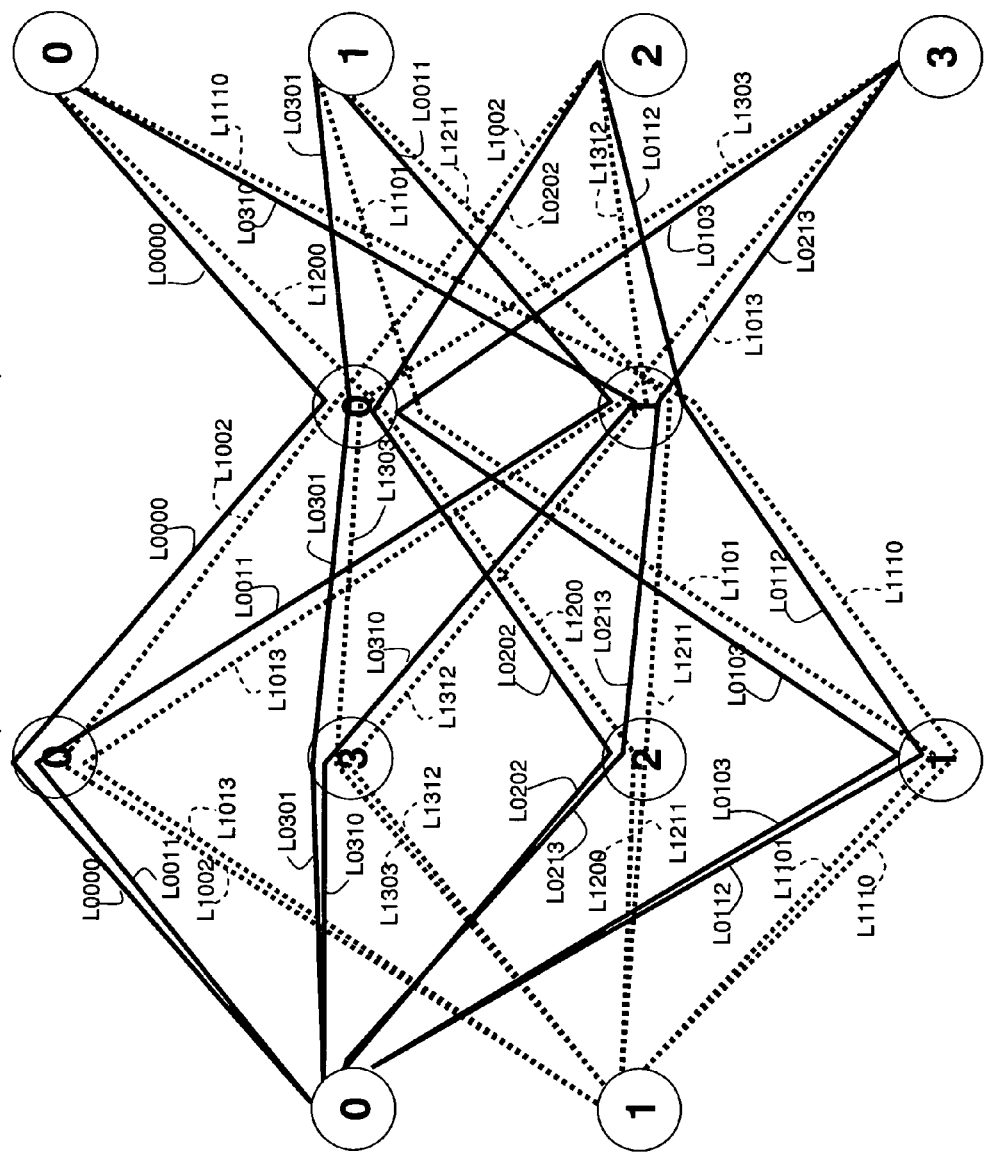
FIG. 9 is a diagram schematically showing a correspondence relationship between plain text, pseudo random number, and physical random number as to the encode table shown in FIG. 7(A).

FIG. 9 schematically shows a correspondence relationship between the plain text $x_i$, the pseudo random number $r_i$, the physical random number $f_i$, and the output $s_i$ as to the example (7) of the output $s_i$ shown in FIG. 5, that is, as to the encode table shown in FIG. 7(A). As shown in FIG. 9, according to the encode table shown in FIG. 7(A), the number of cases where the plain text $x_i$ corresponding to the output $s_i$ is "1" and the number of cases where that is "0" are equal like the example shown in FIG. 8 and every correspondence relationship of the pseudo random number $r_i$ and the physical random number $f_i$ between the plain text $x_i$ and the output $s_i$ is distributed evenly (refer to the lines L0000, L0011, L0301, L0310, L0202, L0213, L0103, L0112, L1002, L1013, L1303, L1312, L1200, L1211, L1101, and L1110), and if the physical random number $f_i$ and the pseudo random number $r_i$ are random, the states of the output $s_i$ are distributed also randomly.

By the way, by referring to the decode table shown in FIG. 6(C), which is the decode table shown in FIG. 6(B) rewritten into binary numbers, the XOR of the high order bit of the two bits of the decoded signal $d_i$ and the plain text $x_i$ corresponds to the higher order bit of the two bits of the pseudo random number $r_i$. In other words, in the decode table shown in FIG. 6(C), when an interceptor acquires the plain text $x_i$ and the decoded signal $d_i$ channel-decoded from the cipher text $c_i$ corresponding to the plain text $x_i$ and tries to make a known plain text attack, the one-bit information, which the interceptor cannot manage to know even by the known plain text attack because of an irregular association with a one-bit physical random number, corresponds the low order bit of the pseudo random number. In contrast to this, in the decode table shown in FIG. 7(C), which is the decode table shown in FIG. 7(B) rewritten into binary numbers, the one-bit information that the interceptor cannot manage to know even by the known plain text attack corresponds to the one-bit information as to whether the pseudo random number is "00 or 11" or "01 or 10".

As described above, some of the setting patterns (the output $s_i$ for the set of $x_i$, $r_i$, $f_i$) possible with the 4-2-4 type may not meet one or two or more of the conditions in the above-mentioned items [I] to [III] as shown in the examples (3) to (5) of the output $s_i$ shown in FIG. 5, however, as the examples (1), (2), (6), and (7) of the output $s_i$ shown in FIG. 5, it is possible to set the 4-2-4 type modulation three-variable function (encode table) $s_i = M(x_i, r_i, f_i)$ that can realize mapping that simultaneously meets all of the conditions in the above-mentioned items [I] to [III]. In the modulation section 13 in the encryptor 10 in the present embodiment, modulation of the plain text $x_i$ is performed using such the 4-2-4 type modulation three-variable function (encode table) $s_i = M(x_i, r_i, f_i)$, for example, the encode table shown in FIG. 6(A) or FIG. 7(A). Then, in the demodulation section 22 in the cryptogram decoder 20 in the present embodiment, demodulation of the decoded signal $d_i$ is performed using the decode table (demodulation two-variable function) $x_i = D(d_i, r_i)$ corresponding to the 4-2-4 type modulation three-variable function (encode table) $s_i = M(x_i, r_i, f_i)$ used for the modulation, for example, FIG. 6(B) or FIG. 6(C), or FIG. 7(B) or FIG. 7(C).

Here, as the 4-2-4 type modulation three-variable function (encode table) $s_i = M(x_i, r_i, f_i)$ capable of realizing mapping that simultaneously meets all of the conditions in the above-mentioned items [I] to [III], only four sets of the examples (1), (2), (6), and (7) shown in FIG. 5 are-shown, however, based on calculation, 23,040 sets (encode tables) including the four sets of the examples (1), (2), (6), and (7) shown in FIG. 5 are possible.

In the set of the 23,040 encode tables, there exist six typical elements (encode tables) and it is possible to completely express 23,040 equivalent patterns by performing replacement of the values of the pseudo random number $r_i$ and further performing replacement of the values of the physical random number $f_i$ as to the relationship between the pseudo random number $r_i$, the physical random number $f_i$, and the output $s_i$ of the respective typical elements.

For example, in the typical element 1 shown in FIG. 20, the setting is as follows:
when $x_i=0$ and $r_i=0$ and $f_i=0$, $s_i=0$
when $x_i=0$ and $r_i=0$ and $f_i=1$, $s_i=1$
when $x_i=0$ and $r_i=1$ and $f_i=0$, $s_i=0$
when $x_i=0$ and $r_i=1$ and $f_i=1$, $s_i=1$
when $x_i=0$ and $r_i=2$ and $f_i=0$, $s_i=2$
when $x_i=0$ and $r_i=2$ and $f_i=1$, $s_i=3$
when $x_i=0$ and $r_i=3$ and $f_i=0$, $s_i=2$
when $x_i=0$ and $r_i=3$ and $f_i=1$, $s_i=3$
when $x_i=1$ and $r_i=0$ and $f_i=0$, $s_i=2$
when $x_i=1$ and $r_i=0$ and $f_i=1$, $s_i=3$
when $x_i=1$ and $r_i=1$ and $f_i=0$, $s_i=2$
when $x_i=1$ and $r_i=1$ and $f_i=1$, $s_i=3$
when $x_i=1$ and $r_i=2$ and $f_i=0$, $s_i=0$
when $x_i=1$ and $r_i=2$ and $f_i=1$, $s_i=1$
when $x_i=1$ and $r_i=3$ and $f_i=0$, $s_i=0$ and
when $x_i=1$ and $r_i=3$ and $f_i=1$, $s_i=1$.

The typical element 1 is equal to the example (2) in FIG. 5, however, if "1" and "2" of the pseudo random number $r_i$ are replaced when the plain text is "0" and "1" and "2" of the pseudo random number $r_i$ are further replaced when the plain text is "1", the typical element 1 is equal to the example (6) in FIG. 5. In this way, it is necessary to always perform replacement of the pseudo random number $r_i$ and replacement of the corresponding pseudo random number $r_i$ at the same time for both the case where the plain text $x_i$ is "0" and the case where the plain text $x_i$ is "1". On the other hand, this does not apply to replacement of the physical random number $f_i$ and it is possible to perform replacement of "0" and "1" of physical random number belonging to the same pseudo random number $r_i$ independently for the case where the plain text $x_i$ is "0" and the case where the plain text $x_i$ is "1", respectively. Therefore, the typical element 1 has six ways of replacement of the pseudo random number $r_i$ and 256 ways of replacement of the physical random number $f_i$ for the respective ways, and in total, 6×256=1,536 ways of modification are possible.

Next, in the typical element 2 shown in FIG. 20, the setting is as follows:
when $x_i$=0 and $r_i$=0 and $f_i$=0, $s_i$=0
when $x_i$=0 and $r_i$=0 and $f_i$=1, $s_i$=1
when $x_i$=0 and $r_i$=1 and $f_i$=0, $s_i$=0
when $x_i$=0 and $r_i$=1 and $f_i$=1, $s_i$=2
when $x_i$=0 and $r_i$=2 and $f_i$=0, $s_i$=1
when $x_i$=0 and $r_i$=2 and $f_i$=1, $s_i$=3
when $x_i$=0 and $r_i$=3 and $f_i$=0, $s_i$=2
when $x_i$=0 and $r_i$=3 and $f_i$=1, $s_i$=3
when $x_i$=1 and $r_i$=0 and $f_i$=0, $s_i$=2
when $x_i$=1 and $r_i$=0 and $f_i$=1, $s_i$=3
when $x_i$=1 and $r_i$=1 and $f_i$=0, $s_i$=1
when $x_i$=1 and $r_i$=1 and $f_i$=1, $s_i$=3
when $x_i$=1 and $r_i$=2 and $f_i$=0, $s_i$=0
when $x_i$=1 and $r_i$=2 and $f_i$=1, $s_i$=2
when $x_i$=1 and $r_i$=3 and $f_i$=0, $s_i$=0 and
when $x_i$=1 and $r_i$=3 and $f_i$=1, $s_i$=1.

The typical element 2 has 24 ways of replacement of the pseudo random number $r_i$ and 256 ways of replacement of the physical random number $f_i$ for the respective ways, therefore, in total, 24×256=6,144 ways of modification are possible.

Next, in the typical element 3 shown in FIG. 20, the setting is as follows:
when $x_i$=0 and $r_i$=0 and $f_i$=0, $s_i$=0
when $x_i$=0 and $r_i$=0 and $f_i$=1, $s_i$=1
when $x_i$=0 and $r_i$=1 and $f_i$=0, $s_i$=0
when $x_i$=0 and $r_i$=1 and $f_i$=1, $s_i$=3
when $x_i$=0 and $r_i$=2 and $f_i$=0, $s_i$=1
when $x_i$=0 and $r_i$=2 and $f_i$=1, $s_i$=2
when $x_i$=0 and $r_i$=3 and $f_i$=0, $s_i$=2
when $x_i$=0 and $r_i$=3 and $f_i$=1, $s_i$=3
when $x_i$=1 and $r_i$=0 and $f_i$=0, $s_i$=2
when $x_i$=1 and $r_i$=0 and $f_i$=1, $s_i$=3
when $x_i$=1 and $r_i$=1 and $f_i$=0, $s_i$=1
when $x_i$=1 and $r_i$=1 and $f_i$=1, $s_i$=2
when $x_i$=1 and $r_i$=2 and $f_i$=0, $s_i$=0
when $x_i$=1 and $r_i$=2 and $f_i$=1, $s_i$=3
when $x_i$=1 and $r_i$=3 and $f_i$=0, $s_i$=0 and
when $x_i$=1 and $r_i$=3 and $f_i$=1, $s_i$=1.

The typical element 3 has 24 ways of replacement of the pseudo random number $r_i$ and 256 ways of replacement of the physical random number $f_i$ for the respective ways, therefore, in total, 24×256=6,144 ways of modification are possible.

Next, in the typical element 4 shown in FIG. 20, the setting is as follows:
when $x_i$=0 and $r_i$=0 and $f_i$=0, $s_i$=0
when $x_i$=0 and $r_i$=0 and $f_i$=1, $s_i$=2
when $x_i$=0 and $r_i$=1 and $f_i$=0, $s_i$=0
when $x_i$=0 and $r_i$=1 and $f_i$=1, $s_i$=2
when $x_i$=0 and $r_i$=2 and $f_i$=0, $s_i$=1
when $x_i$=0 and $r_i$=2 and $f_i$=1, $s_i$=3
when $x_i$=0 and $r_i$=3 and $f_i$=0, $s_i$=1
when $x_i$=0 and $r_i$=3 and $f_i$=1, $s_i$=3
when $x_i$=1 and $r_i$=0 and $f_i$=0, $s_i$=1
when $x_i$=1 and $r_i$=0 and $f_i$=1, $s_i$=3
when $x_i$=1 and $r_i$=1 and $f_i$=0, $s_i$=1
when $x_i$=1 and $r_i$=1 and $f_i$=1, $s_i$=3
when $x_i$=1 and $r_i$=2 and $f_i$=0, $s_i$=0
when $x_i$=1 and $r_i$=2 and $f_i$=1, $s_i$=2
when $x_i$=1 and $r_i$=3 and $f_i$=0, $s_i$=0 and
when $x_i$=1 and $r_i$=3 and $f_i$=1, $s_i$=2.

The typical element 4 has six ways of replacement of the pseudo random number $r_i$ and 256 ways of replacement of the physical random number $f_i$ for the respective ways, therefore, in total, 6×256=1,536 ways of modification are possible.

Next, in the typical element 5 shown in FIG. 20, the setting is as follows:
when $x_i$=0 and $r_i$=0 and $f_i$=0, $s_i$=0
when $x_i$=0 and $r_i$=0 and $f_i$=1, $s_i$=2
when $x_i$=0 and $r_i$=1 and $f_i$=0, $s_i$=0
when $x_i$=0 and $r_i$=1 and $f_i$=1, $s_i$=3
when $x_i$=0 and $r_i$=2 and $f_i$=0, $s_i$=1
when $x_i$=0 and $r_i$=2 and $f_i$=1, $s_i$=2
when $x_i$=0 and $r_i$=3 and $f_i$=0, $s_i$=1
when $x_i$=0 and $r_i$=3 and $f_i$=1, $s_i$=3
when $x_i$=1 and $r_i$=0 and $f_i$=0, $s_i$=1
when $x_i$=1 and $r_i$=0 and $f_i$=1, $s_i$=3
when $x_i$=1 and $r_i$=1 and $f_i$=0, $s_i$=1
when $x_i$=1 and $r_i$=1 and $f_i$=1, $s_i$=2
when $x_i$=1 and $r_i$=2 and $f_i$=0, $s_i$=0
when $x_i$=1 and $r_i$=2 and $f_i$=1, $s_i$=3
when $x_i$=1 and $r_i$=3 and $f_i$=0, $s_i$=0 and
when $x_i$=1 and $r_i$=3 and $f_i$=1, $s_i$=2.

The typical element 5 has 24 ways of replacement of the pseudo random number $r_i$ and 256 ways of replacement of the physical random number $f_i$ for the respective ways, therefore, in total, 24×256=6,144 ways of modification are possible.

Next, in the typical element 6 shown in FIG. 20, the setting is as follows:
when $x_i$=0 and $r_i$=0 and $f_i$=0, $s_i$=0
when $x_i$=0 and $r_i$=0 and $f_i$=1, $s_i$=3
when $x_i$=0 and $r_i$=1 and $f_i$=0, $s_i$=0
when $x_i$=0 and $r_i$=1 and $f_i$=1, $s_i$=3
when $x_i$=0 and $r_i$=2 and $f_i$=0, $s_i$=1
when $x_i$=0 and $r_i$=2 and $f_i$=1, $s_i$=2
when $x_i$=0 and $r_i$=3 and $f_i$=0, $s_i$=1
when $x_i$=0 and $r_i$=3 and $f_i$=1, $s_i$=2
when $x_i$=1 and $r_i$=0 and $f_i$=0, $s_i$=1
when $x_i$=1 and $r_i$=0 and $f_i$=1, $s_i$=2
when $x_i$=1 and $r_i$=1 and $f_i$=0, $s_i$=1
when $x_i$=1 and $r_i$=1 and $f_i$=1, $s_i$=2
when $x_i$=1 and $r_i$=2 and $f_i$=0, $s_i$=0
when $x_i$=1 and $r_i$=2 and $f_i$=1, $s_i$=3
when $x_i$=1 and $r_i$=3 and $f_i$=0, $s_i$=0 and
when $x_i$=1 and $r_i$=3 and $f_i$=1, $s_i$=3.

The typical element 6 has six ways of replacement of the pseudo random number $r_i$ and 256 ways of replacement of the physical random number $f_i$ for the respective ways, therefore, in total, 6×256=1,536 ways of modification are possible.

As described above, by performing replacement of the pseudo random number $r_i$ and the physical random number $f_i$ as to the respective typical elements 1 to 6 shown in FIG. 20, 1,536 way of modification are possible for the respective typical elements 1, 4, and 6 and 6,144 ways of modification are possible for the respective typical elements 2, 3, and 5, and in total, all of the $1{,}536 \times 3 + 6{,}144 \times 3 = 23{,}040$ encode tables that satisfy all of the conditions in the above-mentioned items [I] to [III] can be completely expressed.

By the way, the replacement of the pseudo random number $r_i$ and the physical random number $f_i$ for the respective typical elements 1 to 6 described above is generalized and explained below. Here, it is premised that a serial number given to each one bit of plain text as input data is i, a number assigned to a set pattern of input data (plain text), a pseudo random number, a physical random number, and a discrete number (output) is k (k is an integer from 0 through 15), the input data (plain text) is $x_{k,i}$, the pseudo random number is $r_{k,i}$, the physical random number is $f_{k,i}$, and the discrete value (output) is $s_{k,i}$, and when k is any one of integers from 0 through 7, the input data $x_{k,i}=0$; when k is any one of integers from 8 through 15, the input data $x_{k,i}=1$; when k is any one of integers 0, 1, 8, and 9, the pseudo random number $r_{k,i}=0$; when k is any one of integers 2, 3, 10, and 11, the pseudo random number $r_{k,i}=1$; when k is any one of integers 4, 5, 12, and 13, the pseudo random number $r_{k,i}=2$; when k is any one of integers 6, 7, 14, and 15, the pseudo random number $r_{k,i}=3$; when k is an even number, the physical random number $f_{k,i}=0$; and when k is an odd number, the physical random number $f_{k,i}=1$, then a typical set $S_j=(s_{0,i}, s_{1,i}, s_{2,i}, s_{3,i}, s_{4,i}, s_{5,i}, s_{6,i}, s_{7,i}, s_{8,i}, s_{9,i}, s_{10,i}, s_{11,i}, s_{12,i}, s_{13,i}, s_{14,i}, s_{15,i})$ (j is an integer from 1 through 6) of the discrete value (output) $s_{k,i}$ is $S_1 = (0,1,0,1,2,3,2,3,2,3,2,3,0,1,0,1)$
$S_2 = (0,1,0,2,1,3,2,3,2,3,1,3,0,2,0,1)$
$S_3 = (0,1,0,3,1,2,2,3,2,3,1,2,0,3,0,1)$
$S_4 = (0,2,0,2,1,3,1,3,1,3,1,3,0,2,0,2)$
$S_5 = (0,2,0,3,1,2,1,3,1,3,1,2,0,3,0,2)$
$S_6 = (0,3,0,3,1,2,1,2,1,2,1,2,0,3,0,3)$.

These six kinds of the typical sets $S_1$ to $S_6$ correspond to the respective typical elements 1 to 6 described above.

At this time, a set $S'_j=(s'_{0,i}, s'_{1,i}, s'_{2,i}, s'_{3,i}, s'_{4,i}, s'_{5,i}, s'_{6,i}, s'_{7,i}, s'_{8,i}, s'_{9,i}, s'_{10,i}, s'_{11,i}, s'_{12,i}, s'_{13,i}, s'_{14,i}, s'_{15,i})$ obtained by: defining two numerical values respectively given as any one of integers from 0 through 3 as u and v, respectively; defining a numerical value given as an integer not selected as the numerical value u or v among integers from 0 through 3 as w; and performing the following replacement $s'_{2u,i} = s_{2v,i}$
$s'_{2u+1,i} = s_{2v+1,i}$
$s'_{2u+8,i} = s_{2v+8,i}$
$s'_{2u+9,i} = s_{2v+9,i}$
$s'_{2w,i} = s_{2w,i}$
$s'_{2w+1,i} = s_{2w+1,i}$
$s'_{2w+8,i} = s_{2w+8,i}$
$s'_{2w+9,i} = s_{2w+9,i}.$ as to the discrete value (output) $s_{k,i}$ in the respective six kinds of typical sets $S_j$ described above, may also be used as an equivalent encode table that satisfies all of the conditions in the above-mentioned items [I] to [III]. For example, when it is assumed that u=0, v=1, and w=2, 3, in each set $S_j$, replacement of $s_{0,i}$ with $s_{2,i}$, replacement of $s_{1,i}$ with $s_{3,i}$, replacement of $s_{8,i}$ with $s_{10,i}$, and replacement of $s_{9,i}$ with $s_{11,i}$ are performed. In other words, replacement of pseudo random number $r_{0,i}$ with pseudo random number $r_{2,i}$, replacement of pseudo random number $r_{1,i}$ with pseudo random number $r_{3,i}$, replacement of pseudo random number $r_{8,i}$ with pseudo random number $r_{10,i}$, and replacement of pseudo random number $r_{9,i}$ with pseudo, random number $r_{11,i}$ are performed and replacement is not performed for other pseudo random numbers as a result, therefore, it is possible to use each $S'_j$ in which such replacements are performed as an equivalent encode table that satisfies all of the conditions in the above-mentioned items [I] to [III].

Further, a set $S''_j=(s''_{0,i}, s''_{1,i}, s''_{2,i}, s''_{3,i}, s''_{4,i}, s''_{5,i}, s''_{6,i}, s''_{7,i}, s''_{8,i}, s''_{9,i}, s''_{10,i}, s''_{11,i}, s''_{12,i}, s''_{13,i}, s''_{14,i}, s''_{15,i})$ obtained by: defining a numerical value given as an integer among integers from 0 through 7 as m; defining a numerical value given as an integer not selected as the numerical value m among integers from 0 through 7 as n; and performing the following replacement $s''_{2m+1,i} = s'_{2m,i}$
$s''_{2m,i} = s'_{2m+1,i}$
$s''_{2n,i} = s'_{2n,i}$
$s''_{2n+1,i} = s'_{2n+1,i}$ as to the discrete value (output) $s'_{k,i}$ in the respective six kinds of typical sets $S'_j$ described above, may also be used as an equivalent encode table that satisfies all of the conditions in the above-mentioned items [I] to [III]. For example, when it is assumed that m=0, 5 and n=1, 2, 3, 4, 5, 6, 7, 8, replacement of $s'_{0,i}$ with $s'_{1,i}$ and replacement of $s'_{10,i}$ with $s'_{11,i}$, are performed in each set $S'_j$. In other words, replacement of physical random number $f_{0,i}$ with physical random number $f_{1,i}$ and replacement of physical random number $f_{10,i}$ with physical random number $f_{11,i}$ are performed and replacement is not performed for other physical random numbers as a result, therefore, it is also possible to use each $S''_j$ in which such replacements are performed as an equivalent encode tabel that satisfies all of the conditions in the above-mentioned items [I] to [III].

[3-4]8-2-4 Type

Here, the case where the number of states of pseudo random number $r_i$ is 4 is explained, however, the number of states of pseudo random number $r_i$ may be 8. FIG. 10 shows an example of the 8-2-4 type modulation three-variable function (encode table), that is, an example of the modulation three-variable function (encode table) $s_i = M(x_i, r_i, f_i)$ in the case where the number of states of pseudo random number is $r_i$ is 8 and the number of states of physical random number $f_i$ is 2 and the number of states of modulated modulation output $s_i$ is 4. Here, it is assumed that $r_i \in \{0, 1, 2, 3, 4, 5, 6, 7\}$, $f_i \in \{0, 1\}$, and $s_i \in \{0, 1, 2, 3\}$. In FIG. 10, the example (1) of the output (discrete value) $s_i$ is shown for 16 sets of pseudo random number $r_i$ and physical random number $f_i$ in the case where plain text $x_i$ is "0" and 16 sets of pseudo random number $r_i$ and physical random number $f_i$ in the case where plain text $x_i$ is "1", that is, for 32 sets in total of $x_i$, $r_i$, and $f_i$.

In the example (1) of the output $s_i$ shown in FIG. 10, the setting is as follows:
when $x_i=0$ and $r_i=0$ and $f_i=0$, $s_i=0$
when $x_i=0$ and $r_i=0$ and $f_i=1$, $s_i=1$
when $x_i=0$ and $r_i=1$ and $f_i=0$, $s_i=1$
when $x_i=0$ and $r_i=1$ and $f_i=1$, $s_i=0$
when $x_i=0$ and $r_i=2$ and $f_i=0$, $s_i=0$
when $x_i=0$ and $r_i=2$ and $f_i=1$, $s_i=1$
when $x_i=0$ and $r_i=3$ and $f_i=0$, $s_i=1$
when $x_i=0$ and $r_i=3$ and $f_i=1$, $s_i=0$
when $x_i=0$ and $r_i=4$ and $f_i=0$, $s_i=2$
when $x_i=0$ and $r_i=4$ and $f_i=1$, $s_i=3$
when $x_i=0$ and $r_i=5$ and $f_i=0$, $s_i=3$
when $x_i=0$ and $r_i=5$ and $f_i=1$, $s_i=2$
when $x_i=0$ and $r_i=6$ and $f_i=0$, $s_i=2$
when $x_i=0$ and $r_i=6$ and $f_i=1$, $s_i=3$ when $x_i=0$ and $r_i=7$ and $f_i=0$, $s_i=3$
when $x_i=0$ and $r_i=7$ and $f_i=1$, $s_i=2$
when $x_i=1$ and $r_i=0$ and $f_i=0$, $s_i=2$
when $x_i=1$ and $r_i=0$ and $f_i=1$, $s_i=3$
when $x_i=1$ and $r_i=1$ and $f_i=0$, $s_i=3$
when $x_i=1$ and $r_i=1$ and $f_i=1$, $s_i=2$
when $x_i=1$ and $r_i=2$ and $f_i=0$, $s_i=2$
when $x_i=1$ and $r_i=2$ and $f_i=1$, $s_i=3$
when $x_i=1$ and $r_i=3$ and $f_i=0$, $s_i=3$
when $x_i=1$ and $r_i=3$ and $f_i=1$, $s_i=2$
when $x_i=1$ and $r_i=4$ and $f_i=0$, $s_i=0$
when $x_i=1$ and $r_i=4$ and $f_i=1$, $s_i=1$
when $x_i=1$ and $r_i=5$ and $f_i=0$, $s_i=1$
when $x_i=1$ and $r_i=5$ and $f_i=1$, $s_i=0$
when $x_i=1$ and $r_i=6$ and $f_i=0$, $s_i=0$
when $x_i=1$ and $r_i=6$ and $f_i=1$, $s_i=1$
when $x_i=1$ and $r_i=7$ and $f_i=0$, $s_i=1$ and
when $x_i=1$ and $r_i=7$ and $f_i=1$, $s_i=0$.

This example (1) is the 8-2-4 type modulation three-variable function (encode table) $s_i=M(x_i, r_i, f_i)$ capable of realizing mapping that simultaneously meets all of the conditions in the above-mentioned items [I], [II], and [III].

Some of the setting patterns (the output $s_i$ for the set of $x_i$, $r_i$, $f_i$) possible with the 8-2-4 type may also not meet all of the conditions in the above-mentioned items [I] to [III] as shown in the examples (3) to (5) of the output $s_i$ shown in FIG. 5, however, as the example (1) of the output $s_i$ shown in FIG. 10, it is possible to set the 8-2-4 type modulation three-variable function (encode table) $s_i=M(x_i, r_i, f_i)$ that can realize mapping that simultaneously meets all of the conditions in the above-mentioned items [I] to [III]. It may also be possible to configure so that in the modulation section 13 in the encryptor 10 in the present embodiment, modulation of the plain text $x_i$ is performed using such 8-2-4 type modulation three-variable function (encode table) $s_i=M(x_i, r_i, f_i)$ and in the demodulation section 22 in the cryptogram decoder 20 in the present embodiment, demodulation of the decoded signal $d_i$ is performed using the decode table (demodulation two-variable function) $x_i=D(d_i, r_i)$ corresponding to the 8-2-4 type modulation three-variable function (encode table) $s_i=M(x_i, r_i, f_i)$ used for the modulation.

[4] Encryption Procedure in the First Embodiment

Next, an encryption procedure (operation of the encryptor 10) in the first embodiment, more specifically, an encryption procedure in the case where one bit of plain text $x_i$ is transmitted using the encode table shown in FIG. 7(A) will be explained.

At the time of transmission of one bit of plain text $x_i$, when, for example, the pseudo random number $r_i$ generated by the pseudo random number generator 11 is "2" and the physical random number $f_i$ generated by the physical random number generator 12 is "1", and if the plain text $x_i$ to be transmitted is "0", $M(0, 2, 1)=3$ is output as the output $s_i$ of the modulation section 13 and if the plain text $x_i$ to be transmitted is "1", $M(1, 2, 1)=1$ is output as the output $s_i$ of the modulation section 13.

Here, it is assumed that the physical random number $f_i$ is "1", however, there is the possibility that the physical random number $f_i$ may be "0" in addition to "1". In other words, in accordance with the encode table shown in FIG. 7(A), the probability that the plain text $x_i=0$ to be transmitted is modulated into the output $s_i=M(0, 2, 1)=3$ with the physical random number $f_i=1$ when the pseudo random number $r_i=2$ as described above, and the probability that it is modulated into the output $s_i=M(0, 2, 0)=2$ with the physical random number $f_i=0$ when the pseudo random number $r_i=2$ are equal. Similarly, the probability that the plain text $x_i=1$ to be transmitted is modulated into the output $s_i=M(1, 2, 1)=1$ with the physical random number $f_i=1$ when the pseudo random number $r_i=2$ as described above, and the probability that it is modulated into the output $s_i=M(1, 2, 0)=0$ with the physical random number $f_i=0$ when the pseudo random number $r_i=2$ are equal.

As described above, the output $s_i$ of the modulation section 13 is given an irregular association using the physical random number $f_i$ while maintaining a situation in which the state of the plain text $x_i$ can be judged on the side of a legitimate receiver and the output $s_i$ of the modulation section 13 channel-coded by the channel coding section 14 is the cipher text $c_i$. At this time, by using the above-mentioned encode table shown in FIG. 7(A), it is possible to demodulate the decoded signal $d_i (=s_i)$ channel-decoded from the cipher text ci into the plain text $x_i$ with the pseudo random number $r_i$ without using the physical random number $f_i$ on the legitimate receiver side (the cryptogram decoder 20 side), as will be described later, and since the number of values "0" of the plain text $x_i$ corresponding to the output $s_i$ is equal to the number of values "1" thereof, the decoded signal $d_i$ does not correspond to the value "0" or "1" of the plain text $x_i$ uniquely and further, with the pair of the decoded signal $d_i$ and the plain text $x_i$ corresponding to the decoded signal $d_i$, two different pseudo random numbers $r_i$ are associated one-to-one, therefore, the pseudo random number $r_i$ which is used for encryption (modulation) cannot be determined uniquely only by the pair.

[5] Cryptogram Decoding Procedure in the First Embodiment

Next, a cryptogram decoding procedure (operation of the cryptogram decoder 20) in the first embodiment, more specifically, a cryptogram decoding procedure in the case where the cipher text $c_i$ of the plain text $x_i$ one bit is decoded using the decode table shown in FIG. 7(B) will be explained.

In the cryptogram decoder 20 on the legitimate receiver side of the cipher text $c_i$, as described above, the demodulation pseudo random number $r_i$ in synchronization with the modulation pseudo random number $r_i$ is output based on the same encryption key K as the encryption key K having generated the modulation pseudo random number $r_i$ in the encryptor 10 by the pseudo random number generator 21. Therefore, when receiving the cipher text $c_i$ corresponding to plain text one bit, the legitimate receiver side obtains a decoded signal $d_i$ by channel-decoding the cipher text $c_i$ with the channel decoding section 23 and at the same time, in synchronization with the reception timing, the demodulation pseudo random number $r_i$ in the same state as that of the modulation pseudo random number $r_i$ used when the cipher text $c_i$ was encrypted is generated and output by the pseudo random number generator 21, the plain text $x_i$ is obtained as the value of the demodulation two-variable function $D(d_i, r_i)$ in accordance with the decode table shown in FIG. 7(B), and the decoded signal $d_i$ is demodulated into the plain text $x_i$.

For example, according to the decode table shown in FIG. 7(B), when the decoded signal $d_i=0$, if the pseudo random number $r_i=1$ or 2, then the plain text $x_i=1$, and when the decoded signal $d_i=0$, if the pseudo random number $r_i=0$ or 3, then the plain text $x_i=0$.

In this way, for the cryptogram decoder 20 on the legitimate receiver side of the cipher text $c_i$, it is possible to decode the decoded signal $d_i$ into the plain text $x_i$ only with the demodulation pseudo random number $r_i$ synchronized with the modulation pseudo random number $r_i$ without using the physical random number $f_i$.

[6] Encryption Strength in the First Embodiment

Next, the encryption strength against a cipher text only attack of the cipher text $c_i$ obtained by the encryption technique in the first embodiment will be explained. Here, a cipher text only attack made in a state in which encryption used the encode table shown in FIG. 7(A), an interceptor has intercepted and channel-decode cipher text $c_i$ and has obtained the decoded signal $d_i=0$ is explained.

For the interceptor having obtained the decoded signal $d_i=0$ by interception of the cipher text $c_i$, it is not possible to know which one the interceptor views, that is, to distinguish among the four lines L0000, L1200, L0310, and L1110 shown in FIG. 9 because the interceptor does not know the pseudo random number $r_i$ used to obtain the cipher text $c_i$. Here, the line L0000 shown in FIG. 9 corresponds to the case where the plain text $x_i=0$, the pseudo random number $r_i=0$, and the physical random number $f_i=0$, then the decoded signal $d_i=0$, the line L1200 shown in FIG. 9 corresponds to the case where the plain text $x_i=1$, the pseudo random number $r_i=2$, and the physical random number $f_i=0$, then the decoded signal $d_i=0$, the line L0310 shown in FIG. 9 corresponds to the case where the plain text $x_i=0$, the pseudo random number $r_i=3$, and the physical random number $f_i=1$, then the decoded signal $d_i=0$, and the line L1110 shown in FIG. 9 corresponds to the case where the plain text $x_i=1$, the pseudo random number $r_i=1$, and the physical random number $f_i=1$, then the decoded signal $d_i=0$.

Because of this, it is made impossible for the interceptor to decode whether the state of the plain text $x_i$ corresponding to the cipher text $c_i$ (decoded signal $d_i=0$) transmitted by the legitimate transmitter is "0" or "1". Therefore, by using the encryption technique in the present embodiment, it is possible to secure sufficient encryption strength against the cipher text only attack.

Further, by referring to FIG. 9 similarly, the encryption strength against the known plain text attack of the cipher text $c_i$ obtained using the encode table shown in FIG. 7(A) by means of the encryption technique in the present embodiment is explained. Here, a known plain text attack is explained, in which an interceptor has intercepted cipher text $c_i$ and obtained the decoded signal $d_i=0$ and further, by obtaining the plain text $x_i=1$ corresponding to the cipher text ci by a certain means, tries to predict the corresponding pseudo random number $r_i$ and further predict the encryption key K.

Even if the interceptor having intercepted the cipher text $c_i$ and obtained the decoded signal $d_i=0$ by channel-decoding the cipher text $c_i$ obtains the plain text $x_i=1$ corresponding to the cipher text $c_i$, it is not possible to know which one the interceptor views, that is, to distinguish between the two lines L1200 and L1110 because the interceptor does not know the pseudo random number $r_i$ used to obtain the cipher text $c_i$.

In other words, even if the interceptor learns that the plain text $x_i$ corresponding to the decoded signal $d_i$ channel-decoded from the cipher text $c_i$ is "1", it is not possible for the interceptor to know whether the pseudo random number $r_i$ used by the legitimate transmitter and receiver is "2" or "1". In other words, there exist two kinds of state of the pseudo random number for each one bit of the plain text predicted on the interceptor side, therefore, even if the interceptor makes a known plain text attack by obtaining, for example, a 100-bit plain text, there are $2^{100}$ patterns of randomness for the pseudo random number sequence that can be predicted from the 100 bits of the plain text and further it is necessary to perform operation for predicting an encryption key from the pseudo random number for each pattern, therefore, it can be the practically not possible to decode the cipher text $c_i$ corresponding to other part of the plain text $x_i$ already obtained by predicting the encryption key K in the known plain text attack. Particularly, the randomness of the $2^{100}$ patterns is derived from the physical random number $f_i$ generated by the physical random number generator 12, therefore, there is no possibility that a mathematical shortcut is discovered and the cipher text $c_i$ is decoded.

As also apparent from the example described above, it is possible to so configure that by associating two different pseudo random numbers $r_i$ with a pair of the decoded signal $d_i$ and the plain text $x_i$ one-to-one, the interceptor cannot judge which pseudo random number $r_i$ is used to modulate the pair. Then, the number of cases that the interceptor trying to make the known plain text attack must judge is 2, therefore, the encryption strength against the known plain text attack is improved considerably compared to the conventional cryptogram. Therefore, by using the encryption technique in the present embodiment, it is possible to secure sufficient encryption strength against a known plain text attack and guarantee a high safety.

[7] Effects in the First Embodiment

As described above, according to the encryption/cryptogram decoding technique as the first embodiment of the present invention, it is possible to demodulate the decoded signal $d_i$ obtained by channel-decoding the cipher text $c_i$ into the plain text $x_i$ only with the pseudo random number $r_i$ and by using the modulation three-variable function $s_i=M(x_i, r_i, f_i)$ for setting a corresponding relationship between the plain text $x_i$, the pseudo random number $r_i$, the physical random number $f_i$, and the output $s_i$ so that the number of the values "0" of the plain text $x_i$ corresponding to the output $s_i (=d_i)$ is equal to the number of values "1" thereof and two different pseudo random number $r_i$ are associated with the pair of the plain text $x_i$ and the output $s_i (=d_i)$ equally in number, it is also possible to modulate the plain text $x_i$ into the discrete value $s_i$ the number of states of which is 4 determined by the pseudo random number $r_i$ the number of states of which is 4 and the physical random number $f_i$ the number of states of which is 2, and then transmit the cipher text $c_i$ obtained by channel coding the output $s_i$, which is the result of the modulation, and for the legitimate receiver side having the same encryption key K as the encryption key on the legitimate transmitter side to obtain the plain text $x_i$ as decoded data from the cipher text $c_i$ using only the pseudo random number $r_i$ generated based on the encryption key K without using the physical random number $f_i$.

In this manner, the output $s_i$ of the modulation section 13 is given an irregular association by physical random number $f_i$ and as described above, it is made possible for the legitimate receiver side to demodulate the decoded signal $d_i$ using only the pseudo random number $r_i$ without using the physical random number $f_i$, while guaranteeing a high safety capable of securing an extremely high encryption strength against not only the cipher text only attack but also the known plain text attack.

At this time, the encryption technique in the present embodiment is realized by code (simple numerical values), different from the Y-00 scheme quantum cryptography, therefore, like the case of the already existing classic encryption, it is possible to transfer cipher text by means of electromagnetic waves or electric line and it is made possible to use cipher text in radio communication or electrical communication and, in addition, it is also made possible to store the cipher text $c_i$ in an electric memory or a variety of recording media (flexible disc, CD, DVD, etc.) Further, the cipher text $c_i$ can be stored in an electric memory, therefore, it is made possible to pass the cipher text $c_i$ through a router.

Further, as described above, the encryption technique in the present embodiment is realized by code (simple numerical values), therefore, it is not necessary to transmit and receive many physical states that are unstable like the Y-00 scheme quantum cryptography and it is unlikely to receive the influence of noises, and when the present encryption technique is used in optical communication, a light amplifier with low noise is no longer necessary and the number of relay stages is not restricted by the noise level of the light amplifier and, in addition, the development of a light source with excellent linearity and a light receiving device is also no longer necessary.

Furthermore, according to the encryption technique in the present embodiment, even if the number of states of the pseudo random number $r_i$ used in modulation is 4, a sufficiently high safety can be guaranteed, therefore, the number of states can be reduced considerably compared to the Y-00 scheme quantum cryptography that requires about 200 of states of a multilevel signal and it is possible to minimize the influence of the operation rate of the pseudo random number generators 11 and 21 on the communication rate by suppressing the number of bits of the pseudo random number $r_i$.

According to the encryption technique in the present embodiment, the modulation output $s_i$ per one bit of the plain text to be transmitted is two bits and thus the transfer efficiency is improved considerably. Particularly, according to the encryption technique in the present embodiment, it is possible to achieve double the transfer efficiency of the above-mentioned classic Y-00 scheme cryptography while maintaining the same encryption strength as that of the above-mentioned classic Y-00 scheme cryptography.

By the way, the stream cipher is vulnerable to a known plain text attack, therefore, it is necessary to frequently distribute and change the encryption key between the encryption side (the legitimate transmitter side) and the cryptogram decoding side (the legitimate receiver side) using the public key encryption. However, when the encryption key is distributed by the encryption with the public key encryption using the prime factorization, the safety of the public key encryption is based on only the fact that the algorithm for performing the prime factorization at high speed has not been discovered until now and once a calculation method for performing the prime factorization is discovered, the encryption key is decoded extremely easily. Because of this, it has been desired to obviate the need to perform distribution of the encryption key using the public key encryption.

In contrast to this, according to the encryption technique in the present embodiment, as described above, it is possible to secure an extremely high encryption strength against a known plain text attack without changing the encryption key K used by the pseudo random number generators 11 and 21, that is, without the need to notify the user of the encryption key K because the pseudo random number generators 11 and 21 are incorporated (embedded) in the encryptor 10 or the cryptogram decoder 20, therefore, it is no longer necessary to perform the above-mentioned distribution of the encryption key using the public key encryption and it is also possible to eliminate the vulnerability of the public key encryption.

By the way, when the pseudo random number generator including the encryption key K is embedded, it is preferable to construct a structure having tamper-resistant properties by configuring at least a chip including a memory that stores the encryption key K into a state in which the encryption key K cannot be read from the outside in order to secure the safety by preventing the encryption key K from being read by not only the user but also an illegitimate person who accesses (an interceptor). As a structure having tamper-resistant properties, for example, a memory chip the recorded contents of which become extinct when the chip surface is exposed to air or a circuit that functions no longer if a probe to read a signal is attached thereto is used.

[8] Encryption/Cryptogram Decoding Technique in the Second Embodiment

In the encryption/cryptogram decoding technique in the first embodiment described above, the modulation section 13 performs modulation using, for example, the modulation three-variable function $s_i=M(x_i, r_i, f_i)$ as shown in FIG. 7(A) for all of the bits of the plain text $x_i$ to be transmitted and modulates each bit of the plain text $x_i$ to be transmitted into the two-bit output $s_i$. Therefore, the number of bits of the modulation output $s_i$ is double the number of bits of the plain text $x_i$ to be transmitted.

The encryption/cryptogram decoding technique as the second embodiment of the present invention to be explained below with reference to FIG. 11 to FIG. 16 is a combination of the encryption/cryptogram decoding technique described above as the first embodiment with reference to FIG. 1 to FIG. 10 and the stream cipher scheme described above as the prior art with reference to FIG. 18, and in the second embodiment, it is so configured that the plain text $x_i$ is modulated into a nine-bit output $s_i$ for each of the eight bits.

Figure 11:
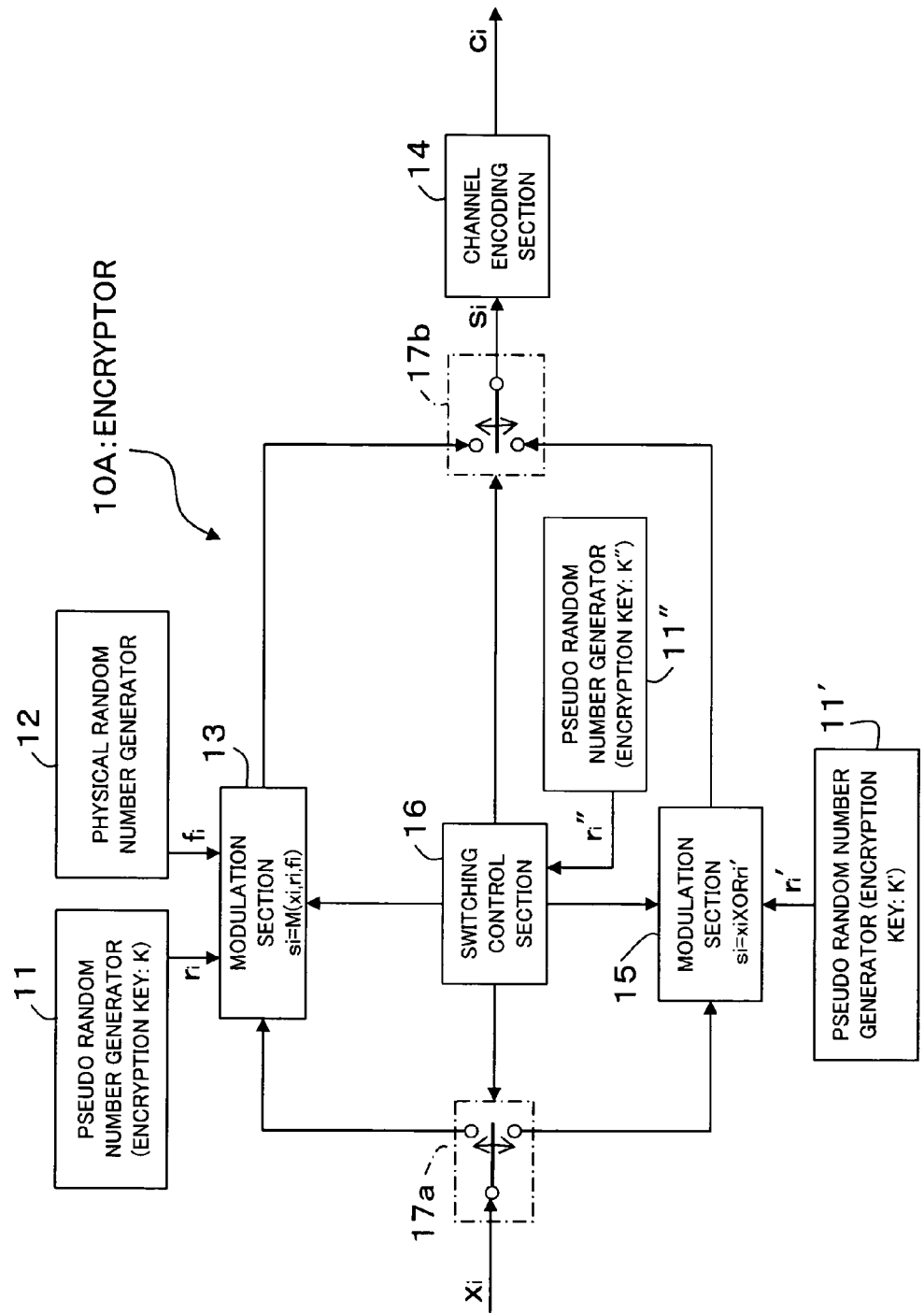
FIG. 11 is a block diagram showing a configuration of an encryptor as a second embodiment of the present invention.

FIG. 11 is a block diagram showing the configuration of the encryptor as the second embodiment of the present invention and as shown in FIG. 11, an encryptor 10A in the second embodiment comprises the pseudo random number generator 11, the physical random number generator 12, the modulation section 13, and the channel coding section 14, like those in the first embodiment and at the same time, further comprises pseudo random number generators 11' and 11", a modulation section 15, a switching control section 16 and switches 17a and 17b. By the way, in FIG. 11, the same symbols as those already described denote the same or substantially the same portions, therefore, their detailed explanation is omitted.

The pseudo random number generator 11 in the second embodiment generates and outputs a modulation pseudo random number $r_i$ based on the encryption key K set in advance like the first embodiment, however, in the second embodiment, it is configured so as to generate and output two bits of the pseudo random number $r_i$ for eight-bit plain text $x_i$.

The pseudo random number generator (pseudo random number generation section, modulation pseudo random number generation section) 11' generates and outputs a modulation pseudo random number $r_i'$ based on the encryption key K' set in advance. Like the pseudo random number generator 11, if the encryption key K' is, for example, a 100-bit binary number, a $(2^{100}-1)$-bit binary number, that is, a pseudo random number with a period of $(2^{100}-1)$ bits is generated from the pseudo random number generator 11'. The output from the pseudo random number generator 11' is dealt with as the pseudo random number $r_i'$ and the pseudo random number $r_i'$ is used in modulation (into stream cipher) in the modulation section 15 to be described later. In the present embodiment, seven bits of the pseudo random number $r_i'$ are generated and output for the eight-bit plain text $x_i$.

The pseudo random number generator (pseudo random number generation section, modulation pseudo random number generation section) 11" generates and outputs a modulation pseudo random number $r_i''$ based on the encryption key K" set in advance. Like the pseudo random number generators 11 and 11', if the encryption key K" is, for example, a 100-bit binary number, a $(2^{100}-1)$-bit binary number, that is, a pseudo random number with a period of $(2^{100}-1)$ bits is generated from the pseudo random number generator 11". The output from the pseudo random number generator 11" is dealt with as the pseudo random number $r_i"$ and the pseudo random number $r_i"$ is used for the switching control by the switching control section 16, which will be described later. More specifically, three bits of the pseudo random number $r_i"$ are generated and output for the eight-bit plain text $x_i$ and as described later, are used only to determine once the timing (bit/slot number of the plain text $x_i$ to be modulated by the modulation section 13) at which the switches 17a and 17b are switched to the modulation section 13 side by the switching control section 16 for each eight-bit plain text $x_i$ (one block), which will be described later. Therefore, the pseudo random number $r_i"$ has eight integer values 0, 1, 2, 3, 4, 5, 6, and 7 as its state. In other words, $r_i" \in \{0, 1, 2, 3, 4, 5, 6, 7\}$.

Figure 18:
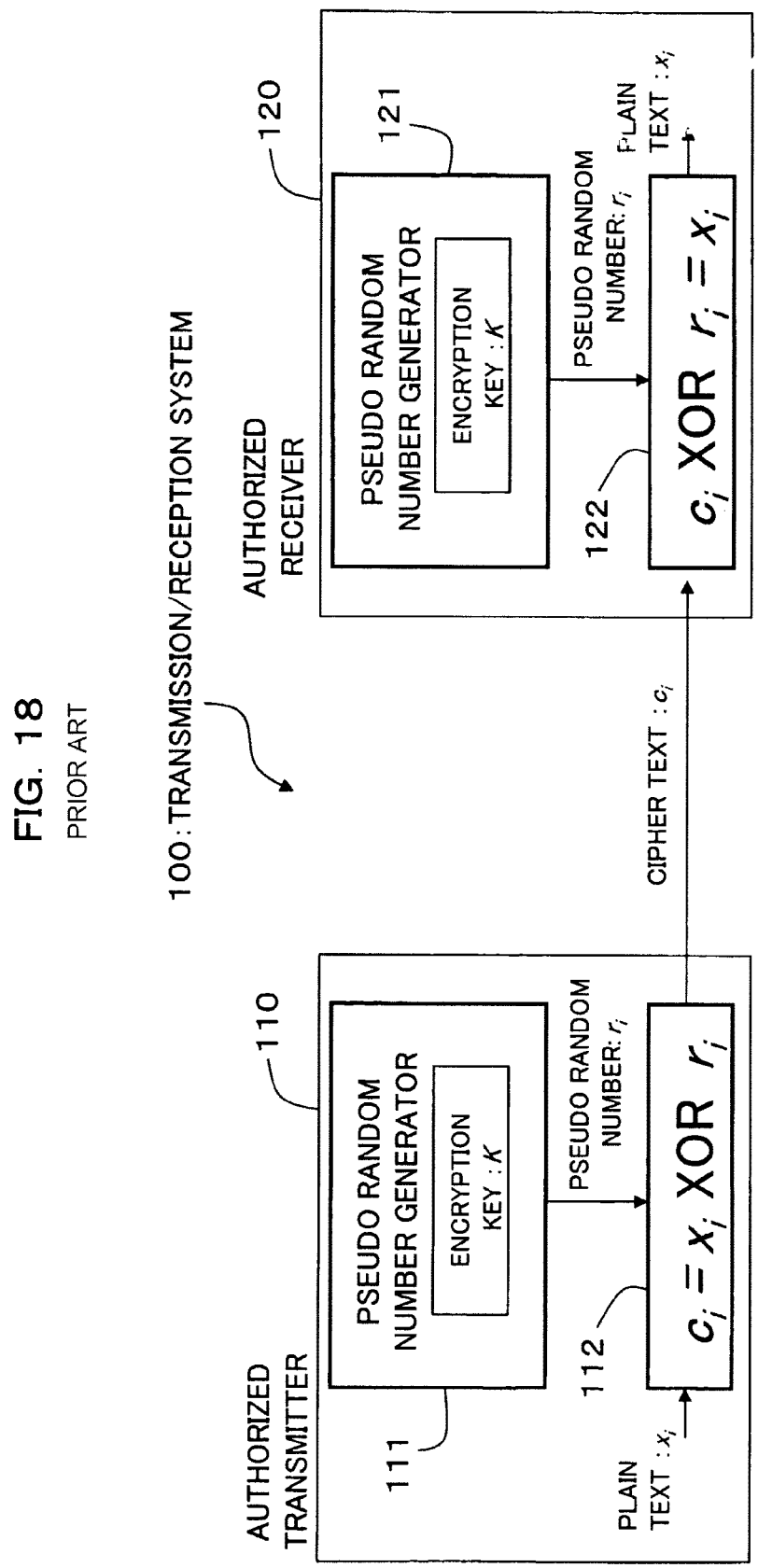
FIG. 18 is a block diagram showing a configuration of a general transmission/reception system to which stream cipher has been applied.
Figure 19:
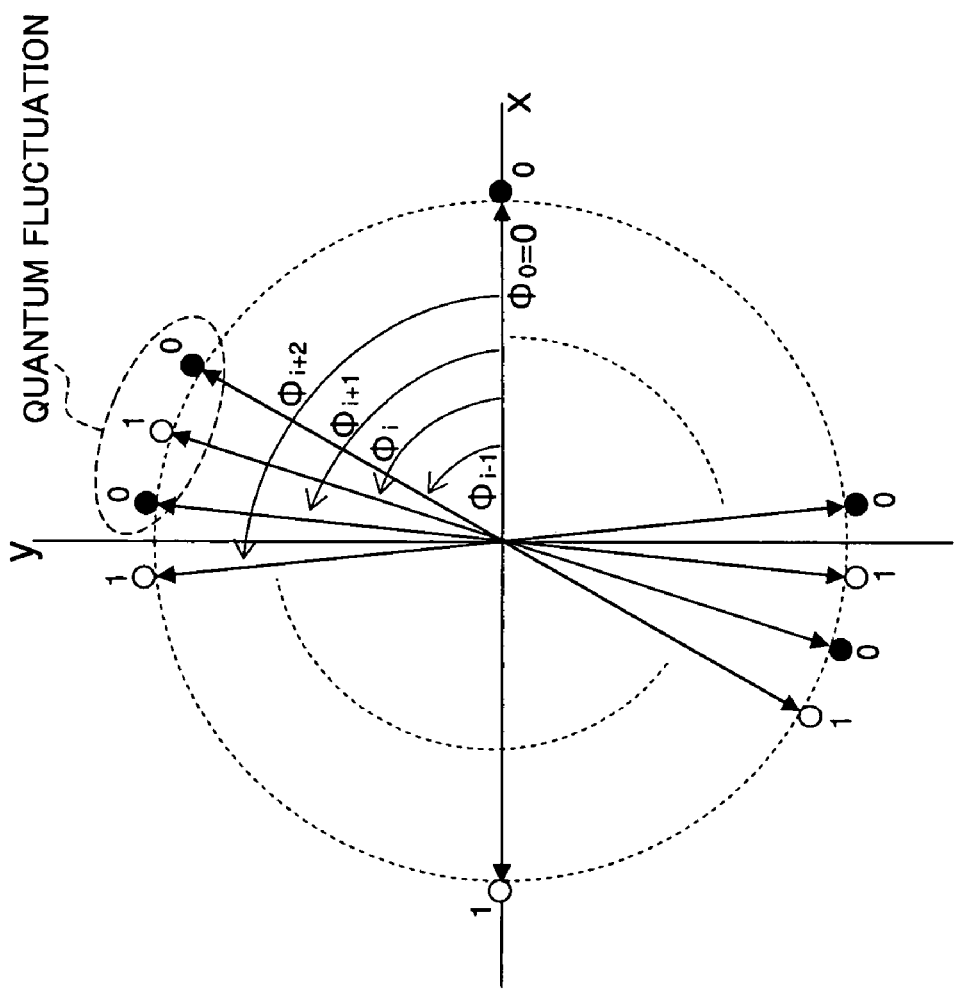
FIG. 19 is a diagram for explaining Y-00 scheme quantum cryptography.

The modulation section (exclusive OR arithmetic unit) 15 performs the same function as that of the modulation section 112 shown in FIG. 18 and calculates an XOR (exclusive OR) of the plain text $x_i$ to be modulated and the pseudo random number $r_i'$ generated by the pseudo random number generator 11' and outputs it as a modulation result. In other words, the plain text $x_i$ is modulated by the modulation section 15 based on the pseudo random number $r_i'$ and output as the modulation result $s_i$.

The switch 17a inputs the plain text $x_i$ to be transmitted by selectively switching to either of the modulation section 13 and the modulation section 15, the switch 17b selectively switches to input either of the modulation result from the modulation section 13 and the modulation result from the modulation section 15 to the channel coding section 14 as the output $s_i$, and the switching control section 16 controls the switches 17a and 17b to switch to either of the modulation section 13 side and the modulation section 15 side in accordance with the pseudo random number $r_i"$ generated by the pseudo random number generator 11".

In the present embodiment, the switching control section 16 deals with the eight-bit plain text $x_i$ as one block, receives the pseudo random number $r_i"$ from the pseudo random number generator 11" and, as will be described later with reference to FIG. 13, regards the state value (0 to 7) of the pseudo random number $r_i"$ as one of the slot numbers in the above-mentioned block, and switches the switch 17a to the modulation section 13 side so as to input the one-bit plain text $x_i$ corresponding to the slot number (state value) to the modulation section 13 and at the same time, switches the switch 17b to the modulation section 13 side so as to input the modulation result by the modulation section 13 for the one-bit plain text $x_i$ to the channel coding section 14 as the output $s_i$, and on the other hand, switches the switch 17a to the modulation section 15 side so as to input the seven-bit plain text $x_i$ other than the above-mentioned slot number (state value) to the modulation section 15 and at the same time, switches the switch 17b to the modulation section 15 side so as to input the modulation result by the modulation section 15 for the seven-bit plain text $x_i$ to the channel coding section 14 as the output $s_i$. Due to this, in the present embodiment, modulation is performed by the modulation section 13 for one bit among the eight-bit plain text $x_i$, modulation is performed by the modulation section 15 for the other seven bits, and the eight-bit plain text $x_i$ is modulated into a nine-bit output $s_i$ and output.

Figure 12:
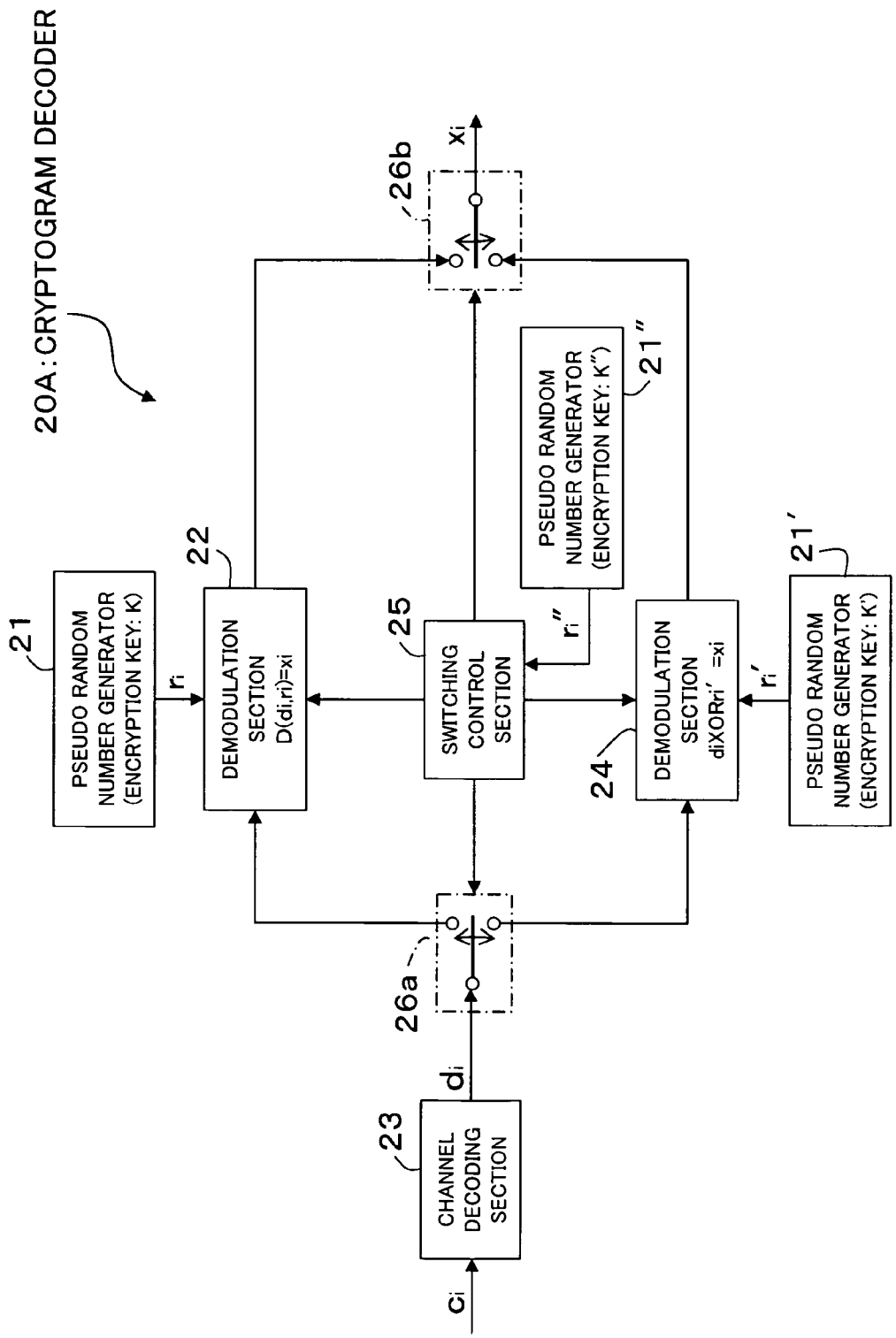
FIG. 12 is a block diagram showing a configuration of a cryptogram decoder as the second embodiment of the present invention.

FIG. 12 is a block diagram showing the configuration of the cryptogram decoder as the second embodiment of the present invention and as shown in FIG. 12, a cryptogram decoder 20A in the second embodiment comprises the pseudo random number generator 21, the demodulation section 22, and the channel decoding section 23, like those in the first embodiment and at the same time, further comprises pseudo random number generators 21' and 21", a demodulation section 24, a switching control section 25 and switches 26a and 26b. By the way, in FIG. 12, the same symbols as those already described denote the same or substantially the same portions, therefore, their detailed explanation is omitted.

The pseudo random number generator 21 in the second embodiment, like the first embodiment, generates and outputs the demodulation pseudo random number $r_i$ in synchronization with the modulation pseudo random number $r_i$ based on the same encryption key K as the encryption key K having generated the pseudo random number $r_i$ used in the modulation by the modulation section 13 in the encryptor 10A and has the same configuration as the pseudo random number generator 11 in the encryptor 10A, and is configured so as to generate and output two bits of the pseudo random number $r_i$ for the nine-bit decoded signal $d_i$.

The pseudo random number generator (pseudo random number generation section, demodulation pseudo random number generation section) 21' generates and outputs the demodulation pseudo random number $r_i'$ in synchronization with the modulation pseudo random number $r_i'$ based on the same encryption key K' as the encryption key K' having generated the pseudo random number $r_i'$ in the encryptor 10A and has the same configuration as the pseudo random number generator 11' in the encryptor 10A, and is configured so as to generate and output seven bits of the pseudo random number $r_i'$ for the 9-bit decoded signal $d_i$.

The pseudo random number generator (pseudo random number generation section, demodulation pseudo random number generation section) 21" generates and outputs the demodulation pseudo random number $r_i"$ in synchronization with the modulation pseudo random number $r_i"$ based on the same encryption key K" as the encryption key K" having generated the pseudo random number $r_i"$ in the encryptor 10A and has the same configuration as the pseudo random number generator 11" in the encryptor 10A, and is configured so as to generate and output three bits of the pseudo random number $r_i"$ for the 9-bit decoded signal $d_i$. The pseudo random number $r_i"$ is used for the switching control by the switching control section 25, which will be described later. More specifically, the pseudo random number $r_i"$ is used only to determine once the timing (the two-bit decoded signal $d_i$ to be demodulated by the demodulation section 22) at which the switches 26a and 26b are switched to the demodulation section 22 side by the switching control section 25 for each nine-bit decoded signal $d_i$ (one block), which will be described later.

The demodulation section (exclusive OR arithmetic unit) 24 performs the same function as that of the demodulation section 122 shown in FIG. 18 and calculates an XOR of the decoded signal $d_i$ to be demodulated and the pseudo random number $r_i'$ generated by the pseudo random number generator 21' and outputs it as the plain text $x_i$. In other words, the decoded signal $d_i$ is demodulated by the demodulation section 24 based on the pseudo random number $r_i'$ and its demodulation result is output as the plain text $x_i$.

The switch 26a inputs the decoded signal $d_i$ obtained by the channel decoding section 23 by selectively switching to either of the demodulation section 22 and the demodulation section 24, the switch 26b selectively switches to output either of the demodulation result from the demodulation section 22 and the demodulation result from the demodulation section 24 as the plain text $x_i$, and the switching control section 25 controls the switches 26a and 26b to switch to either of the demodulation section 22 side and the demodulation section 24 side in accordance with the pseudo random number $r_i''$ generated by the pseudo random number generator 21''.

In the present embodiment, the switching control section 25 deals with the nine-bit decoded signal $d_i$ as one block, receives the pseudo random number $r_i''$ from the pseudo random number generator 21'', and regards the state value (0 to 7) of the pseudo random number $r_i''$ as one of the slot numbers in the above-mentioned block, and switches the switch 26a to the demodulation section 22 side so as to input the one-bit corresponding to the slot number (state value) and the next bit, that is, the two-bit decoded signal $d_i$ to the demodulation section 22 and at the same time, switches the switch 26b to the demodulation section 22 side so as to output the demodulation result by the demodulation section 22 for the two-bit decoded signal $d_i$ as the plain text $x_i$, and on the other hand, switches the switch 26a to the demodulation section 24 side so as to input the seven-bit decoded signal $d_i$ other than the above-mentioned two bits to the demodulation section 24 and at the same time, switches the switch 26b to the demodulation section 24 side so as to output the demodulation result by the demodulation section 24 for the seven-bit decoded signal $d_i$ as the plain text $x_i$. Due to this, in the present embodiment, demodulation is performed by the demodulation section 22 for the two bits among the nine-bit decoded signal $d_i$, demodulation is performed by the demodulation section 24 for the other seven bits, and the nine-bit decoded signal $d_i$ is demodulated into the eight-bit plain text $x_i$ and output.

Next, with reference to FIG. 13, the encryption operation by the encryptor 10A shown in FIG. 11 will be explained specifically. By the way, it is assumed here that the modulation section 13 performs modulation in accordance with the encode table shown in FIG. 7(A).

In the example shown in FIG. 13, for the eight-bit plain text $x_i$=01000110 in the first one block, the three-bit pseudo random number $r_i''$=011 (=3) is generated by the pseudo random number generator 11' and the switches 17a and 17b are controlled by the switching control section 16 to switch so that modulation by the modulation section 13 is performed for the plain text $x_i$=0 with slot number 3 (the fourth bit from the first) of the block and modulation by the modulation section 15 is performed for the other plain text $x_i$.

In other words, when the plain text $x_i$ with slot numbers 0, 1, 2, 4, 5, 6, and 7 is input, the switches 17a and 17b are switched to the modulation section 15 side and the plain text $x_i$=0, 1, 0, 0, 1, 1, 0 is input to the modulation section 15 and in the modulation section 15, an XOR with the pseudo random number $r_i'$=1, 0, 0, 1, 1, 0, 1 generated respectively by the pseudo random number generator 11' is calculated and the calculation result is input to the channel coding section 14 as the modulation output $s_i$=1, 1, 0, 1, 0, 1, 1.

When the plain text $x_i$ with slot number 3 is input, the switches 17a and 17b are switched to the modulation section 13 side and the plain text $x_i$=0 with slot number 3 is input to the modulation section 13 and in the modulation section 13, based on the encode table (three-variable function $s_i$=M($x_i$, $r_i$, $f_i$)) shown in FIG. 7(A), from the plain text $x_i$=0, the pseudo random number $r_i$=11=3 generated by the pseudo random number generator 11, and the physical random number $f_i$=1 generated by the physical random number generator 12, a two-bit modulation result is obtained and output as $s_i$=M (0, 3, 1)=00.

Similarly, for the eight-bit plain text $x_i$=10110100 in the next one block, the three-bit pseudo random number $r_i''$=101 (=5) is generated by the pseudo random number generator 11'' and the switches 17a and 17b are controlled by the switching control section 16 to switch so that modulation by the modulation section 13 is performed for the plain text $x_i$=1 with slot number 5 (the sixth bit from the first) of the block and modulation by the modulation section 15 is performed for the other plain text $x_i$.

In other words, when the plain text $x_i$ with slot numbers 0, 1, 2, 3, 4, 6, and 7 is input, the switches 17a and 17b are switched to the modulation section 15 side and the plain text $x_i$=1, 0, 1, 1, 0, 0, 0 is input to the modulation section 15 and in the modulation section 15, an XOR with the pseudo random number $r_i'$=0, 1, 1, 0, 0, 0, 1 generated respectively by the pseudo random number generator 11' is calculated and the calculation result is input to the channel coding section 14 as the modulation output $s_i$=1, 1, 0, 1, 0, 0, 1.

When the plain text $x_i$ with slot number 5 is input, the switches 17a and 17b are switched to the modulation section 13 side and the plain text $x_i$=1 with slot number 5 is input to the modulation section 13 and in the modulation section 13, based on the encode table (three-variable function $s_i$=M ($x_i$, $r_i$, $f_i$)) shown in FIG. 7(A), from the plain text $x_i$=1, the pseudo random number $r_i$=01=1 generated by the pseudo random number generator 11, and the physical random number $f_i$=0 generated by the physical random number generator 12, a two-bit modulation result is obtained and output as $s_i$=M (1, 1, 0)=01.

Due to this, the eight-bit plain text $x_i$=01000110 in the first one block is modulated into the nine-bit output $s_i$=110001011 and the eight-bit plain text $x_i$=10110100 in the next one block is modulated into the nine-bit output $s_i$=110100101, and the output $s_i$ thus modulated and obtained is channel-coded by the channel coding section 14 and transmitted as cipher text $c_i$.

On the other hand, in the cryptogram decoder 20A shown in FIG. 12 on the legitimate receiver side having received such cipher text $c_i$, a decoded signal $d_i$ is obtained by channel-decoding the cipher text $c_i$ with the channel decoding section 23 and at the same time, in accordance with the reception timing, the demodulation pseudo random numbers $r_i$, $r_i'$, $r_i''$ in the same state as the modulation pseudo random numbers $r_i$, $r_i'$, $r_i''$ used when encrypting the cipher text $c_i$ are generated and output by the pseudo random number generators 21, 21', and 21''.

Then, for the nine-bit decoded signal $d_i$=110001011 corresponding to the eight-bit plain text $x_i$ in the above-mentioned first one block shown in FIG. 13, the three-bit pseudo random number $r_i''$=011 (=3) is generated by the pseudo random number generator 21'' and the switches 26a and 26b are controlled by the switching control section 25 to switch so that demodulation by the demodulation section 22 is performed for the two-bit decoded signal $d_i$=0 with slot numbers 3 and 4 (the fourth and fifth bits from the first) of the block and demodulation by the demodulation section 24 is performed for the other decoded signal $d_i$.

In other words, when the decoded signal $d_i$ with slot numbers 0, 1, 2, 5, 6, 7, and 8 is input, the switches 26a and 26b are switched to the demodulation section 24 side and the decoded signal $d_i$=1, 1, 0, 1, 0, 1, 1 is input to the demodulation section 24 and in the demodulation section 24, an XOR with the pseudo random number $r_i'$=1, 0, 0, 1, 1, 0, 1 generated respectively by the pseudo random number generator 21' is calculated and the calculation result is output as the demodulation output (plain text) $x_i$=0, 1, 0, 0, 0, 1, 1, 0.

When the decoded signal $d_i$ with slot numbers 3 and 4 is input, the switches 26a and 26b are switched to the demodulation section 22 side and the plain text $x_i$=00 with slot numbers 3 and 4 is input to the demodulation section 22 and in the demodulation section 22, based on the decode table (two-variable function $x_i$=D ($d_i$, $r_i$)), from the decoded signal $d_i$=00 and the pseudo random number $r_i$=11=3 generated by the pseudo random number generator 21, the demodulation result is obtained and output as $x_j$=D (0, 3)=0. Due to this, the nine-bit decoded signal $d_i$=110001011 corresponding to the eight-bit plain text $x_i$ in the above-mentioned first one block shown in FIG. 13 is demodulated into the eight-bit plain text $x_i$=01000110. By the way, the nine-bit decoded signal $d_i$=110100101 corresponding to the eight-bit plain text $x_i$ in the above-mentioned next one block shown in FIG. 13 is also demodulated into the eight-bit plain text $x_i$=10110100 similarly.

As described above, according to the encryption/cryptogram decoding technique as the second embodiment of the present invention, the encryption/cryptogram decoding technique described above as the first embodiment with reference to FIG. 1 to FIG. 10 and the stream cipher scheme described above as the prior art with reference to FIG. 18 are combined and the eight-bit plain text $x_i$ is modulated into the nine-bit output $s_i$ and the nine-bit decoded signal $d_i$ is demodulated into the eight-bit plain text $x_i$. At this time, the encryption/cryptogram decoding technique (modulation by the modulation section 13) described above as the first embodiment with reference to FIG. 1 to FIG. 10 is applied to one-bit plain text $x_i$ randomly selected by the pseudo random number $r_i''$ from among the eight-bit plain text $x_i$, therefore, even if an interceptor obtains the decoded signal $d_i$ corresponding to the cipher text $c_i$ thus encrypted, it is not possible to know which part is modulated by the modulation section 13 and the same function and effect as those in the first embodiment described above can be obtained.

Further, in the first embodiment described above, the modulation output si per plain text one bit to be transmitted is two bits, however, in the second embodiment, the eight-bit plain text $x_i$ is modulated into the nine-bit output $s_i$, therefore, transfer efficiency is further improved considerably compared to the first embodiment.

Furthermore, for the encryptor 10 in the first embodiment, it is necessary to generate a one-bit physical random number $f_i$ for one-bit plain text $x_i$ by the physical random number generator 12, therefore, it is necessary to use the physical random number generator 12 capable of high speed operation, however, for the encryptor 10A in the second embodiment, it is only necessary to generate a one-bit physical random number $f_i$ for eight-bit plain text $x_i$, therefore, it is possible to use one with lower speed operation than that in the first embodiment as the physical random number generation section 12 in the second embodiment. A physical random number generator capable of high speed operation is expensive, however, a physical random number generator that operates at low speed is inexpensive, therefore, it is possible to configure the encryptor 10A in the second embodiment at a lower cost than that of the encryptor 10 in the first embodiment.

Figure 14:
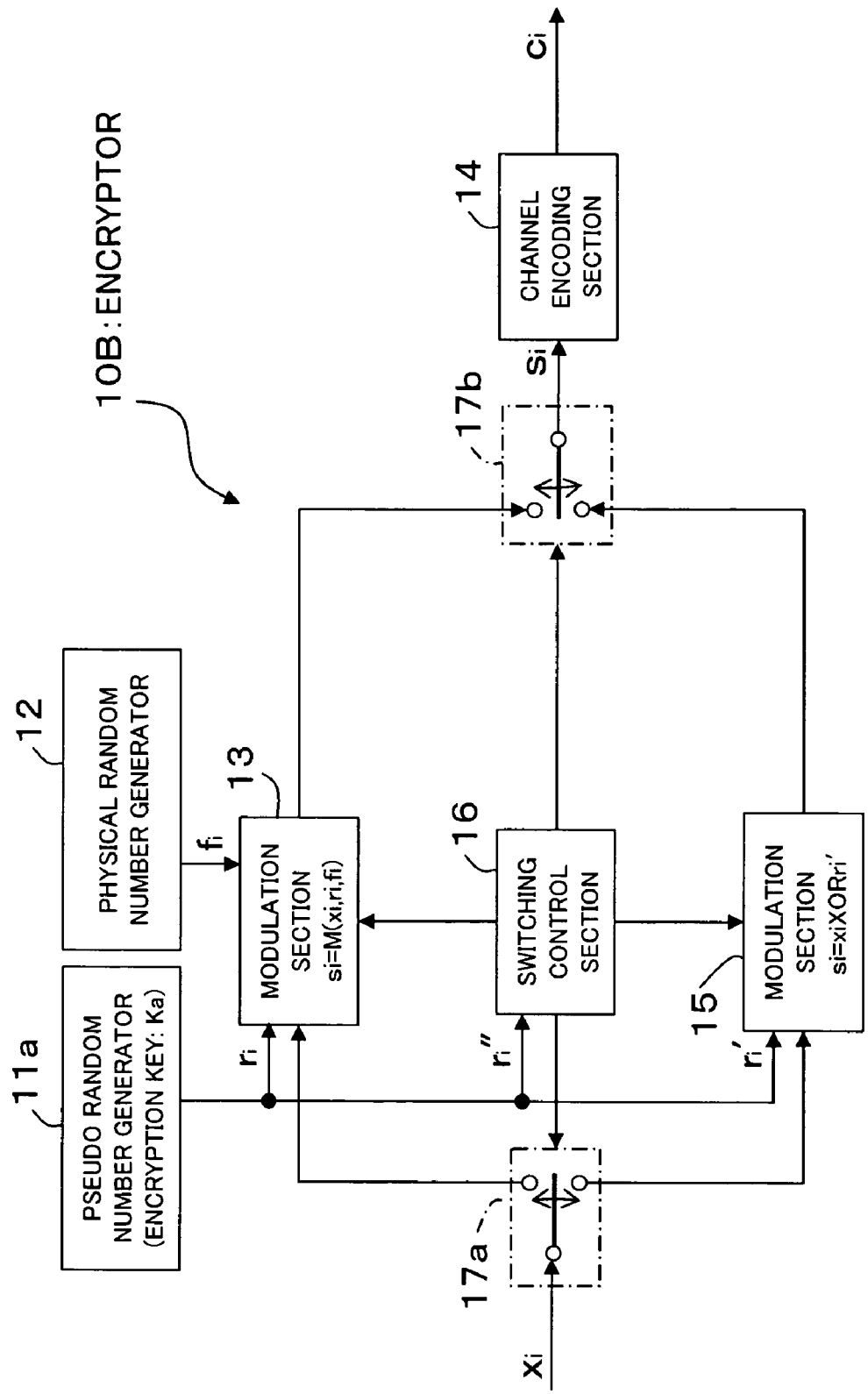
FIG. 14 is a block diagram showing a configuration of a modification example of the encryptor in the second embodiment.
Figure 15:
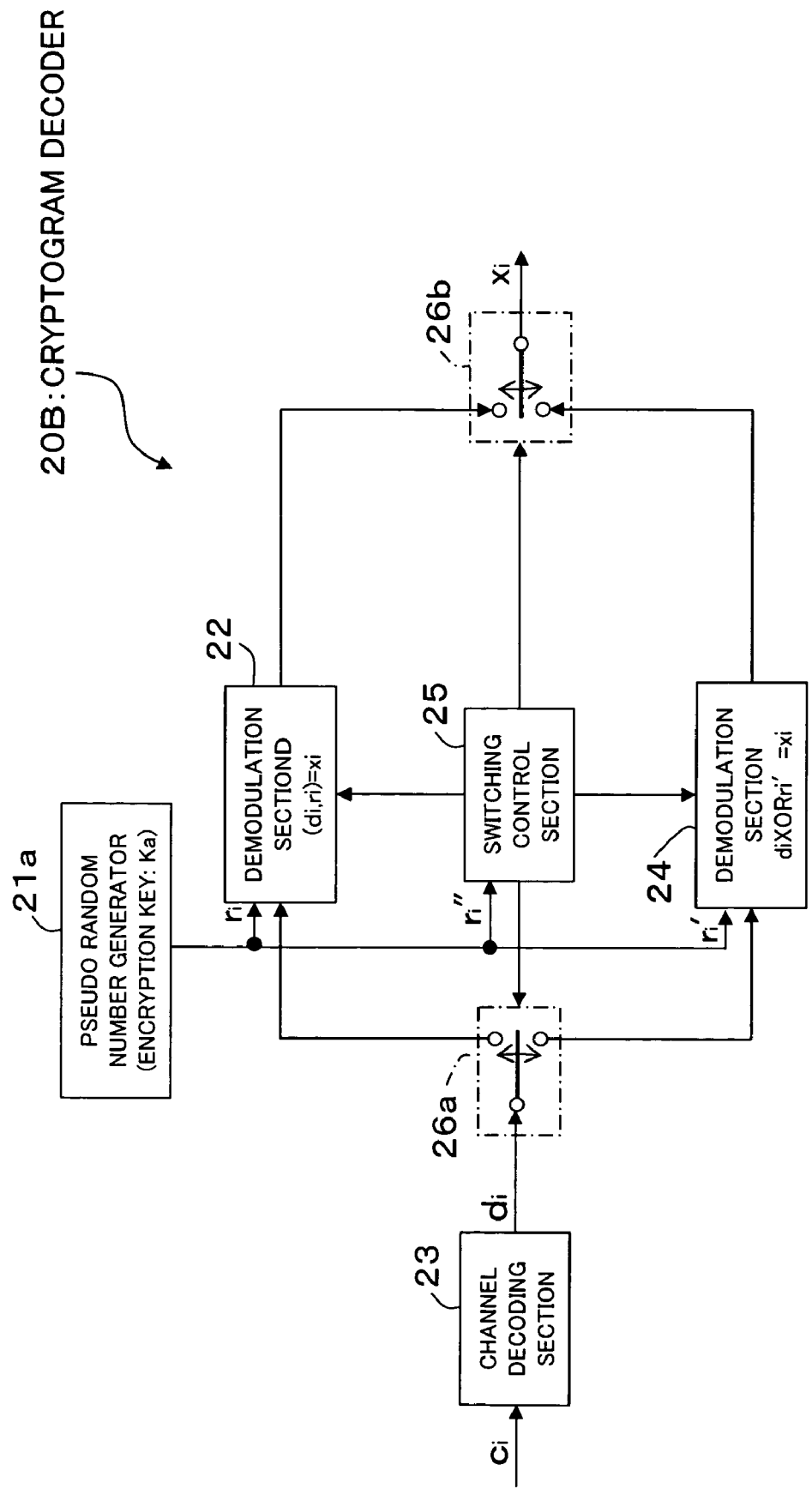
FIG. 15 is a block diagram showing a configuration of a modification example of the cryptogram decoder in the second embodiment.

By the way, in the encryptor 10A and the cryptogram decoder 20A described above, three kinds of pseudo random numbers $r_i$, $r_i'$, $r_i''$ are generated by the three pseudo random number generators 11, 11', and 11''; 21, 21', and 21'' based on the different encryptions keys K, K', and K'', however, it may also possible to generate the three kinds of pseudo random numbers $r_i$, $r_i'$, $r_i''$ by a single pseudo random number generator 11a or 21a based on a single encryption key Ka like an encryptor 10B shown in FIG. 14 or a cryptogram decoder 20B shown in FIG. 15. Here, FIG. 14 is a block diagram showing a configuration of a modification example of the encryptor in the second embodiment (the encryptor 10B), FIG. 15 is a block diagram showing a configuration of a modification example of the cryptogram decoder in the second embodiment (the cryptogram decoder 20B), and FIG. 16 is a diagram for specifically explaining the encryption operation by the encryptor 10B shown in FIG. 14.

As shown in FIG. 14, the encryptor 10B is provided with one pseudo random number generator 11a instead of the three pseudo random number generators 11, 11', and 11'' of the encryptor 10A shown in FIG. 11.

The pseudo random number generator (pseudo random number generation section, modulation pseudo random number generation section) 11a generates and outputs a 12-bit modulation pseudo random number $R_i$ for each eight-bit plain text $x_i$ (one block) based on the encryption key Ka set in advance. Like the pseudo random number generators 11, 11', and 11'', if the encryption key Ka is, for example, a 100-bit binary number, a $(2^{100}-1)$-bit binary number, that is, a pseudo random number with a period of $(2^{100}-1)$ bits is generated by the pseudo random number generator 11a.

Here, for example, as shown in FIG. 16, among the 12-bit modulation pseudo random number $R_i$ generated by the pseudo random number generator 11a, the three bits from the first bit to the third bit from the top are input to the switching control section 16 as a pseudo random number $r_i''$, the two bits from the fourth bit to the fifth bit from the top are input to the modulation section 13 as a pseudo random number $r_i$, and the seven bits from the sixth bit to the lowest order bit from the top are input to the modulation section 15 as a pseudo random number $r_i'$.

Further, as shown in FIG. 15, the cryptogram decoder 20B comprises one pseudo random number generator 21a instead of the three pseudo random number generators 21, 21', and 21'' of the cryptogram decoder 20A shown in FIG. 12.

The pseudo random number generator (pseudo random number generation section, demodulation pseudo random number generation section) 21a generates and outputs the demodulation pseudo random number $R_i$ in synchronization with the modulation pseudo random number $R_i$ based on the same encryption key Ka as the encryption key Ka having generated the pseudo random number $R_i$ in the encryptor 10B and has the same configuration as the pseudo random number generator 11a in the encryptor 10B, and is configured so as to generate and output 12 bits of the pseudo random number $R_i$ for the nine-bit decoded signal $d_i$.

Then, also in the cryptogram decoder 20B, like the 12-bit modulation pseudo random number $R_i$ in the encryptor 10B, among the 12-bit modulation pseudo random number $R_i$ generated by the pseudo random number generator 21a, the three bits from the first bit to the third bit from the top are input to the switching control section 25 as a pseudo random number $r_i''$, the two bits from the fourth bit to the fifth bit from the top are input to the demodulation section 22 as a pseudo random number $r_i$, and the seven bits from the sixth bit to the lowest order bit from the top are input to the demodulation section 24 as a pseudo random number $r_i'$.

With such a configuration, in the encryptor 10B, as shown in FIG. 16, like the encryption operation of the encryptor 10A described above (refer to FIG. 13), eight-bit plain text $x_i$ is modulated into a nine-bit output $s_i$ and in the cryptogram decoder 20B, like the cryptogram decoding operation of the cryptogram decoder 20A described above, a nine-bit decoded signal $d_i$ is demodulated into eight-bit plain text $x_i$.

Due to this, the same function and effect as those in the encryption/cryptogram decoding technique in the second embodiment described above are obtained and in addition, in the encryptor 10B and the cryptogram decoder 20B as a modification example, the pseudo random number generated by one of the pseudo random number generators 11a and 21a, respectively, is used as the three kinds of pseudo random numbers $r_i''$, $r_i$, and $r_i'$, therefore, the configuration can be further simplified and at the same time, since the encryption key uses only one kind Ka, the management of the encryption key Ka becomes easy.

Here, the eight-bit plain text $x_i$ is regarded as one block and for each block, modulation by the modulation section 13 is performed for one bit among the eight-bit plain text $x_i$, modulation by the modulation section 15 is performed for the other seven bits, and thus the eight-bit plain text $x_i$ is modulated into the nine-bit output $s_i$, however, this is not limited. For example, it may also be possible for the switching control section 16 to control the switches 17a and 17b so that, for example, m-bit plain text (m is an integer greater than 1) is regarded as one block and for each block, modulation by the modulation section 13 is performed for the n bits (n is an integer not less than 1 and not greater than m−1) among the m-bit plain text $x_i$, modulation by the modulation section 15 is performed for the other (m−n) bits, and the m-bit plain text $x_i$ is modulated into a (m+n)-bit output $s_i$.

Encryption/cryptogram decoding technique in the third embodiment

Figure 21:
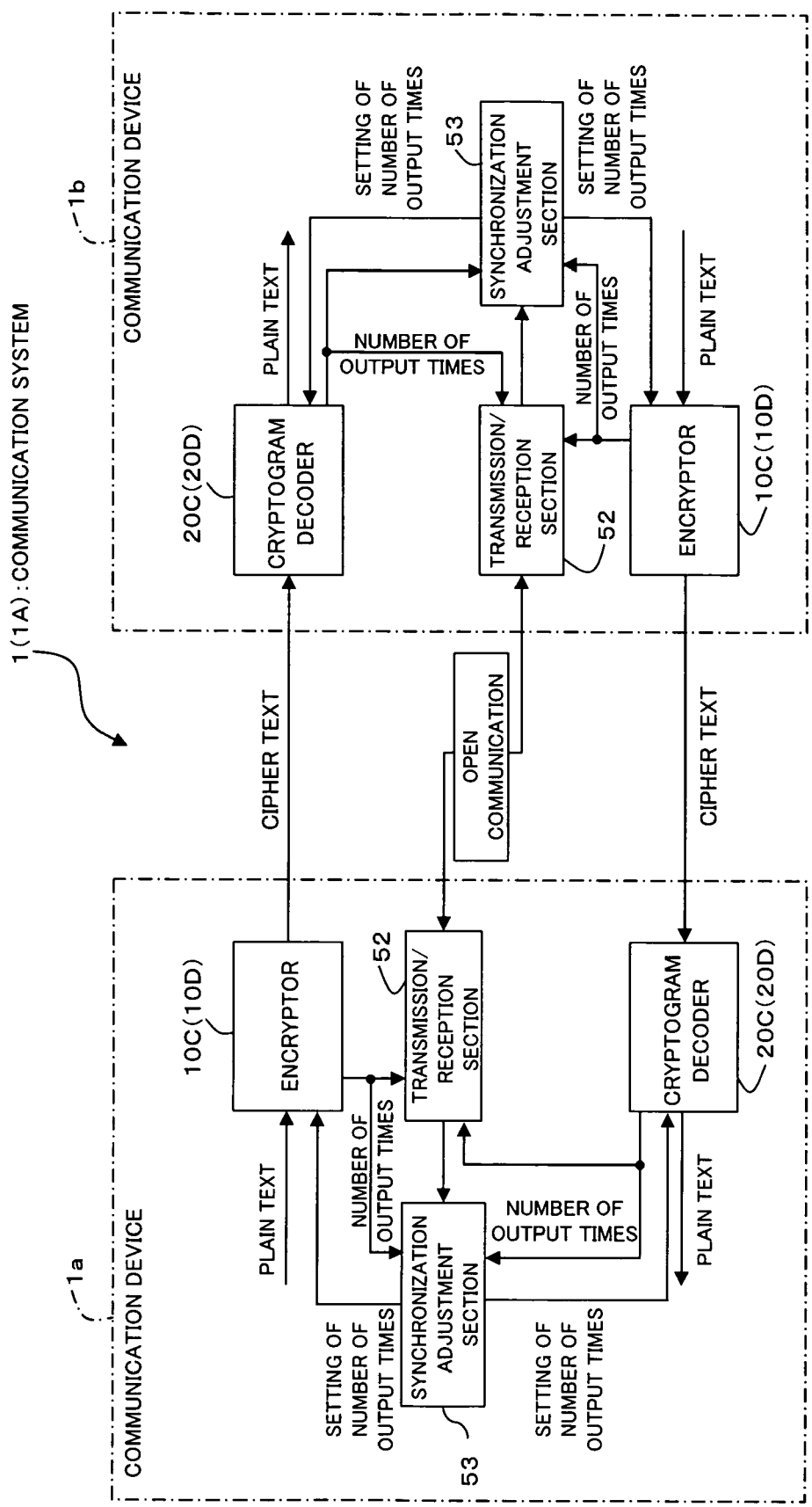
FIG. 21 is a block diagram showing an entire configuration of a communication system as third and fourth embodiments of the present invention.

FIG. 21 is a block diagram showing an entire configuration of a communication system 1 and 1A to which the encryption/cryptogram decoding technique as the third and fourth embodiments of the present invention has been applied, and the communication system 1 in the third embodiment shown in FIG. 21 comprises two communication devices 1a and 1b connected to each other so that communication is possible via a communication network etc. As to the communication system 1 in the third embodiment and the communication system 1A in the fourth embodiment to be described later, a case where the two communication devices 1a and 1b are connected so that communication is possible by a communication channel (a signal line) without tampering and the two communication devices 1a and 1b perform synchronization processing by open communication will be explained.

The communication devices 1a and 1b have the same configuration and the communication device 1a comprises an encryptor 10C for encrypting input data (plain text $x_i$) to be transmitted to the communication device 1b by the method described above in the first or second embodiment, a cryptogram decoder 20C for decoding the encrypted data ($c_i$ or $s_i$) received from the communication device 1b by the method described above in the first or second embodiment, and a transmission/reception section 52 and a synchronization adjustment section 53 to be described later, and the communication device 1b comprises the encryptor 10C for encrypting input data (plain text $x_i$) to be transmitted to the communication device 1a by the method described above in the first or second embodiment, the cryptogram decoder 20C for decoding the encrypted data (cipher text $c_i$ or $s_i$) received from the communication device 1a by the method described above in the first or second embodiment, and the transmission/reception section 52 and the synchronization adjustment section 53 to be described later. By the way, the configuration of the encryptor 10C is to be described later with reference to FIG. 22 and the configuration of the cryptogram decoder 20C is to be described later with reference to FIG. 23.

Further, in the communication system 1 shown in FIG. 21, the encryptor 10C in the communication device 1a and the cryptogram decoder 20C in the communication device 1b are paired and the pseudo random number generators 11 and 21 in the devices 10C and 20C (refer to FIG. 22 and FIG. 23) are configured so as to synchronize and generate a pseudo random number $r_i$ based on the same encryption key. Similarly, the encryptor 10C in the communication device 1b and the cryptogram decoder 20C in the communication device 1a are paired and the pseudo random number generators 11 and 21 in the devices 10C and 20C are also configured so as to synchronize and generate a pseudo random number $r_i$ based on the same encryption key. However, as the encryption key used in each pair of devices described above, different keys are set.

With such a configuration, the transmission data from the communication device 1a to the communication device 1b is encrypted by the above-mentioned encryption procedure by the encryptor 10C and transmitted to the communication device 1b as the cipher text and on the communication device 1b side, the cipher text received from the communication device 1a is decoded into plain text by the above-mentioned cryptogram decoding procedure by the cryptogram decoder 20C. Similarly, the transmission data from the communication device 1b to the communication device 1a is encrypted by the above-mentioned encryption procedure by the encryptor 10C and transmitted to the communication device 1a as the cipher text and on the communication device 1a side, the cipher text received from the communication device 1b is decoded into plain text by the above-mentioned cryptogram decoding procedure by the cryptogram decoder 20C.

Here, the transmission/reception section 52 and the synchronization adjustment section 53 are used when synchronization shift occurs for some reason in the pseudo random number generation operation of the pseudo random number generators 11 and 21 and encryption communication between the encryptor 10C and the cryptogram decoder 20C becomes no longer possible.

The transmission/reception section 52 transmits the number of output times of the modulation pseudo random number or the demodulation pseudo random number read from a nonvolatile memory 34 (refer to FIG. 22) or a nonvolatile memory 44 (refer to FIG. 23) to be described later to the communication device 1a or 1b, which is the other party of communication, as synchronization information and at the same time, receives synchronization information from the communication device 1a or 1b, which is the other party of communication. As the transmission/reception section 52, a general transceiver etc. that performs open communication is used.

When synchronization shift occurs for some reason in the pseudo random number generation operation of the pseudo random number generators 11 and 21 and encryption communication between the encryptor 10C and the cryptogram decoder 20C becomes no longer possible, the above-mentioned number of output times is transmitted and received as synchronization information between the communication devices 1a and 1b (between the transmission/reception sections 52 and 52) via a network etc. (here, a communication channel without rewriting) using the transmission/reception sections 52 and 53 respectively provided to the communication devices 1a and 1b.

The synchronization adjustment section 53 adjusts the numbers of output times of the pseudo random numbers from the pseudo random number generators 11 and 21 based on the numbers of output times read from the nonvolatile memory 34 or 44 in order to synchronize the pseudo random number generation operation by the modulation pseudo random number generator 11 (refer to FIG. 22) of the communication device 1a with the pseudo random number generation operation by the demodulation pseudo random number generator 21 (refer to FIG. 23) of the communication device 1b or in order to synchronize the pseudo random number generation operation by the modulation pseudo random number generator 11 (refer to FIG. 22) of the communication device 1b with the pseudo random number generation operation by the demodulation pseudo random number generator 21 (refer to FIG. 23) of the communication device 1a.

Particularly, the synchronization adjustment section 53 in the third embodiment adjusts to match the number of output times of the modulation pseudo random number from the pseudo random number generator 11 of the encryptor 10C (or the demodulation pseudo random number from the pseudo random number generator 21 of the cryptogram decoder 20C) with the number of output times of the demodulation pseudo random number (or the modulation pseudo random number) on the communication device 1a or 1b side of the other party of communication when the number of output times of the demodulation pseudo random number (or. the modulation pseudo random number) on the communication device 1a or 1b side of the other party of communication, which is decoded by the transmission/reception section 52, is greater than the number of output times of the modulation pseudo random number (or the demodulation pseudo random number) read from the nonvolatile memory 34 (or 44).

At this time, as will be described later with reference to FIG. 22 or FIG. 23, the synchronization adjustment section 53 in the third embodiment adjusts the number of output times from the pseudo random number generator 11 or 21 by setting the number of output times for the nonvolatile memory 34 of the encryptor 10C or the nonvolatile memory 44 of the cryptogram decoder 20C, or by performing dummy inputting of a clock signal for the pseudo random number generator 11 or 21. By the way, dummy inputting of a clock signal refers to an operation to input a clock signal for causing the pseudo random number generator 11 or 21 to perform the pseudo random number generation operation only to adjust the number of output times of pseudo random number without encrypting plain text.

Next, the configuration of the encryptor 10C will be explained with reference to FIG. 22. FIG. 22 is a block diagram showing the configuration of the encryptor 10C as the third embodiment of the present invention and the encryptor 10C shown in FIG. 22 is configured so as to provide the modulation pseudo random number generator 11, the physical random number generator 12, and the modulation section 13 as those in the encryptor 10 in the first embodiment, and in addition, an identification number ROM (Read Only Memory) 31, an encryption key ROM (Read Only Memory) 32, a counter 33, and the nonvolatile memory 34.

Then, the encryptor 10C in the present embodiment prevents leakage of the encryption key for pseudo random number generation or of the pseudo random number $r_i$ from the pseudo random number generator 11, and is arranged in a tamper-resistant region 60 for preventing probability distribution variations caused by physical disturbance in the physical random number $f_i$ generated by the physical random number generator 12. Here, the tamper-resistant region 60 in which the encryptor 10C in the third embodiment is arranged provides such a structure like the following items (11) to (17). By the way, the encryptor 10C (the tamper-resistant region 60) shown in FIG. 22 is configured, for example, on a single chip (not shown).

(11) A structure with which the encryption key of the encryption key ROM 32 (that is, the "seed" of the pseudo random number $r_i$) cannot be read even if the chip is disassembled. For example, if the chip is disassembled in an attempt to read the encryption key in ROM 32, the ROM 32 breaks.

(12) A structure with which the signal line of the pseudo random number $r_i$ (the signal line between the pseudo random number generator 11 and the modulation section 13) cannot be tapped even if the chip is disassembled. For example, a wiring structure with which the chip does not work any longer if the chip is broken in an attempt to tap the signal line of the pseudo random number $r_i$.

(13) A structure with which the probability distribution variations do not occur in the physical random number $f_i$ from the physical random number generator 12 even if physical disturbance is applied from the outside of the chip. For example, a structure of a physical random number generator with which the probability distribution of the physical random number $f_i$ does not change even if the entire chip is cooled or an abnormal input voltage is applied. Or, a mechanism that stops the operation of the chip before the distribution of the physical random number $f_i$ is biased by detecting temperatures or an input voltage.

(14) A structure from which the identification number of the identification number ROM 31 can be read but cannot be tampered.

(15) A structure with which the signal line of the physical random number $f_i$ (the signal line between the physical random number generator 12 and the modulation section 13) cannot be tapped even if the chip is disassembled. For example, a wiring structure with which if the chip is broken in an attempt to tap the signal line of the physical random number fi the chip does not operate any longer.

(16) A structure with which information (for example, the number of output times counted by the counter 33, as will be described later) held in the nonvolatile memory 34 cannot be tampered.

(17) A structure that prevents the pseudo random number generator 11 from being accessed directly by avoiding the counter 33 and the pseudo random number generator 11 from generating a pseudo random number $r_i$ with an arbitrary number of order. For example, a wiring structure with which the signal line between the counter 33 and the pseudo random number generator 11 cannot be tapped even if the chip is disassembled and the chip does not operate any longer if the chip is broken in an attempt to tap the signal line.

Figure 22:
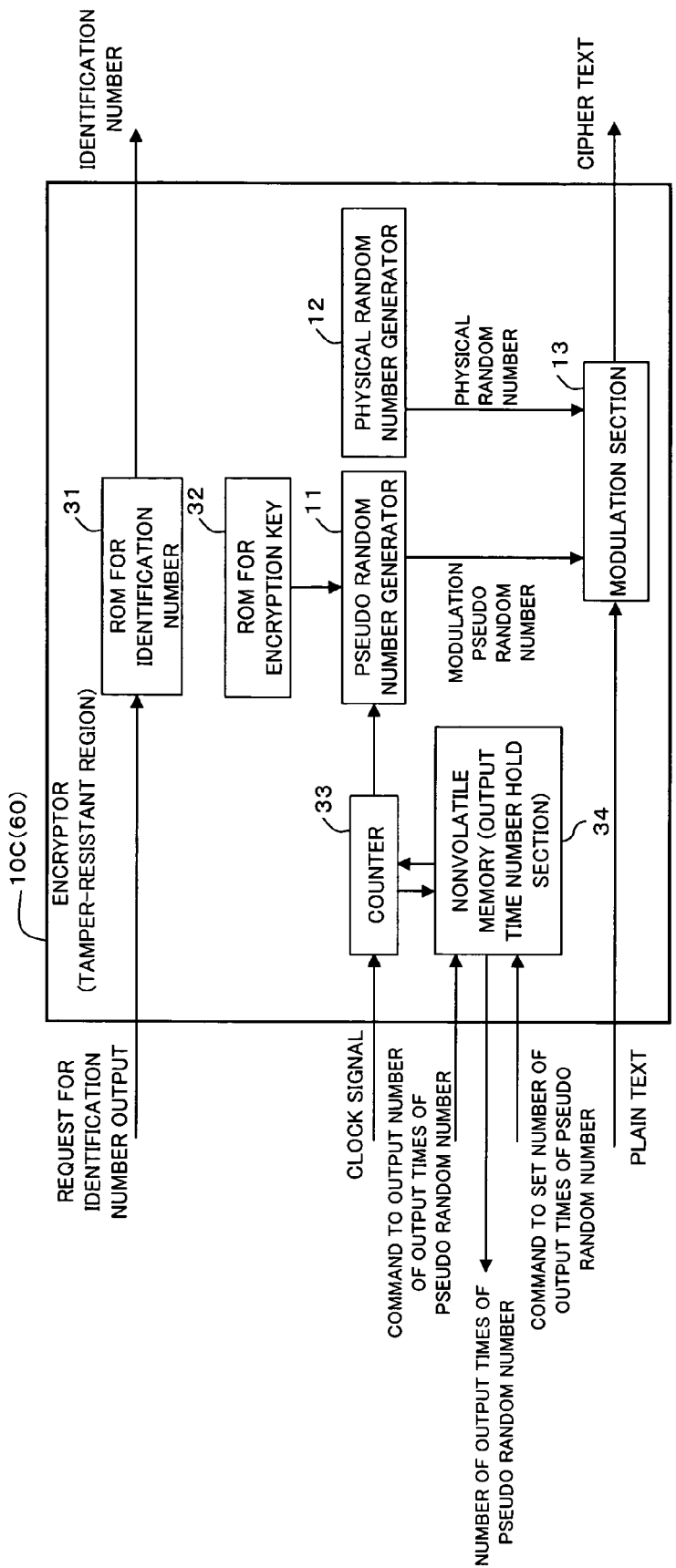
FIG. 22 is a block diagram showing a configuration of an encryptor as the third embodiment of the present invention.

By the way, in the encryptor 10C shown in FIG. 22, the channel coding section 14 (refer to FIG. 1, FIG. 11 and FIG. 14) is not shown schematically. The channel coding section 14 may be provided like the first and second embodiments or may not be provided. When the channel coding section 14 is provided, the channel coding section 14 may be arranged in the tamper-resistant region 60 or outside the tamper-resistant region 60.

Further, the modulation pseudo random number generator 11 in the third embodiment is configured so as to prohibit reset and repetition of the generation operation of the modulation pseudo random number $r_i$. In other words, in the present embodiment, the pseudo random number generator 11 is configured so that "the reset (rewinding) of the pseudo random number output is possible in no case". Instead of this, in the present embodiment, the counter 33 and the nonvolatile memory 34 are so designed as to be capable of outputting "what number pseudo random number has been output" if there is a request from the outside.

Furthermore, the modulation pseudo random number generator 11 in the third embodiment is capable of advancing the modulation pseudo random number $r_i$ (that is, the number of output times) one by one by performing dummy inputting of a clock signal and of generating and outputting a modulation pseudo random number $r_i$ from a desired number of output times (N-th) ahead of the current number of output times by setting a desired number of output times (for example, N) to the nonvolatile memory 34, which will be described later. However, it is not possible to cause the modulation pseudo random number generator 11 to generate a modulation pseudo random number $r_i$ from a number of output times by setting the number of output times before the current number of output times (for example M) (N<M). Either way, the modulation pseudo random number generator 11 in the third embodiment has "the specifications that the modulation pseudo random number $r_i$ to be generated can be advanced but cannot be retrograded".

The identification number ROM 31 holds the identification number (ID number) inherent to the encryptor 10C and the identification number is output to the outside from the ROM 31 at the request for the output of the identification number from the outside. The identification number has no numerical relationship with the encryption key (seed) held in the encryption key ROM 32, however, it corresponds to the encryption key (seed) in a one-to-one manner and with this identification number, it is made possible to identify the cryptogram decoder 20C to be synchronized with the encryptor 10C, that is, the cryptogram decoder 20C holding the same encryption key (seed) as the encryption key (seed) held in the encryption key ROM 32 of the encryptor 10C.

The encryption key ROM 32 holds the encryption key (seed) used in the modulation pseudo random number generator 11 and the modulation pseudo random number generator 11 in the third embodiment generates the modulation pseudo random number $r_i$ based on the encryption key (seed) held in the ROM 32.

The counter 33 counts the number of input times of a clock signal input from the outside to cause the modulation pseudo random number generator 11 to perform the pseudo random number generation operation, that is, the number of output times of the modulation pseudo random number $r_i$ from the modulation pseudo random number generator 11.

The nonvolatile memory (first hold section) 34 holds the number of output times (the number of input times of the clock signal) counted by the counter 33 and also has the function of outputting the held number of output times to the outside (outside the encryptor 10C/outside the tamper-resistant region 60) in response to an output command from the outside (outside the encryptor 10C/outside the tamper-resistant region 60). Further, the nonvolatile memory 34 is configured so that a desired number of output times (for example, N) is set from the outside (outside the encryptor 10C/outside the tamper-resistant region 60) and when the number of output times is set to the nonvolatile memory 34, the number of output times is further set to the counter 33 from the nonvolatile memory 34. Then, the modulation pseudo random number generator 11 is configured so as to generate a modulation pseudo random number $r_i$ from the N-th number corresponding to the number of output times set to the counter 33 based on the encryption key (seed) held in the encryption key ROM 32.

As described above, as the modulation pseudo random number generator 11 that generates a modulation pseudo random number $r_i$ from the N-th number corresponding to the number of output times set to the counter 33 based on the encryption key (seed) held in the encryption key ROM 32, for example, a BBS (Blum, Blum, and Shub) generator is used (for example, refer to L. Blum, M. Blum, and M. Shub, "A Simple Unpredictable Pseudo-Random Number Generator", SIAM Journal on Computing, v. 15, n.2, 1986, pp. 364-383). With this BBS generator, it is possible to calculate the N-th modulation pseudo random number $r_i$ directly from the "seed" (encryption key).

Therefore, in the third embodiment, the modulation pseudo random number generator 11 is capable of sequentially generating the modulation pseudo random number $r_i$ each time a clock signal is input and in addition, of generating the N-th modulation pseudo random number $r_i$ directly from the encryption key (seed) held in the encryption key ROM 32 only by setting the number of output times N to the counter 33 (the nonvolatile memory 34).

Further, in the third embodiment, the number of output times of the modulation pseudo random number $r_i$ (the number of input times of the clock signal) from the modulation pseudo random number generator 11 is counted by the counter 33 at all times and recorded in the nonvolatile memory 34, therefore, even if the power of the encryptor 10C is cut off, when the power is turned on next time, the modulation pseudo random number generator 11 will start the output of the pseudo random number from one next to the pseudo random number output last before the power is cut off.

By the way, the dummy inputting of a clock to the modulation pseudo random number generator 11 or setting of the number of output times to the nonvolatile memory 34 is performed at the request of a user at the time of initial setting and in addition, it is performed by the synchronization adjustment section 53 (refer to FIG. 21) in order to adjust the synchronization between the encryptor 10C and the cryptogram decoder 20C (to eliminate the synchronization shift that has occurred in the pseudo random number generation operation between the pseudo random number generators 11 and 21), as described above.

In the encryptor 10C configured as described above, as an interface between the inside and the outside of the tamper-resistant region 60, those in the following items (21) to (28) are required.

(21) Input of plain text (input $x_i$ to the modulation section 13)

(22) Output of cipher text (output $s_i$ from the modulation section 13)

(23) Input of an output command of a device identification number (an output command to the identification number ROM 31)

(24) Output of a device identification number (output from the identification number ROM 31 in accordance with the output command of (23))

(25) Input of a clock signal (input to the counter 33/modulation pseudo random number generator 11)

(26) Input of an output command of the number of output times of a pseudo random number (an output command to the nonvolatile memory 34)

(27) Output of the number of output times of a pseudo random number (output from the nonvolatile memory 34 in accordance with the output command of (26))

(28) Input of the setting of the number of output times of a pseudo random number (input to the nonvolatile memory 34)
At this time, as described above, the number of output times set to the nonvolatile memory 34 (the counter 33) by the input interface of the item (28) can be set at all times only in the direction of increment, however, it may also be possible to omit the input interface of the item (28) and perform the setting of the number of output times by performing dummy inputting of a clock signal for the counter 33/modulation pseudo random number generator 11.

Next, the configuration of the cryptogram decoder 20C will be explained with reference to FIG. 23. FIG. 23 is a block diagram showing the configuration of the cryptogram decoder 20C as the third embodiment of the present invention and the cryptogram decoder 20C shown in FIG. 23 is configured so as to provide the demodulation pseudo random number generator 21 and the demodulation section 22 as those in the cryptogram decoder 20 in the first embodiment, and in addition, an identification number ROM (Read Only Memory) 41, an encryption key ROM (Read Only Memory) 42, a counter 43, and the nonvolatile memory 44.

Then, the cryptogram decoder 20C in the present embodiment is arranged in the tamper-resistant region 60 for preventing leakage of the encryption key for pseudo random number generation or of the pseudo random number $r_i$ from the pseudo random number generator 11. Here, the tamper-resistant region 60 in which the cryptogram decoder 20C in the third embodiment is arranged provides such a structure like the following items (31) to (35). By the way, the cryptogram decoder 20C (the tamper-resistant region 60) shown in FIG. 23 is configured, for example, on a single chip (not shown).

(31) A structure with which the encryption key of the encryption key ROM 42 (that is, the "seed" of the pseudo random number $r_i$) cannot be read even if the chip is disassembled. For example, if the chip is disassembled in an attempt to read the encryption key in the ROM 42, the ROM 42 breaks.

(32) A structure with which the signal line of the pseudo random number $r_i$ (the signal line between the pseudo random number generator 21 and the demodulation section 22) cannot be tapped even if the chip is disassembled. For example, a wiring structure with which the chip does not work any longer if the chip is broken in an attempt to tap the signal line of the pseudo random number $r_i$.

(33) A structure from which the identification number of the identification number ROM 41 can be read but cannot be tampered.

(34) A structure with which information (for example, the number of output times counted by the counter 43, as will be described later) held in the nonvolatile memory 44 cannot be tampered.

(35) A structure that prevents the pseudo random number generator 21 from being accessed directly by avoiding the counter 43 and the pseudo random number generator 21 from generating a pseudo random number $r_i$ with an arbitrary number of order. For example, a wiring structure with which the signal line between the counter 43 and the pseudo random number generator 21 cannot be tapped even if the chip is disassembled and the chip does not operate any longer if the chip is broken in an attempt to tap the signal line.

Figure 23:
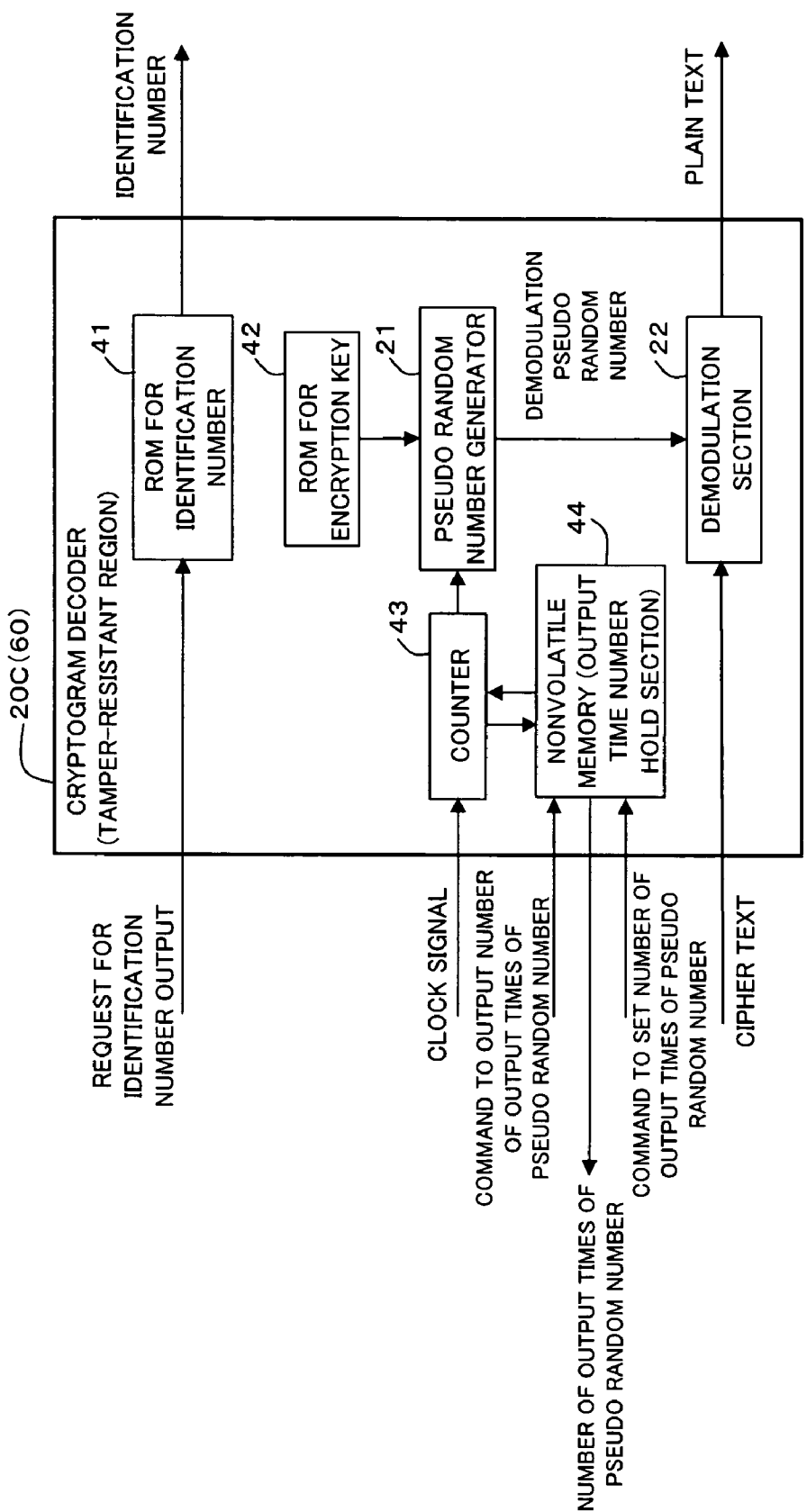
FIG. 23 is a block diagram showing a configuration of a cryptogram decoder as the third embodiment of the present invention.

By the way, in the cryptogram decoder 20C shown in FIG. 23, although the channel decoding section 23 (refer to FIG. 2, FIG. 12 and FIG. 15) is not shown schematically, however, the channel decoding section 23 is provided like the first and second embodiments if the channel coding section 14 is provided on the encryptor 10C side. When the channel decoding section 23 is provided, the channel decoding section 23 may be arranged in the tamper-resistant region 60 or outside the tamper-resistant region 60.

Further, the demodulation pseudo random number generator 21 in the third embodiment is also configured so as to prohibit reset and repetition of the generation operation of the modulation pseudo random number $r_i$, like the modulation pseudo random number generator 11 in the third embodiment. In other words, in the present embodiment, the pseudo random number generator 21 is configured so that "the reset (rewinding) of the pseudo random number output is possible in no case". Instead of this, in the present embodiment, if there is a request from the outside, "what number pseudo random number has been output" is output by the function of the counter 43 and the nonvolatile memory 44, which will be described later.

Furthermore, the demodulation pseudo random number generator 21 in the third embodiment is also capable of advancing the demodulation pseudo random number $r_i$ (that is, the number of output times) one by one by performing dummy inputting of a clock signal and of generating and outputting a demodulation pseudo random number $r_i$ from a desired number of output times (N-th) ahead of the current number of output times by setting a desired number of output times (for example, N) to the nonvolatile memory 44, which will be described later. However, it is not possible to cause the demodulation pseudo random number generator 21 to generate a modulation pseudo random number $r_i$ from a number of output times by setting the number of output times before the current number of output times (for example M) (N<M). Either way, the demodulation pseudo random number generator 21 in the third embodiment has "the specifications that the demodulation pseudo random number $r_i$ to be generated can be advanced but cannot be retrograded at all".

The identification number ROM 41 holds the identification number (ID number) inherent to the cryptogram decoder 20C and the identification number is output to the outside from the ROM 41 at the request for the output of the identification number from the outside. The identification number has no numerical relationship with the encryption key (seed) held in the encryption key ROM 42, however, with this identification number, it is made possible to identify the encryptor 10C to be synchronized with the cryptogram decoder 20C, that is, the encryptor 10C holding the same encryption key (seed) as the encryption key (seed) held in the encryption key ROM 42 of the cryptogram decoder 20C.

The encryption key ROM 42 holds the encryption key (seed) used in the demodulation pseudo random number generator 21 and the demodulation pseudo random number generator 21 in the third embodiment generates the demodulation pseudo random number $r_i$ based on the encryption key (seed) held in the ROM 42.

The counter 43 counts the number of input times of a clock signal input from the outside to cause the demodulation pseudo random number generator 21 to perform the pseudo random number generation operation, that is, the number of output times of the demodulation pseudo random number $r_i$ from the demodulation pseudo random number generator 21.

The nonvolatile memory (first hold section) 44 holds the number of output times (the number of input times of the clock signal) counted by the counter 43 and also has the function of outputting the held number of output times to the outside (outside the cryptogram decoder 20C/outside the tamper-resistant region 60) in response to an output command from the outside (outside the cryptogram decoder 20C/outside the tamper-resistant region 60). Further, the nonvolatile memory 44 is configured so that a desired number of output times (for example, N) is set from the outside (outside the cryptogram decoder 20C/outside the tamper-resistant region 60) and when the number of output times is set to the nonvolatile memory 44, the number of output times is further set to the counter 43 from the nonvolatile memory 44. Then, the demodulation pseudo random number generator 21 is configured so as to generate a demodulation pseudo random number $r_i$ from the N-th number corresponding to the number of output times set to the counter 43 based on the encryption key (seed) held in the encryption key ROM 42. As the demodulation pseudo random number generator 21, for example, a BBS generator is used like the modulation pseudo random number generator 11 in the third embodiment.

Therefore, in the third embodiment, the demodulation pseudo random number generator 21 is capable of sequentially generating the demodulation pseudo random number $r_i$ each time a clock signal is input and in addition, of generating the N-th demodulation pseudo random number $r_i$ directly from the encryption key (seed) held in the encryption key ROM 42 only by setting the number of output times N to the counter 43 (the nonvolatile memory 44).

Further, in the third embodiment, the number of output times of the demodulation pseudo random number $r_i$ (the number of input times of the clock signal) from the demodulation pseudo random number generator 21 is counted by the counter 43 at all times and recorded in the nonvolatile memory 44, therefore, even if the power of the cryptogram decoder 20C is cut off, when the power is turned on next time, the demodulation pseudo random number generator 21 will start the output of the pseudo random number from one next to the pseudo random number output last before the power is cut off.

By the way, the dummy inputting of a clock to the demodulation pseudo random number generator 21 or setting of the number of output times to the nonvolatile memory 44 is performed at the request of a user at the time of initial setting etc. and in addition, it is performed by the synchronization adjustment section 53 (refer to FIG. 21) in order to adjust the synchronization between the encryptor 10C and the cryptogram decoder 20C (to eliminate the synchronization shift that has occurred in the pseudo random number generation operation between the pseudo random number generators 11 and 21), as described above.

In the cryptogram decoder 20C configured as described above, as an interface between the inside and the outside of the tamper-resistant region 60, those in the following items (41) to (48) are required.

(41) Input of cipher text (input $c_i$ to the demodulation section 22)

(42) Output of plain text (output $x_i$ from the demodulation section 22)

(43) Input of an output command of a device identification number (an output command to the identification number ROM 41)

(44) Output of a device identification number (output from the identification number ROM 41 in accordance with the output command of (43))

(45) Input of a clock signal (input to the counter 43/demodulation pseudo random number generator 21)

(46) Input of an output command of the number of output times of a pseudo random number (an output command to the nonvolatile memory 44)

(47) Output of the number of output times of a pseudo random number (output from the nonvolatile memory 44 in accordance with the output command of (46))

(48) Input of the setting of the number of output times of a pseudo random number (input to the nonvolatile memory 44)

At this time, as described above, the number of output times set to the nonvolatile memory 44 (the counter 43) by the input interface of the item (48) can be set at all times only in the direction of increment, however, it may also be possible to omit the input interface of the item (48) and perform the setting of the number of output times by performing dummy inputting of a clock signal for the counter 43/demodulation pseudo random number generator 21.

By the way, in the third embodiment, the encryptor 10C is configured similarly to the encryptor 10 shown in FIG. 1, however, it may also be configured so as to provide the same configuration as the encryptor 10A shown in FIG. 11 or the encryptor 10B shown in FIG. 14. Further, in the third embodiment, the cryptogram decoder 20C is configured similarly to the encryptor 20 shown in FIG. 2, however, it may also be configured so as to provide the same configuration as the cryptogram decoder 20A shown in FIG. 12 or the cryptogram decoder 20B shown in FIG. 15.

According to the communication system 1 (the encryptor 10C and the cryptogram decoder 20C) thus configured as the third embodiment of the present invention, encryption communication to which the encryption technique in the present embodiment has been applied is realized between the communication device 1a and the communication device 1b and the same function and effect as those in the first and second embodiments can be obtained.

Further, for the communication system 1 in the third embodiment, it is possible to secure an extremely high encryption strength against a known plain text attack by applying the encryption technique in the first embodiment and the second embodiment, as described above, therefore, it is no longer necessary to perform redistribution of the intricate encryption key using the public key encryption and it is possible to use the fixed encryption key by embedding it in the encryptor 10C and the cryptogram decoder 20C in the communication devices 1a and 1b, respectively. Furthermore, by embedding the encryption key in the encryptor 10C and the cryptogram decoder 20C in the communication devices 1a and 1b, respectively, it is possible to operate the communication system until its life is reached in a state in which such high secrecy that the encryption key is secret even to the user is maintained.

In the communication system 1 in the third embodiment, the encryptor 10C and the cryptogram decoder 20C are arranged, respectively, in the tamper-resistant region 60 on the chip, therefore, the tamper-resistant properties are secured and the input/output between the tamper-resistant region 60 and the outside is limited to those shown in the above-mentioned items (21) to (28) and (41) to (48).

Due to this, it is absolutely not possible to read the pseudo random number $r_i$ generated by the pseudo random number generators 11 and 12 or the encryption key held in the ROMs 32 and 42 to the outside of the tamper-resistant region 60 through the interface in the above-items (21) to (28) and (41) to (48). Further, by employing the tamper-resistant region 60 that provides the structure in the above-mentioned items (11) to (17) and the above-mentioned items (31) to (35), it is absolutely not possible to read the encryption key held in the ROMs 32 and 42, or to tap the signal line of the pseudo random number $r_i$, or to tap the signal line of the physical random number $f_i$ even by disassembling the chip and furthermore, even if physical disturbance (heat or voltage) is applied from the outside of the chip, the probability distribution of the physical random number $f_i$ from the physical random number generator 12 does not change.

Therefore, it is possible to prevent without fail an interceptor etc. from stealing a pseudo random number $r_i$, an encryption key, or a random number table to utilize them to decode cryptogram. Further, even if an interceptor etc. tries to make a chosen plain text attack in a state in which the output of the physical random number generator 12 is biased by stealing the encryptor 10C itself and applying physical disturbance, the probability distribution of the physical random number $f_i$ from the physical random number generator 12 does not change (or the operation stops when physical disturbance is applied) therefore, even if a chosen plain text attack is made, it becomes not possible to decode the output from the encryptor 10C because of the fluctuation of the physical random number $f_i$ (or because the output from the encryptor 10C cannot be obtained any more when the operation stops) and inverse calculation of the encryption key (seed) is not possible, therefore, it is possible to secure an extremely high encryption strength against a chosen plain text attack also.

Furthermore, the pseudo random number generators 11 and 21 are configured so as to prohibit reset and repetition of generation operation of the pseudo random number $r_i$ and "the reset (rewinding) of the pseudo random number output is possible in no case", therefore, even if an interceptor etc. steals the encryptor 10C or the cryptogram decoder 20C, it is not possible to reset (rewind) the pseudo random number $r_i$ to repeatedly generate and output the same pseudo random number sequence for reuse. Therefore, it is unlikely that extra information that can be used to decode the encryption key (seed) is provided to an interceptor etc. and it is possible to secure an extremely high encryption strength against a chosen plain text attack to the encryptor 10C and a chosen cipher text attack to the cryptogram decoder 20C also by preventing the interceptor from decoding or inversely calculating the encryption key without fail.

Here, by the way, a chosen plain text attack is an attack in which an interceptor etc. steals the encryptor 10C and inversely calculates an encryption key (seed) from cipher text obtained by inputting plain text consisting of "0" or "1" only to the encryptor 10C (black box test). A chosen cipher text attack is an attack in which an interceptor etc. steals the cryptogram decoder 20C and inversely calculates an encryption key (seed) by conducting ablack box test of the cryptogram decoder 20C.

On the other hand, in the communication system 1 in the third embodiment, when the need arises to synchronize the pseudo random number generation operation in the communication device 1a with the pseudo random number generation operation in the communication device 1b, for example, at the time of restoration after an abnormal stop caused by power failure etc., the transmission/reception section 52 in the communication device 1a and the transmission/reception section 52 in the communication device 1b perform open communication therebetween and the number of output times of the modulation pseudo random number $r_i$ and that of the demodulation pseudo random number $r_i$ (read from the nonvolatile memories 34 and 44, respectively) are exchanged as synchronization information.

Then, when performing synchronization processing of the pseudo random number $r_i$ in the communication devices 1a and 1b, the synchronization adjustment section 53 in each of the communication devices 1a and 1b increments the number of output times with less value of the number of output times by setting the number of output times for the nonvolatile memory 34 of the encryptor 10C or the nonvolatile memory 44 of the cryptogram decoder 20C, or by performing dummy inputting of a clock signal to the pseudo random number generator 11 or 21, and matches the number of output times of the pseudo random number generator 11 in the encryptor 10C with the number of output times of the pseudo random number generator 21 in the cryptogram decoder 20C, and synchronizes the pseudo random number generation operation of the pseudo random number generator 11 in the encryptor 10C with the pseudo random number generation operation of the pseudo random number generator 21 in the cryptogram decoder 20C.

Encryption/cryptogram decoding technique in the fourth embodiment

As shown in FIG. 21, the communication system 1A in the fourth embodiment is also configured so as to provide the two communication devices 1a and 1b connected to each other so that communication is possible via a communication network etc., like the communication system 1 in the third embodiment. As described above, in the communication system 1A in the forth embodiment, a case where the two communication devices 1a and 1b are connected so that communication is possible by a communication channel (a signal line) without tampering and the two communication devices 1a and 1b perform synchronization processing by open communication is explained.

Both the communication devices 1a and 1b have the same configuration and in the communication system 1A in the fourth embodiment, the communication device 1a is configured so as to provide an encryptor 10D for encrypting input data (plain text $x_i$) to be transmitted to the communication device 1b by the method described above in the first or second embodiment, a cryptogram decoder 20D for decoding the encrypted data ($c_i$ or $s_i$) received from the communication device 1b by the method described above in the first or second embodiment, and the transmission/reception section 52 and the synchronization adjustment section 53 described above, and the communication device 1b is configured so as to provide the encryptor 10D for encrypting input data (plain text $x_i$) to be transmitted to the communication device 1a by the method described above in the first or second embodiment, the cryptogram decoder 20D for decoding the encrypted data (cipher text $c_i$ or $s_i$) received from the communication device 1a by the method described above in the first or second embodiment, and the transmission/reception section 52 and the synchronization adjustment section 53 described above. By the way, the configuration of the encryptor 10D is to be described later with reference to FIG. 24 and the configuration of the cryptogram decoder 20D is to be described later with reference to FIG. 25.

However, as described later with reference to FIG. 24 and FIG. 25, the encryptor 10D in the fourth embodiment is configured so as to transmit a coded signal ($s_i$) obtained by the modulation section 13 to the destination communication device 1a or 1b as a plurality of packets and the cryptogram decoder 20D in the fourth embodiment is configured so as to demodulate the coded signal ($s_i$) in each packet received from the encryptor 10D of the sender communication device 1a or 1b into input data (plain text $x_i$).

In particular, the communication system 1A in the fourth embodiment (the encryptor 10D and the cryptogram decoder 20D) aims at communication using a communication channel in which the order of arrival of packets may be changed or a packet may become extinct such as the IP (Internet Protocol) network and a system that needs to recognize whether or not the individual packets are transmitted from a legitimate transmitter (specifically, a communication system of IP telephone).

Further, also in the communication system 1A in the fourth embodiment, the encryptor 10D in the communication device 1a and the cryptogram decoder 20D in the communication device 1b are paired and the pseudo random number generators 11 and 21 in the devices 10D and 20D (refer to FIG. 24 and FIG. 25) are configured so as to synchronize and generate a pseudo random number $r_i$ based on the same encryption key. Similarly, the encryptor 10D in the communication device 1b and the cryptogram decoder 20D in the communication device 1a are paired and the pseudo random number generators 11 and 21 in the devices 10D and 20D are also configured so as to synchronize and generate a pseudo random number $r_i$ based on the same encryption key. However, as the encryption key used in each pair of devices described above, different keys are set.

With such a configuration, the transmission data from the communication device 1a to the communication device 1b is encrypted by the above-mentioned encryption procedure by the encryptor 10D and transmitted to the communication device 1b as the cipher text and on the communication device 1b side, the cipher text received from the communication device 1a is decoded into plain text by the above-mentioned cryptogram decoding procedure by the cryptogram decoder 20D. Similarly, the transmission data from the communication device 1b to the communication device 1a is encrypted by the above-mentioned encryption procedure by the encryptor 10D and transmitted to the communication device 1a as the cipher text and on the communication device 1a side, the cipher text received from the communication device 1b is decoded into plain text by the above-mentioned cryptogram decoding procedure by the cryptogram decoder 20D. By the way, in the communication system 1A in the fourth embodiment, the transmission/reception section 52 and the synchronization adjustment section 53 are the same as those explained in the third embodiment, therefore, their explanation is omitted.

Next, the configuration of the encryptor 10D will be explained with reference to FIG. 24. FIG. 24 is a block diagram showing the configuration of the encryptor 10D as the fourth embodiment of the present invention and the encryptor 10D shown in FIG. 24 is configured so as to provide the modulation pseudo random number generator 11, the physical random number generator 12, the modulation section 13, the identification number ROM 31, the encryption key ROM 32, the counter 33, and the nonvolatile memory 34, like those in the encryptor 10C in the third embodiment, and in addition, an incorporation section 35 and a packet section 36.

Then, the encryptor 10D in the present embodiment is also arranged in the tamper-resistant region 60 (what provides the structure like the above-mentioned items (11) to (17)) on a chip (not shown) like the encryptor 10C in the third embodiment. However, the packet section 36 may be arranged outside the tamper-resistant region 60. By the way, in FIG. 24, the same symbols as those already described denote the same or substantially the same portions, therefore, their explanation is omitted.

Figure 24:
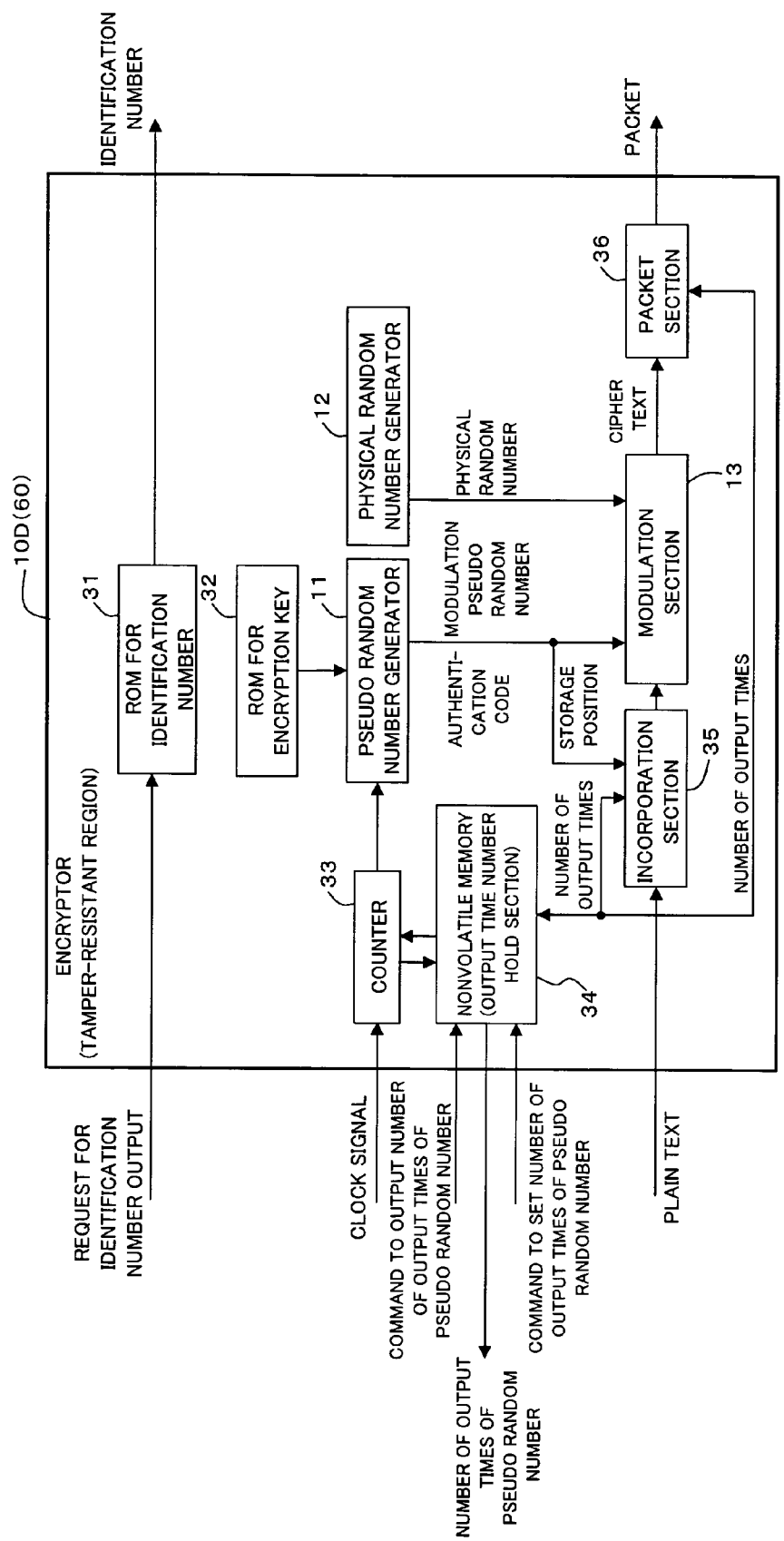
FIG. 24 is a block diagram showing a configuration of an encryptor as the fourth embodiment of the present invention.

Further, like the third embodiment, the encryptor 10D shown in FIG. 24 may be provided with the channel coding section 14 (refer to FIG. 1, FIG. 11 and FIG. 14), although not shown here, like the first and second embodiments, or may not be provided therewith. When the channel coding section 14 is provided, the channel coding section 14 may be arranged in the tamper-resistant region 60 or outside the tamper-resistant region 60.

The incorporation section 35 divides input data $x_i$ into packet units [data units of a certain amount to be stored in a container section of a packet as shown in FIG. 26(B)] to be dealt with as a container section of a packet by the packet section 36, which will be described later, and obtains the number of output times (the value indicating what number pseudo random number) from the pseudo random number generator 11 of the modulation pseudo random number $r_i$ used when modulating the first data $x_i$ in the packet unit in the modulation section 13 based on the current count value counted by the counter 33 (the nonvolatile memory 34) for each packet unit, and incorporates the obtained number of output times in the packet units (within input data of a certain amount) and at the same time, incorporates a predetermined pseudo random number sequence from the pseudo random number generator 11 in the packet units (within input data of a certain amount) as to the packet unit as the unique authentication code. Due to this, the coded signal in the container section of each packet to be transmitted from the encryptor 10D to the cryptogram decoder 20D is caused to include the number of output times and the authentication code.

At this time, the incorporation section 35 determines the storage position of the number of output times and the authentication in the packet unit (incorporation/embedment position, that is, the storage position in the container section of each packet) based on the pseudo random number from the pseudo random number generator 11 and, as shown in FIG. 26(A), incorporates the number of output times and the authentication code so that the number of output times and the authentication code are arranged at the determined position. In other words, in the present embodiment, the incorporation position/embedment position of the number of output times and the authentication code are scrambled with the pseudo random number from the pseudo random number generator 11.

As shown in FIG. 26(B), the packet section 36 stores the packet unit divided in the incorporation section 35 and modulated in the modulation section 13 in the container section and, by creating and attaching a header section not modulated or encrypted to the container section, creates a packet (performs packeting of the modulation result) and transmits it to the communication device 1a or 1b of the other party (destination) of communication. At this time, as shown in FIG. 26(B), the packet section 36 describes that is the same number of output times as incorporated in each packet unit without modulation. As the needs arise, the packet section 36 may describe the identification number of the encryption key used in the encryptor 10D (ID number; the device identification number held in the ROM 31) in the head section without modulation.

FIG. 26(A) is a diagram showing an example of incorporation of the authentication code and the number of output times into input data (plain text) performed by the incorporation section 35 in the fourth embodiment and FIG. 26(B) is a diagram showing an example in which the input data (plain text) shown in FIG. 26(A) is packeted by the packet section 36, which will be described later. Further, instead of the number of output times, a serial number indicating the order of transmission of the packet may be incorporated in the packet unit. Furthermore, the encryptor 10D is also provided with one corresponding to the above-mentioned items (21) to (28) as an interface between the inside and the outside of the tamper-resistant region 60.

Next, the configuration of the cryptogram decoder 20D will be explained with reference to FIG. 25. FIG. 25 is a block diagram showing the configuration of the cryptogram decoder 20D as the fourth embodiment of the present invention and the cryptogram decoder 20D shown in FIG. 25 is configured so as to provide the demodulation pseudo random number generator 21, the demodulation section 22, the identification number ROM 41, the encryption key ROM 42, the counter 43, and the nonvolatile memory 44, like those in the cryptogram decoder 20C in the third embodiment, and in addition, a FIFO memory 45, a permutation section 46, a take-out section 47, a comparison section 48, a packet extinction judgment section 49, a packet discard section 50, and a number of output times adjustment section 54.

Then, the cryptogram decoder 20D in the present embodiment is also arranged in the tamper-resistant region 60 (that provides the structure like the above-mentioned items (31) to (35)) on a chip (not shown) like the cryptogram decoder 20C in the third embodiment. By the way, in FIG. 25, the same symbols as those already described denote the same or substantially the same portions, therefore, their explanation is omitted.

Figure 25:
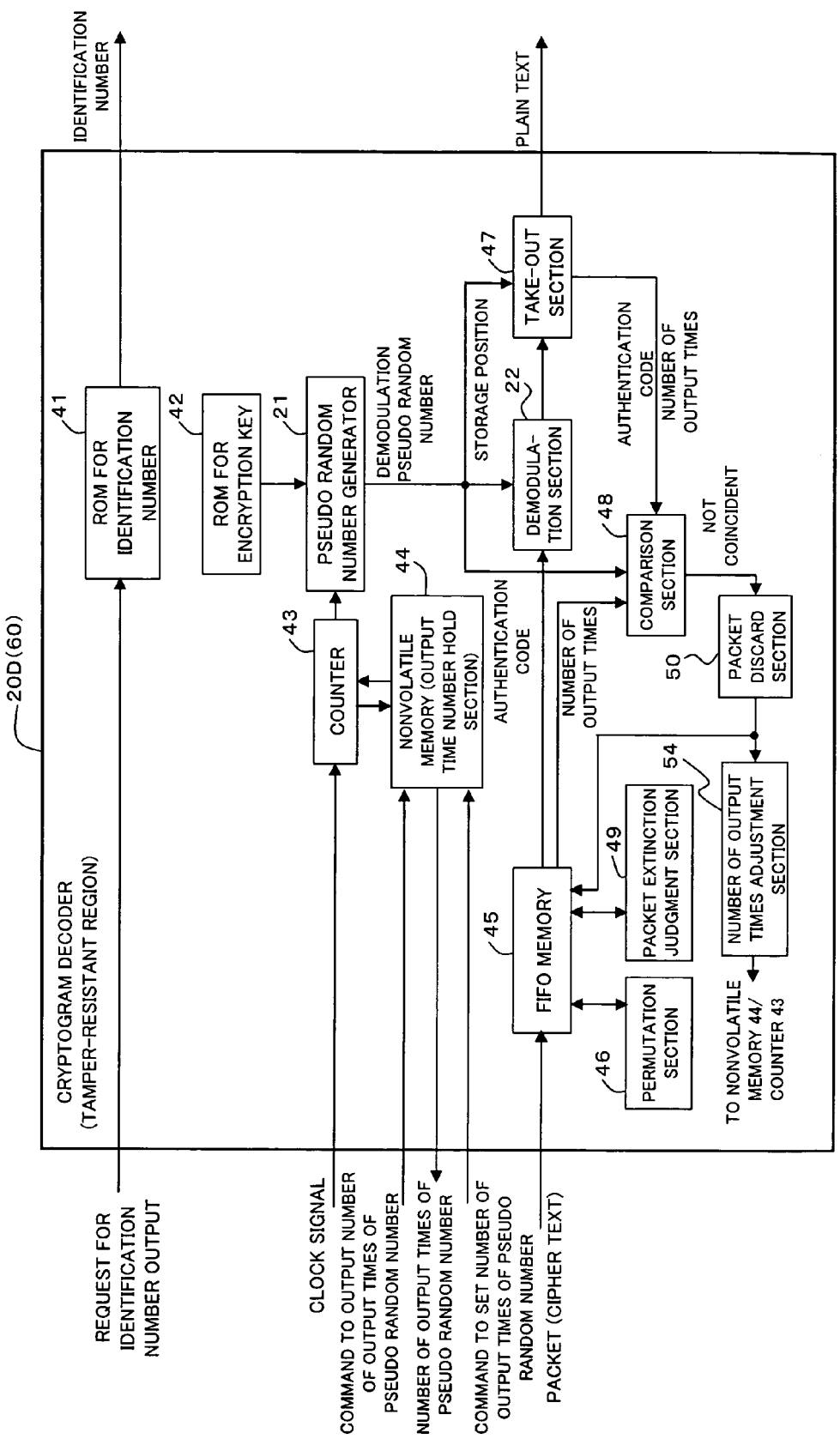
FIG. 25 is a block diagram showing a configuration of a cryptogram decoder as the fourth embodiment of the present invention.

Further, like the third embodiment, the cryptogram decoder 20D shown in FIG. 25 may be provided with the channel decoding section 23 (refer to FIG. 2, FIG. 12 and FIG. 15), although not shown here, and like the first and second embodiments, when the channel coding section 14 is provided on the encryptor 10D side, the channel decoding section 23 is provided. When the channel decoding section 23 is provided, the channel decoding section 23 may be arranged in the tamper-resistant region 60 or outside the tamper-resistant region 60.

The FIFO (First In First Out) memory 45 is a sufficiently long reception memory and functions as a packet hold section for holding a plurality of packets received from the encryptor 10D of the communication device 1a or 1b of the other party of communication (the sender).

The permutation section 46 permutates the plurality of packets held in the FIFO memory 45 into a sequence in accordance with the number of output times (or the serial number) described in the header section of each packet in the FIFO memory 45 and inputs the coded signal in the container section of the packet from the FIFO memory 45 into the demodulation section 22 in the sequence in accordance with the number of output times.

The take-out section 47 takes out the number of output times and the authentication code incorporated by the incorporation section 35 from the demodulation result by the demodulation section 22 based on the demodulation pseudo random number (the same as the modulation pseudo random number used at the time of incorporation by the incorporation section 35) generated by the demodulation pseudo random number generator 21 and outputs the demodulation result from which the number of output times and the authentication code have been taken out as a formal demodulation result to the outside of the cryptogram decoder 20D.

The comparison section (the first comparison section, the second comparison section) 48 compares the number of output times described in the header section of each packet and the number of output times taken out by the take-out section 47 from the demodulation result by the demodulation section 13 and compares the authentication code taken out by the take-out section 47 from the demodulation result by the demodulation section 13 and the demodulation pseudo random number sequence corresponding to the authentication code generated by the demodulation pseudo random number generator 21.

The packet extinction judgment section 49 judges, when, after receiving one of the plurality of packets from the encryptor 10D, the packet to be received in accordance with the number of output times (or the serial number) described in the header section of the packet is not received within a predetermined time, that the packet has become extinct.

The packet discard section 50 discards a packet when the result of comparison by the comparison section 48 is that the numbers of output times (or the serial numbers) do not coincide or the authentication codes do not coincide.

The number of output times adjustment section 54 adjusts, when the packet discard section 50 has discarded the packet or when the packet extinction judgment section 49 has judged that the packet has become extinct, the number of output times of the demodulation pseudo random number $r_i$ output from the demodulation pseudo random number generator 21 to the demodulation section 22 to the number of output times of the packet normally received after the discarded packet or the packet judged to have become extinct (the number of output times of the modulation pseudo random number $r_i$ used when modulating the first data $x_i$ in the packet unit included in the container section of the packet). On this occasion, the number of output times adjustment section 54 is designed so as to perform adjustment of the number of output times from the pseudo random number generator 21 by performing the setting of the number of output times for the nonvolatile memory 44 of the cryptogram decoder 20D or performing dummy inputting of a clock signal for the pseudo random number generator 21, like the synchronization adjustment section 53 in the third embodiment.

By the way, the cryptogram decoder 20D is also provided with one corresponding to the above-mentioned items (41) to (48) as an interface between the inside and the outside of the tamper-resistant region 60.

In the fourth embodiment, the FIFO memory 45, the permutation section 46, the packet extinction judgment section 49, the packet discard section 50, and the number of output times adjustment section 54 are arranged within the tamper-resistant region 60, however, each of these components does not utilize the pseudo random number directly, therefore, they can be arranged outside the tamper-resistant region 60.

Further, in the fourth embodiment, the encryptor 10D is configured similarly to the encryptor 10 shown in FIG. 1, however, it may be configured so as to have the same configuration as that of the encryptor 10A shown in FIG. 11 or the encryptor 10B shown in FIG. 14. Furthermore, in the fourth embodiment, the cryptogram decoder 20D is configured similarly to the encryptor 20 shown in FIG. 2, however, it may be configured so as to have the same configuration as that of the cryptogram decoder 20A shown in FIG. 12 or the cryptogram decoder 20B shown in FIG. 15.

According to the communication system 1A (the encryptor 10D and the cryptogram decoder 20D) configured in such a manner as the fourth embodiment of the present invention, encryption communication to which the encryption technique in the present embodiment has been applied is realized between the communication device 1a and the communication device 1b, therefore, the same function and effect as those in the first and second embodiments can be obtained and in addition, the same function and effect as those of the communication system 1 (the encryptor 10C and the cryptogram decoder 20C) in the third embodiment can also be obtained.

Further, also in each of the communication devices 1a and 1b of the communication system 1A in the fourth embodiment, the encryptor 10D and the cryptogram decoder 20D are arranged within the tamper-resistant region 60, therefore, it is not possible to tap not only the signal line between the pseudo random number generators 11 and 21 and the modulation section 13 or the demodulation section 22 but also the signal line between the pseudo random number generators 11 and 21 and each component and even if the chip is disassembled, like the third embodiment, it is absolutely impossible to read the encryption key held in the ROMs 32 and 42, to tap the signal line of the pseudo random number $r_i$, or to tap the signal line of the physical random number $f_i$ and further, even if physical disturbance is applied from the outside of the chip, the probability distribution of the physical random number $f_i$ from the physical random number generator 12 does not change. Consequently, also in the communication system 1A in the fourth embodiment, the same function and effect as those of the communication system 1 in the third embodiment can be obtained.

By the way, when packet communication is performed between communication devices 1a and 1b, if the sequence of the packets is changed, there is no longer correspondence between the modulation pseudo random number and the demodulation pseudo random number and it is not possible for the cryptogram decoder 20D to correctly decode the cipher text (the coded signal) in the packet, the order of which in the sequence has been changed, and garbled letters etc. may occur.

Therefore, in the communication system 1A in the fourth embodiment, in order for the cryptogram decoder 20D side to recognize whether or not the sequence of the arrived packets is changed from the original one, the raw number of output times (or serial number) not modulated or encrypted is described in the header section of the packet.

Due to this, even if the sequence of a plurality of packets is changed during transmission and the sequence when being received by the communication device 1a or 1b is different from that when being transmitted, it is possible for the permutation section 46 to permutate the received packets into the correct sequence after packet reception, by referring to the number of output times (serial number) described in the header section of each packet in the FIFO memory 45 and permutating the packets in the holding sequence in the FIFO memory 45. In other words, it is possible to permutate the packets in the correct sequence by referring to the number of output times (serial number) described in the header section of each packet, before sending them to the demodulation section 22. Consequently, in the communication system 1A in the fourth embodiment, when packet communication is performed between the communication devices 1a and 1b and if the sequence of the packets is changed during transmission, the reception side is capable of permutating the packets into the correct sequence, therefore, it is made possible to correctly decode the cipher text (coded signal) while maintaining the correspondence relationship between the modulation pseudo random number and demodulation pseudo random number at all times.

By the way, in the communication system 1A in the fourth embodiment, the number of output times (or serial number) of pseudo random number $r_i$ is embedded also in the coded signal (cipher text) held in the container section of each packet, and on the cryptogram decoder 20D side, the comparison section 48 compares the number of output times taken out from the container section by the take-out section 47 with the number of output times described in the header section, and if the numbers of output times do not coincide, it means that some bits have been reversed caused by the packet having been tampered or noises in the communication channel, therefore, the packet discard section 50 discards the packet.

Further, in the communication system 1A in the fourth embodiment, the authentication code (the pseudo random number sequence generated by the modulation pseudo random number generator 11) is embedded within an encrypted packet (cipher text in the container section) in order for the cryptogram decoder 20D side to recognize whether or not the packet is transmitted from a legitimate transmitter, and on the cryptogram decoder 20D side, the comparison section 48 compares the authentication code taken out from the container section by the taken-out section 47 with the demodulation pseudo random number sequence corresponding to the authentication code generated by the demodulation pseudo random number generator 21, and if the authentication codes do not coincide, it also means that some bits have been reversed caused by the packet having been tampered or noises in the communication channel, therefore, the packet discard section 50 discards the packet. By the way, after the packet is discarded, even if a packet arrives from a legitimate transmitter whose authentication code coincides therewith, the packet is discarded by the packet discard section 50.

Furthermore, in the communication system 1A in the fourth embodiment, the packet extinction judgment section 49 monitors the header section (number of output times/serial number) of the packet held in the FIFO memory 45 and if a packet to be received is not received within a predetermined time, the packet is judged to have become extinct.

Then, as described above, when the packet discard section 50 has discarded the packet or when the packet extinction judgment section 49 has judged that the packet has become extinct, the number of output times adjustment section 54 adjusts the number of output times of the demodulation pseudo random number $r_i$ output from the demodulation pseudo random number generator 21 to the demodulation section 22 to the number of output times of the packet normally received after the discarded packet or the packet judged to have become extinct, by performing the setting of the number of output times for the nonvolatile memory 44 of the cryptogram decoder 20D or performing dummy inputting of a clock signal for the pseudo random number generator 21. Due to this, even if a packet is discarded or extinction of a packet occurs, it is made possible to correctly decode the cipher text (coded signal) while maintaining the correspondence relationship between the modulation pseudo random number and demodulation pseudo random number at all times.

In the communication system 1A in the fourth embodiment, the number of output times of pseudo random number, the authentication code, and a message (input data) are stored in the container section of each packet and if the storage position is fixed, an interceptor may be able to predict the storage position, create a forged packet the message of which is exchanged by duplicating the part of the number of output times of pseudo random number and the authentication code, and pretend to be legitimate. In order to prevent this, in the communication system 1A in the fourth embodiment, the incorporation section 35 scrambles the positions of embedment when embedding the number of output times and the authentication code using the pseudo random number from the pseudo random number generator 11 as shown in FIG. 26(A) and FIG. 26(B). Due to this, it is made not possible for an interceptor etc. to pretend to be legitimate.

By the way, in the present embodiment, the number of output times and the authentication code are scrambled with pseudo random number and embedded in input data before being modulated by the modulation section 13 and the number of output times and the authentication code themselves are also demodulated by the incorporation section 35, however, it may also be possible to scramble the number of output times and the authentication code not modulated by the modulation section 13 with pseudo random number and embed them in cipher text (packet unit) after modulated by the modulation section 13. In this case, in the encryptor 10D, the incorporation section 35 is provided between the modulation section 13 and the packet section 36, and packets the cipher text in which the number of output times and the authentication code are embedded on one hand, in the cryptogram decoder 20D, the take-out section 47 is provided between the FIFO memory 45 and the demodulation section 22, and inputs the cipher text within the packet from which the number of output times and the authentication code have been taken out to the demodulation section 22, on the other. With such a configuration, it is also possible to obtain the same function and effect as those in the above-mentioned embodiments.

[11] Encryption/Cryptogram Decoding Technique in the Fifth Embodiment

Figure 27:
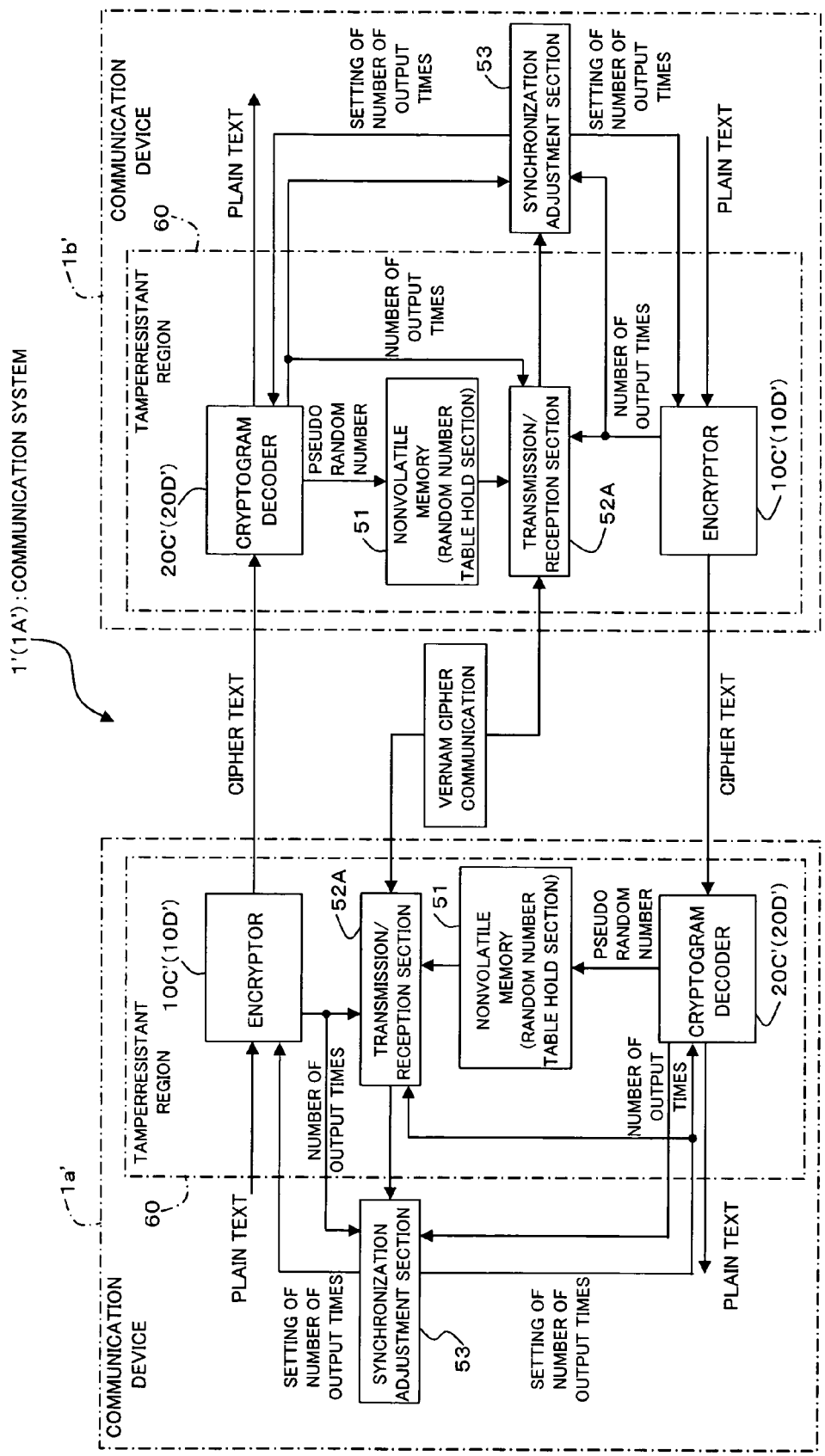
FIG. 27 is a block diagram showing an entire configuration of a communication system as fifth and sixth embodiments of the present invention.

FIG. 27 is a block diagram showing the entire configuration of the communication systems 1' and 1A' to which the encryption/cryptogram decoding technique as the fifth and sixth embodiments of the present invention has been applied and the communication system 1 in the third embodiment shown in FIG. 27 is configured so as to provide two communication devices 1a' and 1b' connected so that communication is possible to each other via a communication network etc. For the communication system 1' in the fifth embodiment and the communication system 1A' in the sixth embodiment to be described later, a case will be explained where the two communication devices 1a' and 1b' are connected so that communication is possible to each other via a communication channel (signal line) in which tampering may occur and the two communication devices 1a' and 1b' perform synchronization processing by Vernam cipher communication being described later.

The communication devices 1a' and 1b' have the same configuration and the communication device 1a' is configured so as to provide an encryptor 10C' for encrypting input data (plain text $x_i$) to be transmitted to the communication device 1b' by the method described above in the first or second embodiment, a cryptogram decoder 20C' for decoding encrypted data ($c_i$ or $s_i$) received from the communication device 1b' by the method described above in the first or second embodiment, and a nonvolatile memory 51, a transmission/reception section 52A and the synchronization adjustment section 53, and the communication device 1b' is configured so as to provide the encryptor 10C' for encrypting input data (plain text $x_i$) to be transmitted to the communication device 1a' by the method described above in the first or second embodiment, the cryptogram decoder 20C' for decoding encrypted data (cipher text $c_i$, or $s_i$) received from the communication device 1a' by the method described above in the first or second embodiment, and a nonvolatile memory 51, a transmission/reception section 52A and the synchronization adjustment section 53. The configuration of the encryptor 10C' will be described later with reference to FIG. 28 and the configuration of the cryptogram decoder 20C' will be described later with reference to FIG. 29.

Further, in the communication system 1' shown in FIG. 27, the encryptor 10C' in the communication device 1a' and the cryptogram decoder 20C' in the communication device 1b' are paired and the pseudo random number generators 11 and 21 in the devices 10C' and 20C' (refer to FIG. 28 and FIG. 29) are configured so as to synchronize and generate a pseudo random number $r_i$ based on the same encryption key. Similarly, the encryptor 10C' in the communication device 1b' and the cryptogram decoder 20C' in the communication device 1a' are paired and the pseudo random number generators 11 and 21 in the devices 10C' and 20C' are also configured so as to synchronize and generate a pseudo random number $r_i$ based on the same encryption key. However, as the encryption key used in each pair of devices described above, different keys are set.

With such a configuration, the transmission data from the communication device 1a' to the communication device 1b' is encrypted by the above-mentioned encryption procedure by the encryptor 10C' and transmitted to the communication device 1b' as the cipher text, and on the communication device 1b' side, the cipher text received from the communication device 1a' is decoded into plain text by the above-mentioned cryptogram decoding procedure by the cryptogram decoder 20C'. Similarly, the transmission data from the communication device 1b' to the communication device 1a' is encrypted by the above-mentioned encryption procedure by the encryptor 10C' and transmitted to the communication device 1a' as the cipher text, and on the communication device 1a' side, the cipher text received from the communication device 1b' is decoded into plain text by the above-mentioned cryptogram decoding procedure by the cryptogram decoder 20C'.

Here, the nonvolatile memory 51, the transmission/reception section 52A, and the synchronization adjustment section 53 are used when synchronization shift occurs for some reason in the pseudo random number generation operation of the pseudo random number generators 11 and 21, and encryption communication between the encryptor 10C' and the cryptogram decoder 20C' becomes no longer possible.

The nonvolatile memory (the second hold section) 51 holds a random number table used for encryption/cryptogram decoding by the transmission/reception section 52A, which will be described later. In the nonvolatile memories 51 and 51 of the communication devices 1a' and 1b', on the occasion, during period of normal encryption communication between the encryptor 10C' and the cryptogram decoder 20C', the same random number table is accumulated and held by exchanging random number sequences in the above-mentioned random number table by encryption communication in between periods of exchange of encrypted data.

The transmission/reception section (cryptogram transmission section/decoding and reception section) 52A encrypts the number of output times of the modulation pseudo random number or demodulation pseudo random number read from the nonvolatile memory 34 (refer to FIG. 28) or the nonvolatile memory 44 (refer to FIG. 29) based on the random number table held in the nonvolatile memory 51 and transmits it to the communication device 1a' or 1b', which is the other party of communication, as encrypted synchronization information and at the same time, decodes the encrypted synchronization information received from the communication device 1a' or 1b', which is the other party of communication, into the number of output times of the modulation pseudo random number or the demodulation pseudo random number based on the random number table held in the nonvolatile memory 51. As an encryption scheme by the transmission/reception section 52A, for example, the Vernam cipher is employed. The Vernam cipher is an encryption scheme that calculates an exclusive OR (XOR) of plain text (here, the number of output times) and the encryption key as cipher text using a random number with a length longer than the length of the plain text as the encryption key.

When synchronization shift occurs for some reason in the pseudo random number generation operation of the pseudo random number generators 11 and 21 and encryption communication between the encryptor 10C' and the cryptogram decoder 20C' becomes no longer possible, the transmission/reception sections 52A and 52A provided in the communication devices 1a' and 1b', respectively, are used and the encryption/cryptogram decoding operation is performed in synchronization in accordance with the same random number table held in the nonvolatile memories 51 and 51, respectively, and thus the above-mentioned number of output times is exchanged as the encrypted synchronization information via a communication network etc. (a signal line in which not only interception but also tampering may occur) between the communication devices 1a' and 1b' (between the transmission/reception sections 52A and 52A).

The synchronization adjustment section 53 is the same as that explained in the third and fourth embodiments, therefore, its details are not explained here. When the above-mentioned shift in synchronization occurs, the synchronization adjustment section 53 in the fifth embodiment also adjusts the number of output times from the pseudo random number generators 11 and 21 based on the number of output times read from the nonvolatile memory 34 or 44 in order to synchronize the pseudo random number generation operation by the modulation pseudo random number generator 11 (refer to FIG. 28) of the communication device 1a' with the pseudo random number generation operation by the demodulation pseudo random number generator 21 (refer to FIG. 29) of the communication device 1b', or to synchronize the pseudo random number generation operation by the modulation pseudo random number generator 11 (refer to FIG. 28) of the communication device 1b' with the pseudo random number generation operation by the demodulation pseudo random number generator 21 (refer to FIG. 29) of the communication device 1a'.

Figure 28:
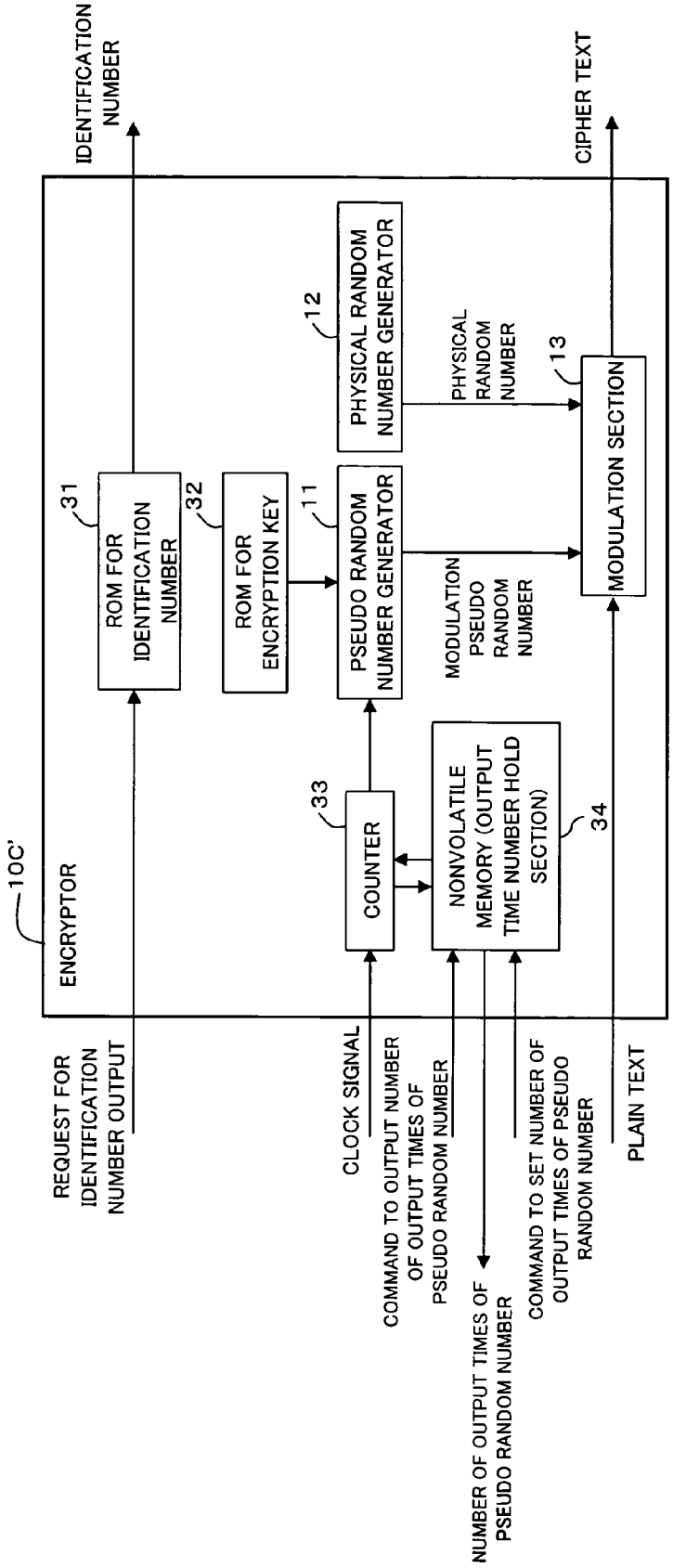
FIG. 28 is a block diagram showing a configuration of an encryptor as the fifth embodiment of the present invention.

Then, in the communication devices 1a' and 1b' in the fifth embodiment, the encryptor 10C', the cryptogram decoder 20C', the nonvolatile memory 51, and the transmission/reception section 52A described above suppress leakage of the encryption key for generating a pseudo random number and the pseudo random number $r_i$ from the pseudo random number generators 11 and 21 and at the same time, are arranged in the tamper-resistant region 60 for suppressing the probability distribution variations caused by physical disturbance of the physical random number $f_i$ generated by the physical random number generator 12 (refer to FIG. 28). Specifically, the tamper-resistant region 60 in the fifth embodiment provides the structure in the following items (51) to (59). By the way, each of the communication devices 1a' and 1b' shown in FIG. 27 is configured, for example on one chip and the tamper-resistant region 60 is provided on the chip.

(51) A structure with which the encryption key (that is, the "seed" of the pseudo random number $r_i$) of the encryption key ROMs 32 and 42 (refer to FIG. 28 and FIG. 29) cannot be read even if the chip is disassembled. For example, if the chip is disassembled in an attempt to read the encryption key in the ROMs 32 and 42, the ROM 32 and 42 break.

Figure 29:
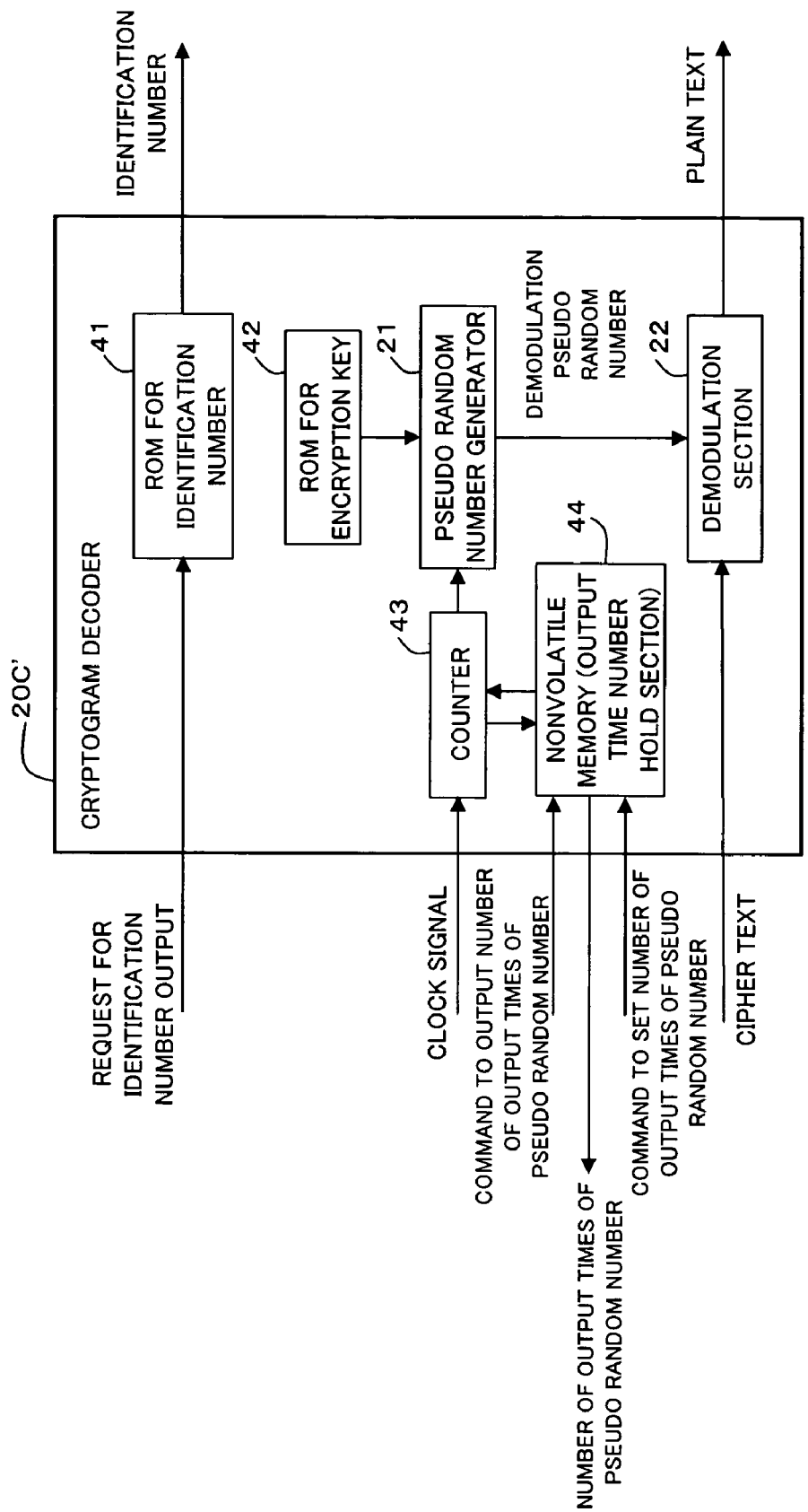
FIG. 29 is a block diagram showing a configuration of a cryptogram decoder as the fifth embodiment of the present invention.

(52) A structure with which the signal line of the pseudo random number $r_i$ (the signal line between the pseudo random number generator 11 and the modulation section 13 or the signal line between the pseudo random number generator 21 and the demodulation section 22; refer to FIG. 28 and FIG. 29) cannot be tapped even if the chip is disassembled. For example, a wiring structure with which the chip does not work any longer if the chip is broken in an attempt to tap the signal line of the pseudo random number $r_i$.

(53) A structure that does not change probability distribution variations in physical random number from the physical random number generator 12 even if physical disturbance is applied from the outside of the chip. For example, a structure of a physical random number generator with which the probability distribution of physical random number $f_i$ does not change even if the entire chip is cooled or an abnormal input voltage is applied. Or, a mechanism for stopping the operation of the chip before the distribution of physical random number $f_i$ is biased by detecting temperatures or input voltages.

(54) A wiring structure with which the random number table of the nonvolatile memory 51 cannot be read even if the chip is disassembled. For example, a wiring structure with which if the chip is disassembled in an attempt to read the random number table in the nonvolatile memory 51, the nonvolatile memory 51 breaks.

(55) A structure with which the signal line between the nonvolatile memory 51 and the transmission/reception section 52A cannot be tapped even if the chip is disassembled. For example, if the chip is disassembled in an attempt to read the random number table in the nonvolatile memory 51, the nonvolatile memory 51 breaks.

(56) A structure from which the identification number of the identification number ROMs 31 and 41 (refer to FIG. 28 and FIG. 29) can be read but cannot be tampered.

(57) A structure with which the signal line of the physical random number $f_i$ (the signal line between the physical random number generator 12 and the modulation section 13) cannot be tapped even if the chip is disassembled. For example, a wiring structure with which the chip does not work any longer if the chip is broken in an attempt to tap the signal line of the physical random number $f_i$.

(58) A structure with which information (for example, the number of output times counted by the counters 33 and 43 (refer to FIG. 28 and FIG. 29), as will be described later) held in the nonvolatile memories 34 and 44 (refer to FIG. 28 and FIG. 29) cannot be tampered.

(59) A structure that prevents the pseudo random number generators 11 and 21 from being accessed directly by avoiding the counters 33 and 43 (refer to FIG. 28 and FIG. 29) and the pseudo random number generators 11 and 21 from generating a pseudo random number $r_i$ with an arbitrary number of order. For example, a wiring structure with which the signal line (refer to FIG. 28) between the counter 33 and the pseudo random number generator 11 or the signal line (refer to FIG. 29) between the counter 43 and the pseudo random number generator 21 cannot be tapped even if the chip is disassembled and the chip does not operate any longer if the chip is broken in an attempt to tap the signal line.

Next, the configuration of the encryptor 10C' will be explained with reference to FIG. 28. FIG. 28 is a block diagram showing the configuration of the encryptor 10C' as the fifth embodiment of the present invention and the same symbols as the symbols already described denote the same or substantially the same portions. As shown in FIG. 28, the encryptor 10C' in the fifth embodiment has the same configuration as that of the encryptor 10C in the third embodiment except in that the encryptor 10C in the third embodiment shown in FIG. 22 is arranged alone in the tamper-resistant region 60, therefore, its explanation is omitted. The encryptor 10C' in the fifth embodiment is arranged in the tamper-resistant region 60 along with the cryptogram decoder 20C', the nonvolatile memory 51, and the transmission/reception section 52A in the communication devices 1a' and 1b' as explained above with reference to FIG. 27.

By the way, although the channel coding section 14 (refer to FIG. 1, FIG. 11 and FIG. 14) is not shown schematically also in the encryptor 10C' shown in FIG. 28, the channel coding section 14 maybe provided, like the first and second embodiments, or may not be provided. When the channel coding section 14 is provided, the channel coding section 14 may be arranged in the tamper-resistant region 60 or outside the tamper-resistant region 60. Further, the encryptor 10C' also requires one corresponding to the above-mentioned items (21) to (28) as an interface between the inside and the outside of the tamper-resistant region 60.

Next, the configuration of the cryptogram decoder 20C' will be explained with reference to FIG. 29. FIG. 29 is a block diagram showing the configuration of the cryptogram decoder 20C' as the fifth embodiment of the present invention and in FIG. 29, the same symbols as the symbols already described denote the same or substantially the same portions. As shown in FIG. 29, the cryptogram decoder 20C' in the fifth embodiment has the same configuration as the cryptogram decoder 20C in the third embodiment except in that the cryptogram decoder 20C in the third embodiment shown in FIG. 23 is arranged alone in the tamper-resistant region 60, therefore, its explanation is omitted. The cryptogram decoder 20C' in the fifth embodiment is arranged in the tamper-resistant region 60 along with the encoder 10C', the nonvolatile memory 51, and the transmission/reception section 52A in the communication devices 1a' and 1b' as explained above with reference to FIG. 27.

By the way, although the channel decoding section 23 (refer to FIG. 2, FIG. 12 and FIG. 15) is not shown schematically also in the cryptogram decoder 20C' shown in FIG. 29, the channel decoding section 23 is provided when the channel coding section 14 is provided on the encryptor 10C' side like the first and second embodiments. When the channel decoding section 23 is provided, the channel decoding section 23 may be arranged in the tamper-resistant region 60 or outside the tamper-resistant region 60. Further, the cryptogram decoder 20C' also requires one corresponding to the above-mentioned items (41) to (48) as an interface between the inside and the outside of the tamper-resistant region 60.

By the way, in the fifth embodiment, the encryptor 10C' is configured similarly to the encryptor 10 shown in FIG. 1, however, it may also be configured so as to provide the same configuration as the encryptor 10A shown in FIG. 11 or the encryptor 10B shown in FIG. 14. Further, in the fifth embodiment, the cryptogram decoder 20C' is configured similarly to the encryptor 20 shown in FIG. 2, however, it may also be configured so as to provide the same configuration as the cryptogram decoder 20A shown in FIG. 12 or the cryptogram decoder 20B shown in FIG. 15.

According to the communication system 1' (the encryptor 10C' and the cryptogram decoder 20C') thus configured as the fifth embodiment of the present invention, encryption communication to which the encryption technique in the present embodiment has been applied is realized between the communication device 1a' and the communication device 1b' and the same function and effect as those in the first and second embodiments can be obtained and in addition, the same function and effect as those in the communication system 1 (the encryptor 10C and the cryptogram decoder 20C) in the third embodiment can also be obtained.

In each of the communication devices 1a' and 1b' in the communication system 1' in the fifth embodiment, the encryptor 10C', the cryptogram decoder 20C', the nonvolatile memory 51, and the transmission/reception section 52A integrated into one are arranged in one of the tamper-resistant regions 60 that provide the structure in the above-mentioned items (51) to (59) on the chip and thus the tamper-resistant properties are secured and input/output between the tamper-resistant region 60 and its outside is limited to those shown in the above-mentioned items (21) to (28) and (41) to (48).

Due to this, it is absolutely not possible to read the pseudo random number $r_i$ generated by the pseudo random number generators 11 and 21, the encryption key held in the ROMs 32 and 42, or the random number table held in the nonvolatile memory 51 to the outside of the tamper-resistant region 60 through the interface in the above-items (21) to (28) and (41) to (48). Further, by adopting the tamper-resistant region 60 that provides the structure in the above-mentioned items (51) to (59), it is absolutely not possible to read the encryption key held in the ROMs 32 and 42, or to tap the signal line of the pseudo random number $r_i$, or to tap the signal line of the physical random number $f_i$, or to read the random number table held in the nonvolatile memory 51, or to tap the signal line of the random number sequence of the random number table even by disassembling the chip and furthermore, even if physical disturbance (heat or voltage) is applied from the outside of the chip, the probability distribution of the physical random number $f_i$ from the physical random number generator 12 does not change. Therefore, also in the communication system 1' in the fifth embodiment, the same function and effect as those in the communication system 1 in the third embodiment can be obtained.

On the other hand, in the communication system 1' in the fifth embodiment, the communication devices 1a' and 1b' in encryption communication with each other come to share the same random number table during the period of encryption communication and accumulate the common random number table in the nonvolatile memory 51 of each of the communication devices 1a' and 1b'. Then, when the need arises to synchronize the pseudo random number generation operation in the communication device 1a' with the pseudo random number generation operation in the communication device 1b', for example, at the time of restoration after an abnormal stop caused by power failure etc., the transmission/reception section 52A in the communication device 1a' and the transmission/reception section 52A in the communication device 1b' perform encryption communication therebetween by the Vernam cipher using the random number table held in the nonvolatile memory 51 and the number of output times of the modulation pseudo random number $r_i$ and that of the demodulation pseudo random number $r_i$ (read from the nonvolatile memories 34 and 44, respectively) are exchanged as synchronization information.

Then, when performing synchronization processing of the pseudo random number $r_i$ in the communication devices 1a' and 1b', the synchronization adjustment section 53 in each of the communication devices 1a' and 1b' increments the number of output times with less value of the number of output times by setting the number of output times for the nonvolatile memory 34 of the encryptor 10C' or the nonvolatile memory 44 of the cryptogram decoder 20C', or by performing dummy inputting of a clock signal to the pseudo random number generator 11 or 21, and matches the number of output times of the pseudo random number generator 11 in the encryptor 10C' with the number of output times of the pseudo random number generator 21 in the cryptogram decoder 20C', and synchronizes the pseudo random number generation operation of the pseudo random number generator 11 in the encryptor 10C' with the pseudo random number generation operation of the pseudo random number generator 21 in the cryptogram decoder 20C'.

By the way, when the synchronization adjustment section 53 performs dummy inputting of a clock signal for the pseudo random number generator 11 or 21, if the seed (encryption key) of pseudo random number $r_i$ is assumed to be 100 bits, the information of the number of output times also includes 100 bits, however, it is unlikely that the number of output times reaches the order of $2^{100}$ times. In other words, it can be predicted that the synchronization information (number of output times) is biased to lower digits of 100 bits. It is preferable to eliminate such a biased state in order not to give extra information to an interceptor etc. Therefore, when outputting the synchronization information (number of output times) as 100-bit information, it is more preferable to perform permutation of the positions of the bit slot in which the number of output times is stored based on the random number table (nonvolatile memory 51) shared by the communication devices 1a' and 1b'.

By the way, while the communication devices 1a' and 1b' are connected to each other via a communication channel (signal line) in which not only interception but also tampering may occur, when synchronization of pseudo random number $r_i$ is performed by the procedure that "the encryptor 10C' and the cryptogram decoder 20C' make public to each other the number of output times of pseudo random number $r_i$ of its own and the side with less value of the number of output times matches itself to the side with greater value of the number of output times" as described above, if the number of output times (synchronization information) is transmitted and received through the above-mentioned signal line without encrypting it, there is the possibility that the number of output times is tampered into a huge number (for example, $2^{100}$ etc.) by the tampering by an interceptor etc.

If such tampering is made, the dummy inputting of a clock signal for synchronization adjustment continues endlessly in the encryptor 10C' or the cryptogram decoder 20C' and there is the possibility that the encryptor 10C' or the cryptogram decoder 20C' can be used no longer. As countermeasures to such vulnerability, in the present embodiment, the number of output times (synchronization information) is transmitted and received after encrypted into Vernam cipher by the transmission/reception section 52A, therefore, it is no more tampered by an interceptor etc. and the above-mentioned vulnerability to tampering can be eliminated.

[12] Encryption/Cryptogram Decoding Technique in the Sixth Embodiment

The communication system 1A' in the sixth embodiment is also configured so as to provide the two communication devices 1a' and 1b' connected so that communication is possible to each other via a communication network etc., like the communication system 1' in the fifth embodiment, as shown in FIG. 27. For the communication system 1A' in the sixth embodiment, as described above, a case is explained where the two communication devices 1a' and 1b' are connected so that communication is possible to each other via a communication channel (signal line) in which tampering may occur and the two communication devices 1a' and 1b' perform synchronization processing by Vernam cipher communication to be described.

The communication devices 1a' and 1b' in the sixth embodiment have the same configuration and in the communication system 1A' in the sixth embodiment, the communication device 1a' is configured so as to provide an encryptor 10D' for encrypting input data (plain text $x_i$) to be transmitted to the communication device 1b' by the method described above in the first or second embodiment, a cryptogram decoder 20D' for decoding encrypted data ($c_i$, or $s_i$) received from the communication device 1b' by the procedure described above in the first or second embodiment, and the nonvolatile memory 51, the transmission/reception section 52A, and the synchronization adjustment section 53 described in the fifth embodiment, and the communication device 1b' is configured so as to provide the encryptor 10D' for encrypting input data (plain text $x_i$) to be transmitted to the communication device 1a' by the method described above in the first or second embodiment, the cryptogram decoder 20D' for decoding encrypted data (cipher text $c_i$, or $s_i$) received from the communication device 1a' by the method described above in the first or second embodiment, and the nonvolatile memory 51, the transmission/reception section 52A, and the synchronization adjustment section 53 described above in the fifth embodiment. The configuration of the encryptor 10D' will be described later with reference to FIG. 30 and the configuration of the cryptogram decoder 20D' will be described later with reference to FIG. 31.

However, like the fourth embodiment, the encryptor 10D' in the sixth embodiment is configured so as to transmit the coded signal ($s_i$) obtained by the modulation section 13 to the destination communication device 1a' or 1b' as a plurality of packets and the encryptor 10D' in the sixth embodiment is configured so as to decode the coded signal ($s_i$) in each packet received from the encryptor 10D' of the sender communication device 1a' or 1b' into input data (plain text $x_i$). In other words, like the fourth embodiment, the communication system 1A' in the sixth embodiment (the encryptor 10D' and the cryptogram decoder 20D' ) also aims at communication using a communication channel in which the order of arrival of packets may be changed or a packet may become extinct and a system that needs to recognize whether or not the individual packets are transmitted from a legitimate transmitter (specifically, a communication system of IP telephone).

Further, also in the communication system 1A' in the sixth embodiment, the encryptor 10D' in the communication device 1a' and the cryptogram decoder 20D' in the communication device 1b' are paired and the pseudo random number generators 11 and 21 in the devices 10D' and 20D' are configured so as to synchronize and generate a pseudo random number $r_i$ based on the same encryption key. Similarly, the encryptor 10D' in the communication device 1b' and the cryptogram decoder 20D' in the communication device 1a' are paired and the pseudo random number generators 11 and 21 in the devices 10D' and 20D' are also configured so as to synchronize and generate a pseudo random number $r_i$ based on the same encryption key. However, as the encryption key used in each pair of devices described above, different keys are set.

With such a configuration, the transmission data from the communication device 1a' to the communication device 1b' is encrypted by the above-mentioned encryption procedure by the encryptor 10D' and transmitted to the communication device 1b' as the cipher text and on the communication device 1b' side, the cipher text received from the communication device 1a' is decoded into plain text by the above-mentioned cryptogram decoding procedure by the cryptogram decoder 20D'. Similarly, the transmission data from the communication device 1b' to the communication device 1a' is encrypted by the above-mentioned encryption procedure by the encryptor 10D' and transmitted to the communication device 1a' as the cipher text and on the communication device 1a' side, the cipher text received from the communication device 1b' is decoded into plain text by the above-mentioned cryptogram decoding procedure by the cryptogram decoder 20D'.

By the way, in the communication system 1A' in the sixth embodiment, the nonvolatile memory 51, the transmission/reception section 52A, and the synchronization adjustment section 53 are the same as those explained in the fifth embodiment, therefore, their explanation is omitted. Further, also in the communication devices 1a' and 1b' in the sixth embodiment, the encryptor 10D', the cryptogram decoder 20D', the nonvolatile memory 51, and the transmission/reception section 52A are arranged in the tamper-resistant region 60 (that provides the structure in the above-mentioned items (51) to (59)) on a chip, like the fifth embodiment.

Figure 30:
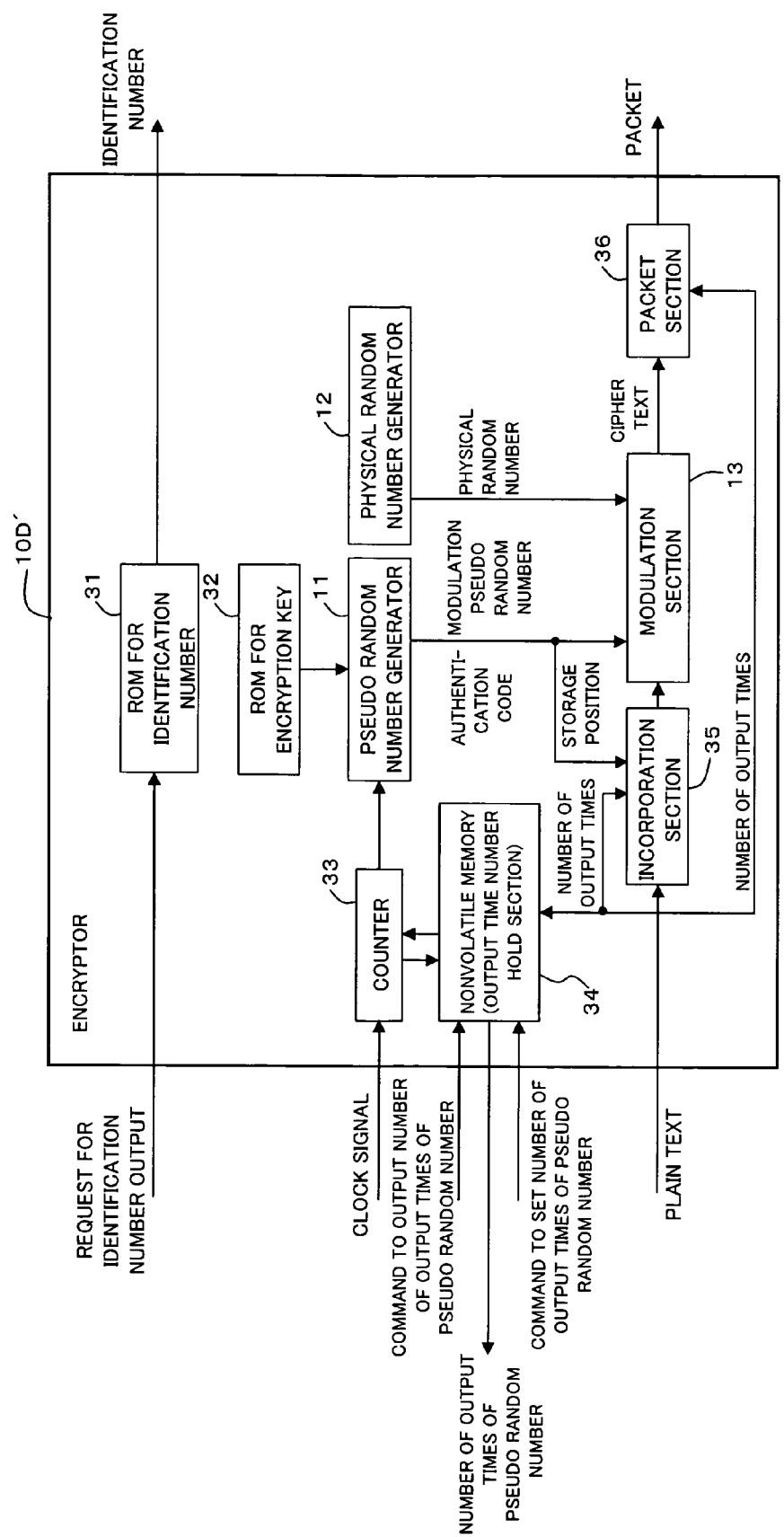
FIG. 30 is a block diagram showing a configuration of an encryptor as the sixth embodiment of the present invention.

Next, the configuration of the encryptor 10D' will be explained with reference to FIG. 30. FIG. 30 is a block diagram showing the configuration of the encryptor 10D' as the sixth embodiment of the present invention and in FIG. 30, the same symbols as the symbols already described denote the same or substantially the same portions. As shown in FIG. 30, the encryptor 10D' has the same configuration as that of the encryptor 10D in the fourth embodiment except in that the encryptor 10D in the fourth embodiment shown in FIG. 24 is arranged alone in the tamper-resistant region 60, therefore, its explanation is omitted. The encryptor 10D' in the sixth embodiment is arranged in the tamper-resistant region 60 along with the cryptogram decoder 20D', the nonvolatile memory 51, and the transmission/reception section 52A in the communication devices 1a' and 1b' as explained above with reference to FIG. 27.

By the way, although the channel coding section 14 (refer to FIG. 1, FIG. 11 and FIG. 14) is not shown schematically also in the encryptor 10D' shown in FIG. 30, the channel coding section 14 maybe provided, like the first and second embodiments, or may not be provided. When the channel coding section 14 is provided, the channel coding section 14 may be arranged in the tamper-resistant region 60 or outside the tamper-resistant region 60. Further, the encryptor 10D' also requires one corresponding to the above-mentioned items (21) to (28) as an interface between the inside and the outside of the tamper-resistant region 60.

Figure 31:
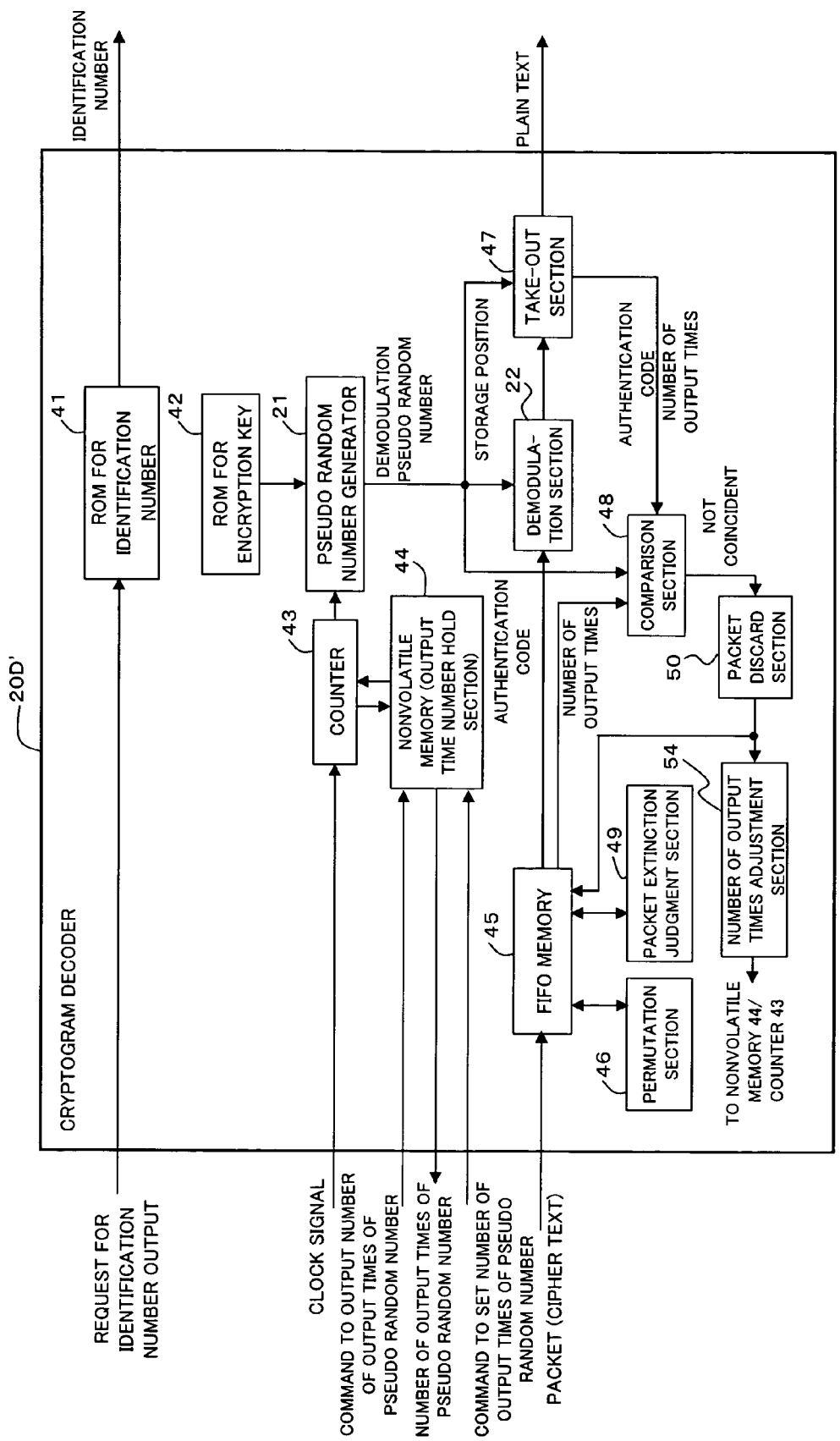
FIG. 31 is a block diagram showing a configuration of a cryptogram decoder as the sixth embodiment of the present invention.

Next, the configuration of the cryptogram decoder 20D' will be explained with reference to FIG. 31. FIG. 31 is a block diagram showing the configuration of the cryptogram decoder 20D' as the sixth embodiment of the present invention and in FIG. 31, the same symbols as the symbols already described denote the same or substantially the same portions. As shown in FIG. 31, the cryptogram decoder 20D' in the sixth embodiment has the same configuration as the cryptogram decoder 20D in the fourth embodiment except in that the cryptogram decoder 20D in the fourth embodiment shown in FIG. 25 is arranged alone in the tamper-resistant region 60, therefore, its explanation is omitted. The cryptogram decoder 20D' in the sixth embodiment is arranged in the tamper-resistant region 60 along with the encryptor 10D', the nonvolatile memory 51, and the transmission/reception section 52A in the communication devices 1a' and 1b' as explained above with reference to FIG. 27.

By the way, although the channel decoding section 23 (refer to FIG. 2, FIG. 12 and FIG. 15) is not shown schematically also in the cryptogram decoder 20D' shown in FIG. 31, the channel decoding section 23 is provided when the channel coding section 14 is provided on the encryptor 10D' side like the first and second embodiments. When the channel decoding section 23 is provided, the channel decoding section 23 may be arranged in the tamper-resistant region 60 or outside the tamper-resistant region 60. Further, the cryptogram decoder 20D' also requires one corresponding to the above-mentioned items (41) to (48) as an interface between the inside and the outside of the tamper-resistant region 60.

By the way, in the sixth embodiment, the encryptor 10D' is configured similarly to the encryptor 10 shown in FIG. 1, however, it may also be configured so as to provide the same configuration as the encryptor 10A shown in FIG. 11 or the encryptor 10B shown in FIG. 14. Further, in the sixth embodiment, the cryptogram decoder 20D' is configured similarly to the encryptor 20 shown in FIG. 2, however, it may also be configured so as to provide the same configuration as the cryptogram decoder 20A shown in FIG. 12 or the cryptogram decoder 20B shown in FIG. 15.

According to the communication system 1A' (the encryptor 10D' and the cryptogram decoder 20D' ) thus configured as the sixth embodiment of the present invention, encryption communication to which the encryption technique in the present embodiment has been applied is realized between the communication device 1a' and the communication device 1b' and the same function and effect as those in the first and second embodiments can be obtained and in addition, the same function and effect as those in the communication system 1A (the encryptor 10D and the cryptogram decoder 20D) in the fourth embodiment can also be obtained.

In each of the communication devices 1a' and 1b' in the communication system 1A' in the sixth embodiment, the encryptor 10D', the cryptogram decoder 20D', the nonvolatile memory 51, and the transmission/reception section 52A integrated into one are arranged in one of the tamper-resistant regions 60 that provide the structure in the above-mentioneditems (51) to (59) on the chip and thus the tamper-resistant properties are secured and input/output between the tamper-resistant region 60 and its outside is limited to those shown in the above-mentioned items (21) to (28) and (41) to (48). Due to this, also in the communication system 1A' in the sixth embodiment, the same function and effect as those in the communication system 1' in the fifth embodiment can be obtained.

[13] Encryption/Cryptogram Decoding Technique in the Seventh Embodiment

In the fifth and sixth embodiments described above, when performing synchronization processing of pseudo random number $r_i$, the number of output times is notified as synchronization information by Vernam cipher communication and by setting the number of output times for the nonvolatile memory 34 of the encryptor 10C'/10D' or the nonvolatile memory 44 of the cryptogram decoder 20C'/20D' or performing dummy inputting of a clock signal for the pseudo random number generator 11 or 21 by the synchronization adjustment section 53, the pseudo random number $r_i$ is synchronized, however, the seventh embodiment or the eight embodiment to be described later is configured so as to synchronize the pseudo random number $r_i$ by newly encrypting the seed (encryption key) of the pseudo random number $r_i$ with Vernam cipher using the transmission/reception section 52A and redistributing it to each other to set the new encryption key (new encryption key) again in the encryption key ROMs 32 and 42 and by resetting the number of output times of the pseudo random number $r_i$ in the counters 33 and 43 (nonvolatile memories 34 and 44) to "0" to use a pseudo random number sequence to be generated by the new encryption key.

Figure 32:
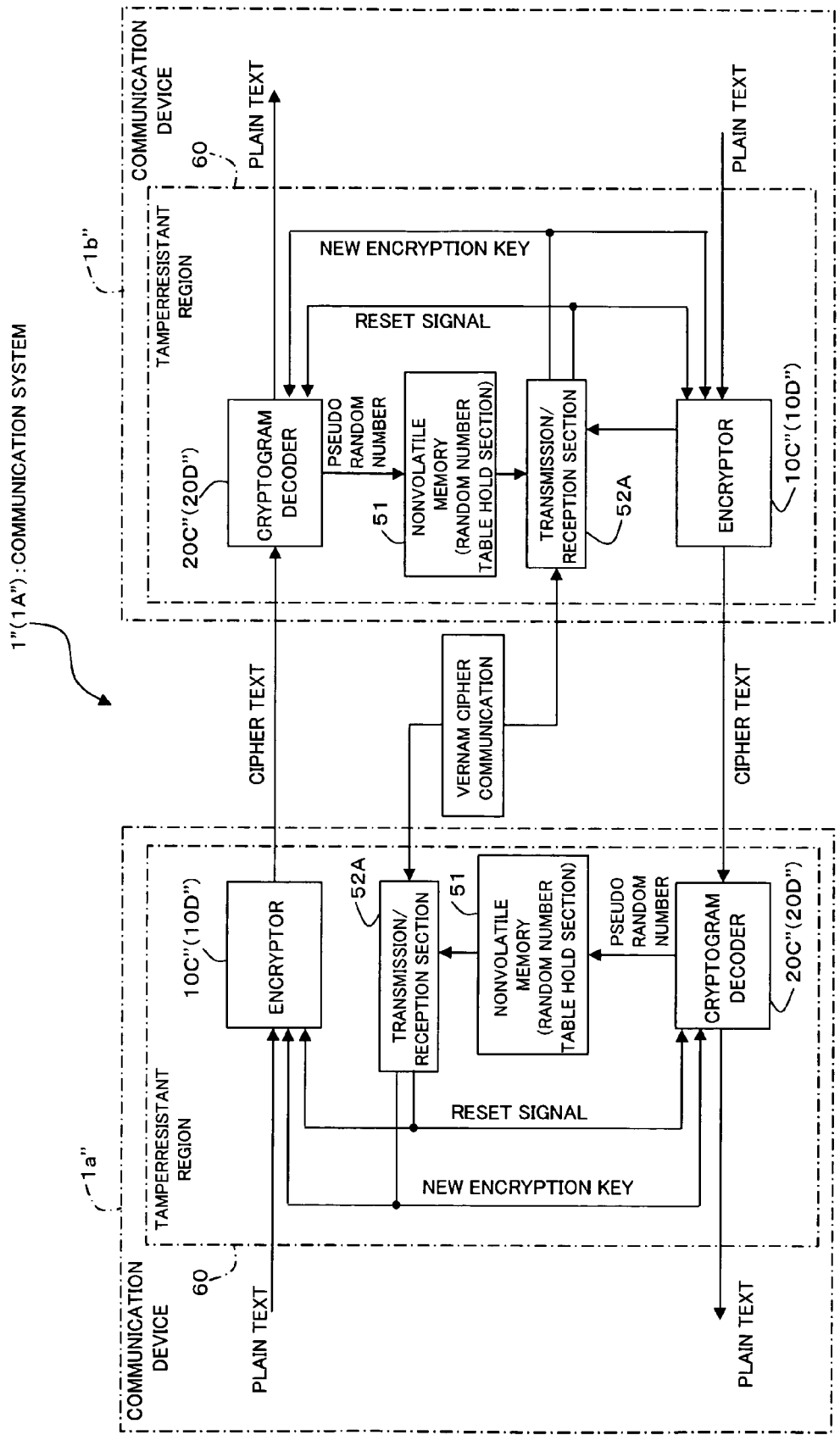
FIG. 32 is a block diagram showing an entire configuration of a communication system as seventh and eighth embodiments of the present invention.

The seventh and eighth embodiments are suitable to such a synchronization method and FIG. 32 is a block diagram showing the entire configuration of the communication systems 1" and 1A" to which the encryption/cryptogram decoding technique as the seventh and eighth embodiments has been applied and the communication system 1" in the seventh embodiment shown in FIG. 32 is configured so as to provide two communication devices 1a" and 1b" connected so that that communication is possible to each other via a communication network etc. For the communication system 1" in the seventh embodiment and the communication system 1A" in the eighth embodiment to be described later, a case is explained where the two communication devices 1a" and 1b" are connected so that communication is possible to each other via a communication channel (signal line) in which tampering may occur and the two communication devices 1a" and 1b" perform synchronization processing by Vernam cipher communication described above.

The communication devices 1a" and 1b" have the same configuration and the communication device 1a" is configured so as to provide an encryptor 10C" for encrypting input data (plain text $x_i$) to be transmitted to the communication device 1b" by the method described above in the first or second embodiment, a cryptogram decoder 20C" for decoding encrypted data ($c_i$ or $s_i$) received from the communication device 1b" by the method described above in the first or second embodiment, and the nonvolatile memory 51 and the transmission/reception section 52A the same as those described above, and the communication device 1b" is configured so as to provide the encryptor 10C" for encrypting input data (plain text $x_i$) to be transmitted to the communication device 1a" by the method described above in the first or second embodiment, the cryptogram decoder 20C" for decoding encrypted data (cipher text $c_i$, or $s_i$) received from the communication device 1a" by the method described above in the first or second embodiment, and the nonvolatile memory 51 and the transmission/reception section 52A the same as those described above. In other words, the communication system 1" in the seventh embodiment has a configuration in which the synchronization adjustment section 53 in the fifth embodiment is omitted. The configuration of the encryptor 10C" will be described later with reference to FIG.

33 and the configuration of the cryptogram decoder 20C" will be described later with reference to FIG. 34.

Further, in the communication system 1" shown in FIG. 32, the encryptor 10C" in the communication device 1a" and the cryptogram decoder 20C" in the communication device 1b" are paired and the pseudo random number generators 11 and 21 in the devices 10C" and 20C" are configured so as to synchronize and generate a pseudo random number $r_i$ based on the same encryption key. Similarly, the encryptor 10C" in the communication device 1b" and the cryptogram decoder 20C" in the communication device 1a" are paired and the pseudo random number generators 11 and 21 in the devices 10C" and 20C" are also configured so as to synchronize and generate a pseudo random number $r_i$ based on the same encryption key. However, as the encryption key used in each pair of devices described above, different keys are set.

With such a configuration, the transmission data from the communication device 1a" to the communication device 1b" is encrypted by the above-mentioned encryption procedure by the encryptor 10C" and transmitted to the communication device 1b" as the cipher text and on the communication device 1b" side, the cipher text received from the communication device 1a" is decoded into plain text by the above-mentioned cryptogram decoding procedure by the cryptogram decoder 20C". Similarly, the transmission data from the communication device 1b" to the communication device 1a" is encrypted by the above-mentioned encryption procedure by the encryptor 10C" and transmitted to the communication device 1a" as the cipher text and on the communication device 1a" side, the cipher text received from the communication device 1b" is decoded into plain text by the above-mentioned cryptogram decoding procedure by the cryptogram decoder 20C".

Here, the nonvolatile memory 51 and the transmission/reception section 52A are used when synchronization shift occurs for some reason in the pseudo random number generation operation of the pseudo random number generators 11 and 21 and encryption communication between the encryptor 10C" and the cryptogram decoder 20C" becomes no longer possible, and both perform the same functions as those explained in the fifth and sixth embodiments.

However, the transmission/reception section 52A in the fifth embodiment encrypts a new encryption key, which is to be set again in the encryption key ROMs 32 and 42 at the time of synchronization processing, using the Vernam cipher based on the random number table held in the nonvolatile memory 51 and transmits it to the communication device 1a" or 1b', which is the other party of communication, as encrypted synchronization information and at the same time, decodes the encrypted synchronization information received from the communication device 1a" or 1b", which is the other party of communication, into the new encryption key based on the random number table held in the nonvolatile memory 51.

When synchronization shift occurs for some reason in the pseudo random number generation operation of the pseudo random number generators 11 and 21 and encryption communication between the encryptor 10C" and the cryptogram decoder 20C" becomes no longer possible, the transmission/reception sections 52A and 52A provided in the communication devices 1a" and 1b", respectively, are used and the encryption/cryptogram decoding operation is performed in synchronization in accordance with the same random number table held in the nonvolatile memories 51 and 51, respectively, and thus the above-mentioned new encryption key is exchanged as the encrypted synchronization information via a communication network etc. (a signal line in which not only interception but also tampering may occur) between the communication devices 1a" and 1b" (between the transmission/reception sections 52A and 52A).

The transmission/reception section 52A having received the new encryption key sets the new encryption key again in the encryption key ROMs 32 and 42 and at the same time, outputs a reset signal to the encryptor 10C" or the cryptogram decoder 20C" with the same timing in the communication device 1a" and the communication device 1b", and resets the number of output times of pseudo random number $r_i$ in the counters 33 and 43 (nonvolatile memories 34 and 44) to "0". By the way, in the present embodiment, the synchronization adjustment section 53 is omitted, however, it may also be possible to configure so that the synchronization adjustment section 53 in the fifth and sixth embodiments sets the new encryption key again and outputs the reset signal as described above.

Then, in the communication devices 1a" and 1b" in the seventh embodiment, the encryptor 10C", the cryptogram decoder 20C", the nonvolatile memory 51, and the transmission/reception section 52A described above are arranged in the tamper-resistant region 60 that provides the structure in the following items (60) and (61) in addition to that in the above-mentioned items (51) to (59).

(60) A structure with which the signal line of the new encryption key (the signal line between the transmission/reception section 52A and the encryption key ROM 32) cannot be tapped even if the chip is disassembled. For example, a wiring structure with which the chip does not work any longer if the chip is broken in an attempt to tap the signal line of the new encryption key.

(61) A structure with which the signal line of the reset signal (the signal line between the transmission/reception section 52A and the nonvolatile memory ROM 34 (counter 33)) cannot be tapped even if the chip is disassembled. For example, a wiring structure with which the chip does not work any longer if the chip is broken in an attempt to tap the signal line of the reset signal.

Figure 33:
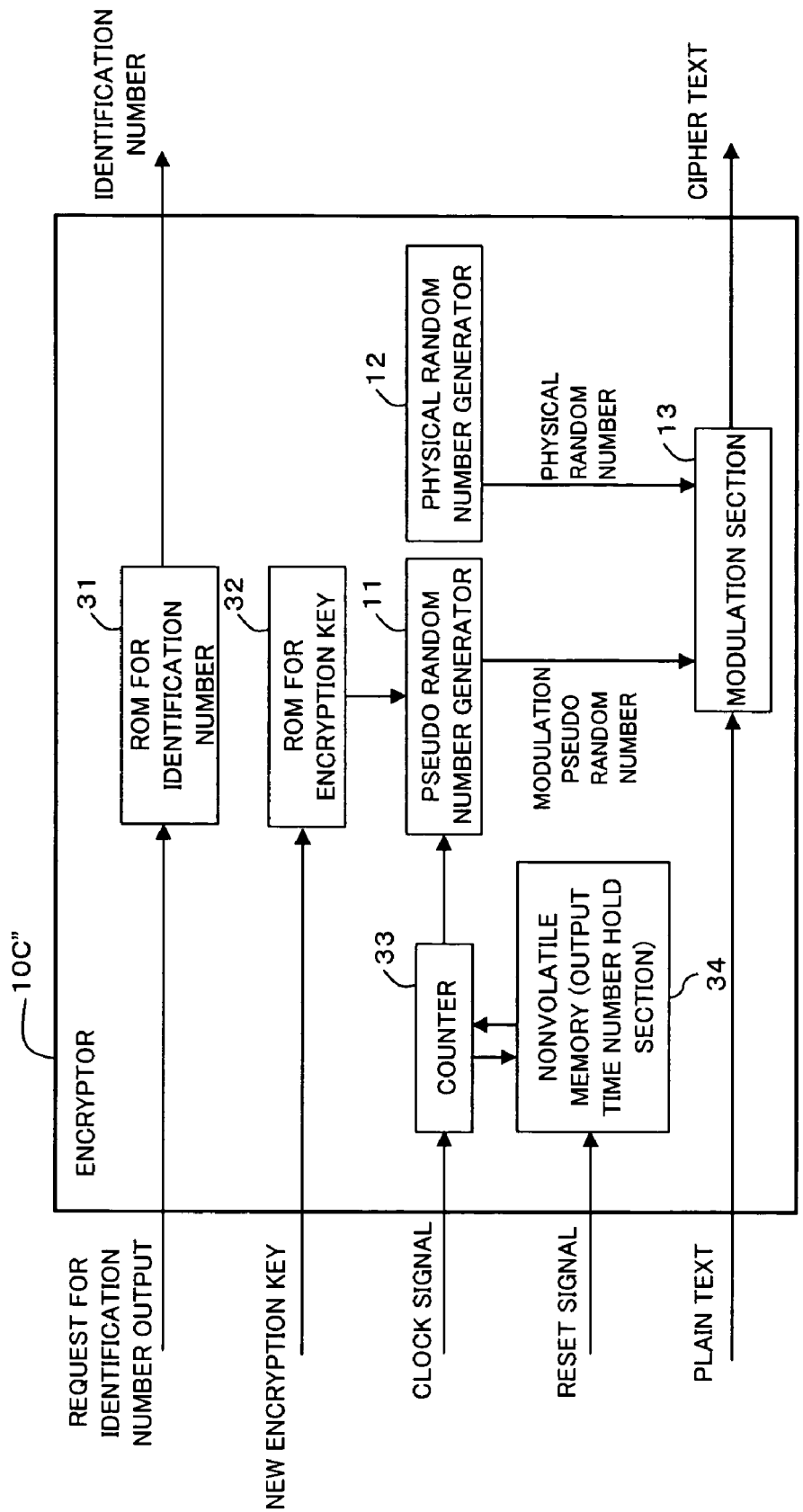
FIG. 33 is a block diagram showing a configuration of an encryptor as the seventh embodiment of the present invention.

Next, the configuration of the encryptor 10C" will be explained with reference to FIG. 33. FIG. 33 is a block diagram showing the configuration of the encryptor 10C" as the seventh embodiment of the present invention and the same symbols as the symbols already described denote the same or substantially the same portions. As shown in FIG. 33, the encryptor 10C" in the seventh embodiment has the same configuration as that of the encryptor 10C" in the fifth embodiment shown in FIG. 28.

In the encryptor 10C" in the seventh embodiment, however, the encryption key ROM 32 has a configuration with which the encryption key can be set again to the new encryption key in accordance with a direction from the transmission/reception section 52A and the counter 33 (nonvolatile memory 34) has a configuration with which the number of output times of pseudo random number $r_i$ can be reset to "0" in accordance with a reset signal from the transmission/reception section 52A. Further, the modulation pseudo random number generator 11 has a configuration with which the number of output times can be returned (can be reset) to 0 when the nonvolatile memory 34, that is, the counter 33 is reset by the reset signal.

By the way, although the channel coding section 14 (refer to FIG. 1, FIG. 11 and FIG. 14) is not shown schematically also in the encryptor 10C" shown in FIG. 33, the channel coding section 14 may be provided, like the first and second embodiments, or may not be provided. When the channel coding section 14 is provided, the channel coding section 14 may be arranged in the tamper-resistant region 60 or outside the tamper-resistant region 60.

Further, in the present embodiment, as described above, at the time of synchronization processing of pseudo random number $r_i$, without using the synchronization adjustment section 53 (the number of output times of pseudo random number $r_i$) outside the tamper-resistant region 60, as is the case in the fifth embodiment, the reset signal and the new encryption key notified from the transmission/reception section 52A in the same tamper-resistant region 60 are used as synchronization information, therefore, as an interface between the inside and the outside of the tamper-resistant region 60 as to the encryptor 10C" in the present embodiment, one corresponding to the above-mentioned items (21) to (25) is necessary and the interface relating to the number of output times of pseudo random number $r_i$ (one corresponding to the above-mentioned items (26) to (28)) is no longer necessary.

Next, the configuration of the cryptogram decoder 20C" will be explained with reference to FIG. 34. FIG. 34 is a block diagram showing the configuration of the cryptogram decoder 20C" as the seventh embodiment of the present invention and in FIG. 34, the same symbols as the symbols already described denote the same or substantially the same portions. As shown in FIG. 34, the cryptogram decoder 20C" in the seventh embodiment has the same configuration as that of the cryptogram decoder 20C" in the fifth embodiment shown in FIG. 29.

In the cryptogram decoder 20C" in the seventh embodiment, however, the encryption key ROM 42 has a configuration with which the encryption key can be set again to the new encryption key in accordance with a direction from the transmission/reception section 52A and the counter 43 (nonvolatile memory 44) has a configuration with which the number of output times of pseudo random number $r_i$ can be reset to "0" in accordance with a reset signal from the transmission/reception section 52A. Further, the demodulation pseudo random number generator 21 has a configuration with which the number of output times can be returned (can be reset) to 0 when the nonvolatile memory 44, that is, the counter 43 is reset by the reset signal.

Figure 34:
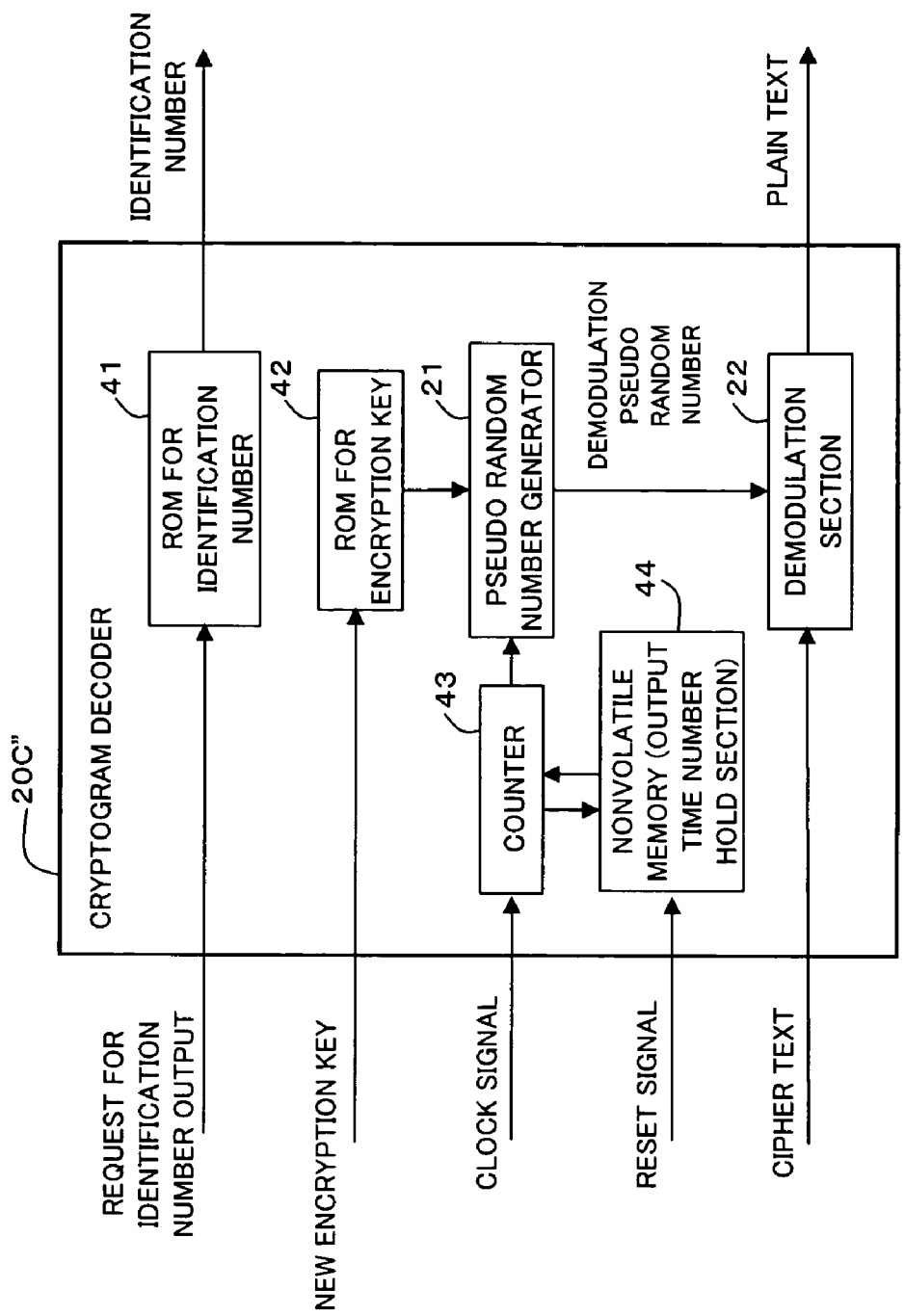
FIG. 34 is a block diagram showing a configuration of a cryptogram decoder as the seventh embodiment of the present invention.

By the way, although the channel decoding section 23 (refer to FIG. 2, FIG. 12 and FIG. 15) is not shown schematically also in the cryptogram decoder 20C" shown in FIG. 34, the channel decoding section 23 is provided when the channel coding section 14 is provided on the encryptor 10C" side like the first and second embodiments. When the channel decoding section 23 is provided, the channel decoding section 23 may be arranged in the tamper-resistant region 60 or outside the tamper-resistant region 60.

Further, in the present embodiment, as described above, on the occasion of synchronization processing of pseudo random number $r_i$, without using the synchronization adjustment section 53 (the number of output times of pseudo random number $r_i$) outside the tamper-resistant region 60, as is the case in the fifth embodiment, the reset signal and the new encryption key notified from the transmission/reception section 52A in the same tamper-resistant region 60 are used as synchronization information, therefore, as an interface between the inside and the outside of the tamper-resistant region 60 as to the cryptogram decoder 20C" in the present embodiment, one corresponding to the above-mentioned items (41) to (45) is necessary and the interface relating to the number of output times of pseudo random number $r_i$ (one corresponding to the above-mentioned items (46) to (48)) is no longer necessary.

By the way, in the seventh embodiment, the encryptor 10C" is configured similarly to the encryptor 10 shown in FIG. 1, however, it may also be configured so as to provide the same configuration as the encryptor 10A shown in FIG. 11 or the encryptor 10B shown in FIG. 14. Further, in the seventh embodiment, the cryptogram decoder 20C" is configured similarly to the encryptor 20 shown in FIG. 2, however, it may also be configured so as to provide the same configuration as the cryptogram decoder 20A shown in FIG. 12 or the cryptogram decoder 20B shown in FIG. 15.

According to the communication system 1" (the encryptor 10C" and the cryptogram decoder 20C") thus configured as the seventh embodiment of the present invention, encryption communication to which the encryption technique in the present embodiment has been applied is realized between the communication device 1a" and the communication device 1b" and the same function and effect as those in the first and second embodiments can be obtained and in addition, the same function and effect as those in the communication system 1' (the encryptor 10C' and the cryptogram decoder 20C') in the fifth embodiment can also be obtained.

In each of the communication devices 1a" and 1b" in the communication system 1" in the seventh embodiment, the encryptor 10C", the cryptogram decoder 20C", the nonvolatile memory 51, and the transmission/reception section 52A integrated into one are arranged in one of the tamper-resistant regions 60 that provide the structure in the above-mentioned items (51) to (61) on the chip and thus the tamper-resistant properties are secured and input/output between the tamper-resistant region 60 and its outside is limited to those shown in the above-mentioned items (21) to (25) and (41) to (45).

Due to this, it is absolutely not possible to read the pseudo random number $r_i$ generated by the pseudo random number generators 11 and 21, the encryption key held in the ROMs 32 and 42, the random number table held in the nonvolatile memory 51, or the new encryption key set again in the ROMs 32 and 42 to the outside of the tamper-resistant region 60 through the interface in the above-items (21) to (25) and (41) to (45). Further, by adopting the tamper-resistant region 60 that provides the structure in the above-mentioned items (51) to (61), it is absolutely not possible to read the encryption key held in the ROMs 32 and 42, or to tap the signal line of the pseudo random number $r_i$, or to tap the signal line of the physical random number $f_i$, or to read the random number table held in the nonvolatile memory 51, or to tap the signal line of the random number sequence of the random number table, or to tap the signal line of the new encryption key or the reset signal even by disassembling the chip and furthermore, even if physical disturbance (heat or voltage) is applied from the outside of the chip, the probability distribution of the physical random number $f_i$ from the physical random number generator 12 does not change. Therefore, also in the communication system 1" in the seventh embodiment, the same function and effect as those in the communication system 1' in the fifth embodiment can be obtained.

On the other hand, in the communication system 1" in the seventh embodiment, like the fifth embodiment, the communication devices 1a" and 1b" in encryption communication with each other come to share the same random number table during the period of encryption communication and come to accumulate the common random number table in the nonvolatile memory 51 of each of the communication devices 1a" and 1b". Then, when the need arises to synchronize the pseudo random number generation operation in the communication device 1a" with the pseudo random number generation operation in the communication device 1b", for example, at the time of restoration after an abnormal stop caused by power failure etc., the transmission/reception section 52A in the communication device 1a" and the transmission/reception section 52A in the communication device 1b" mutually perform encryption communication therebetween by the Vernam cipher using the random number table held in the nonvolatile memory 51 and the new encryption keys are exchanged.

Then, when performing synchronization processing of the pseudo random number $r_i$ in the communication devices 1a" and 1b", as described above, the transmission/reception section 52A having received the new encryption key resets the new encryption key in the encryption key ROMs 32 and 42 and at the same time, a reset signal is output to the encryptor 10C" or the cryptogram decoder 20C" with the same timing in the communication devices 1a" and 1b" and thus the number of output times of the pseudo random number $r_i$ in the counters 33 and 43 (the nonvolatile memories 34 and 44) is reset to "0". Due to this, the pseudo random number generator 11 in the encryptor 10C" and the pseudo random number generator 21 in the cryptogram decoder 20C" resume the operation simultaneously using the same new encryption key, and, therefore, it is possible to synchronize the pseudo random number generation operation of the pseudo random number generator 11 in the encryptor 10C" with the pseudo random number generation operation of the pseudo random number generator 21 in the cryptogram decoder 20C".

By the way, in the seventh embodiment, when there exit other means to confirm that the synchronization of pseudo random number is shifted or when confirmation that the synchronization of pseudo random number is shifted can be ignored, a modification is possible in which the same random number table held in the respective nonvolatile memories 51 and 51 in the respective communication devices 1a" and 1b" is not used as the encryption key for the Vernam cipher communication but as the new encryption key itself. In this modification, it is not necessary to perform the Vernam cipher communication, therefore, the transmission/reception section 52A can be omitted.

[14] Encryption/Cryptogram Decoding Technique in the Eighth Embodiment

The communication system 1A" in the eighth embodiment is also configured so as to provide the two communication devices 1a" and 1b" connected so that communication is possible to each other via a communication network etc., like the communication system 1" in the seventh embodiment, as shown in FIG. 32. For the communication system 1A" in the eighth embodiment, as described above, a case is explained where the two communication devices 1a" and 1b" are connected so that communication is possible to each other via a communication channel (signal line) in which tampering may occur and the two communication devices 1a" and 1b" perform synchronization processing by the same synchronization method as that in the seventh embodiment.

The communication devices 1a" and 1b" in the eighth embodiment have the same configuration and in the communication system 1A" in the eighth embodiment, the communication device 1a" is configured so as to provide an encryptor 10D" for encrypting input data (plain text $x_i$) to be transmitted to the communication device 1b" by the method described above in the first or second embodiment, a cryptogram decoder 20D" for decoding encrypted data ($c_i$ or $s_i$) received from the communication device 1b" by the method described above in the first or second embodiment, and the nonvolatile memory 51 and the transmission/reception section 52A described in the seventh embodiment, and the communication device 1b" is configured so as to provide the encryptor 10D" for encrypting input data (plain text $x_i$) to be transmitted to the communication device 1a" by the method described above in the first or second embodiment, the cryptogram decoder 20D" for decoding ecrypted data (cipher text $c_i$, or $s_i$) received from the communication device 1a" by the method described above in the first or second embodiment, and the nonvolatile memory 51 and the transmission/reception section 52A the same as those described above. In other words, the communication system 1A" in the eighth embodiment has a configuration in which the synchronization adjustment section 53 in the sixth embodiment is omitted. The configuration of the encryptor 10D" will be described later with reference to FIG. 35 and the configuration of the cryptogram decoder 20D" will be described later with reference to FIG. 36.

However, like the fourth and sixth embodiments, the encryptor 10D" in the eighth embodiment is configured so as to transmit the coded signal ($s_i$) obtained by the modulation section 13 to the destination communication device 1a" or 1b" as a plurality of packets and the encryptor 10D" in the eighth embodiment is configured so as to decode the coded signal ($s_i$) in each packet received from the encryptor 10D" of the sender communication device 1a" or 1b" into input data (plain text $x_i$). In other words the communication system 1A" in the eighth embodiment (the encryptor 10D" and the cryptogram decoder 20D") also aims at communication using a communication channel in which the order of arrival of packets may be changed or a packet may become extinct and a system that needs to recognize whether or not the individual packets are transmitted from a legitimate transmitter (specifically, a communication system of IP telephone), like the fourth and sixth embodiments.

Further, also in the communication system 1A" in the eighth embodiment, the encryptor 10D" in the communication device 1a" and the cryptogram decoder 20D" in the communication device 1b" are paired and the pseudo random number generators 11 and 21 in the devices 10D" and 20D" are configured so as to synchronize and generate a pseudo random number $r_i$ based on the same encryption key. Similarly, the encryptor 10D" in the communication device 1b" and the cryptogram decoder 20D" in the communication device 1a" are paired and the pseudo random number generators 11 and 21 in the devices 10D" and 20D" are also configured so as to synchronize and generate a pseudo random number $r_i$ based on the same encryption key. However, as the encryption key used in each pair of devices described above, different keys are set.

With such a configuration, the transmission data from the communication device 1a" to the communication device 1b" is encrypted by the above-mentioned encryption procedure by the encryptor 10D" and transmitted to the communication device 1b" as the cipher text and on the communication device 1b" side, the cipher text received from the communication device 1a" is decoded into plain text by the above-mentioned cryptogram decoding procedure by the cryptogram decoder 20D". Similarly, the transmission data from the communication device 1b" to the communication device 1a" is encrypted by the above-mentioned encryption procedure by the encryptor 10D" and transmitted to the communication device 1a" as the cipher text and on the communication device 1a" side, the cipher text received from the communication device 1b" is decoded into plain text by the above-mentioned cryptogram decoding procedure by the cryptogram decoder 20D".

By the way, in the communication system 1A" in the eighth embodiment, the nonvolatile memory 51 and the transmission/reception section 52A are the same as those explained in the seventh embodiment, therefore, their explanation is omitted. Further, also in the communication devices 1a" and 1b" in the eighth embodiment, the encryptor 10D", the cryptogram decoder 20D", the nonvolatile memory 51, and the transmission/reception section 52A are arranged in the tamper-resistant region 60 (what provides the structure in the above-mentioned items (51) to (61)) on a chip, like the seventh embodiment.

Figure 35:
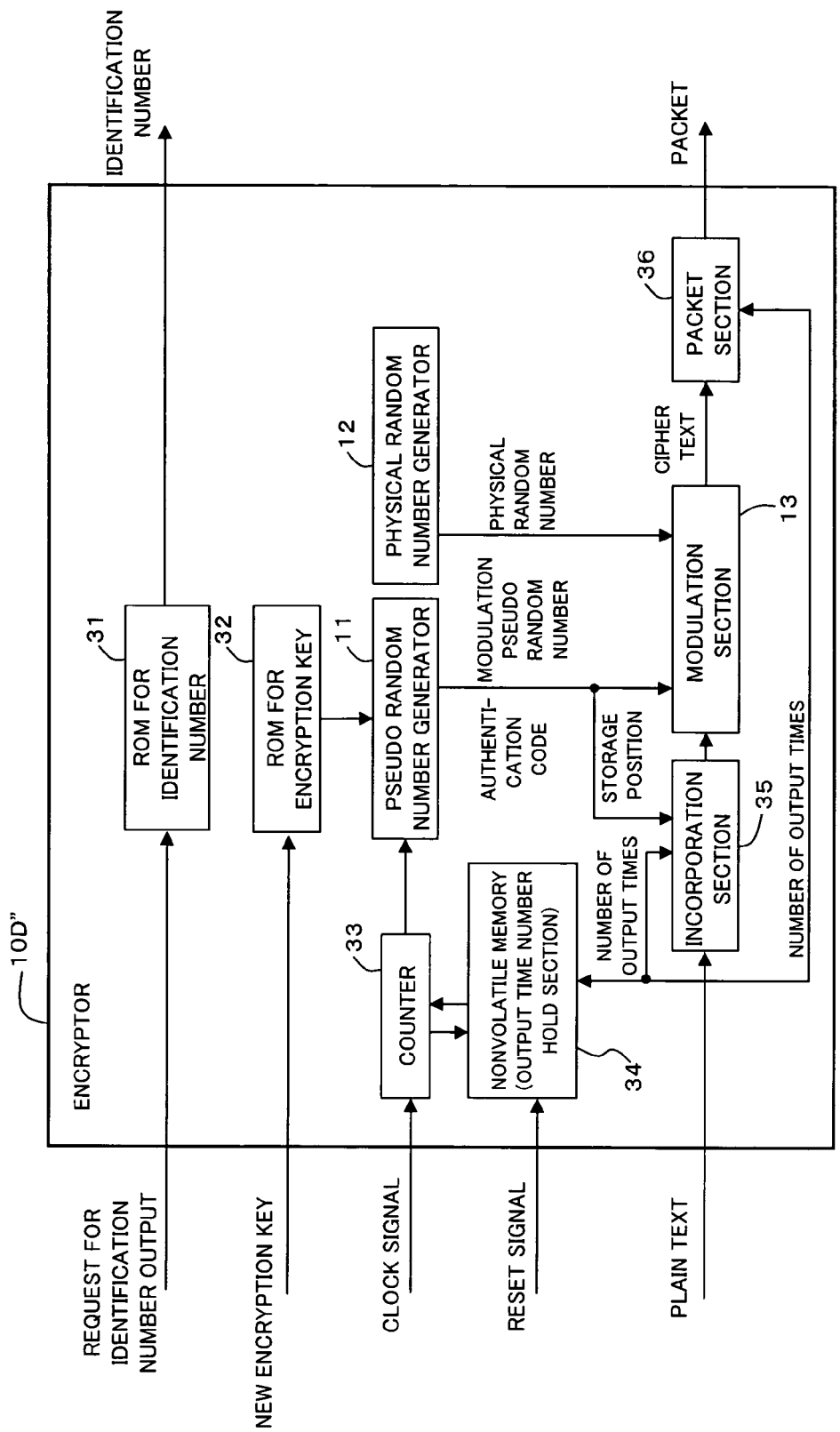
FIG. 35 is a block diagram showing a configuration of an encryptor as the eighth embodiment of the present invention.

Next, the configuration of the encryptor 10D" will be explained with reference to FIG. 35. FIG. 30 is a block diagram showing the configuration of the encryptor 10D" as the eighth embodiment of the present invention and in FIG. 35, the same symbols as the symbols already described denote the same or substantially the same portions. As shown in FIG. 35, the encryptor 10D" in the eighth embodiment has substantially the same configuration as that of the encryptor 10D' in the sixth embodiment shown in FIG. 30.

In the encryptor 10D" in the eighth embodiment also, however, like the seventh embodiment, the encryption key ROM 32 has a configuration with which the encryption key can be set again to the new encryption key in accordance with a direction from the transmission/reception section 52A and the counter 33 (nonvolatile memory 34) has a configuration with which the number of output times of pseudo random number $r_i$ can be reset to "0" in accordance with a reset signal from the transmission/reception section 52A. Further, the modulation pseudo random number generator 11 has a configuration with which the number of output times can be returned (can be reset) to 0 when the nonvolatile memory 34, that is, the counter 33 is reset by the reset signal.

By the way, although the channel coding section 14 (refer to FIG. 1, FIG. 11 and FIG. 14) is not shown schematically also in the encryptor 10D" shown in FIG. 35, the channel coding section 14 may be provided, like the first and second embodiments, or may not be provided. When the channel coding section 14 is provided, the channel coding section 14 may be arranged in the tamper-resistant region 60 or outside the tamper-resistant region 60. As an interface between the inside and the outside of the tamper-resistant region 60 as to the encryptor 10D" in the present embodiment, like the seventh embodiment, one corresponding to the above-mentioned items (21) to (25) is necessary and the interface relating to the number of output times of pseudo random number $r_i$ (one corresponding to the above-mentioned items (26) to (28)) is no longer necessary.

Figure 36:
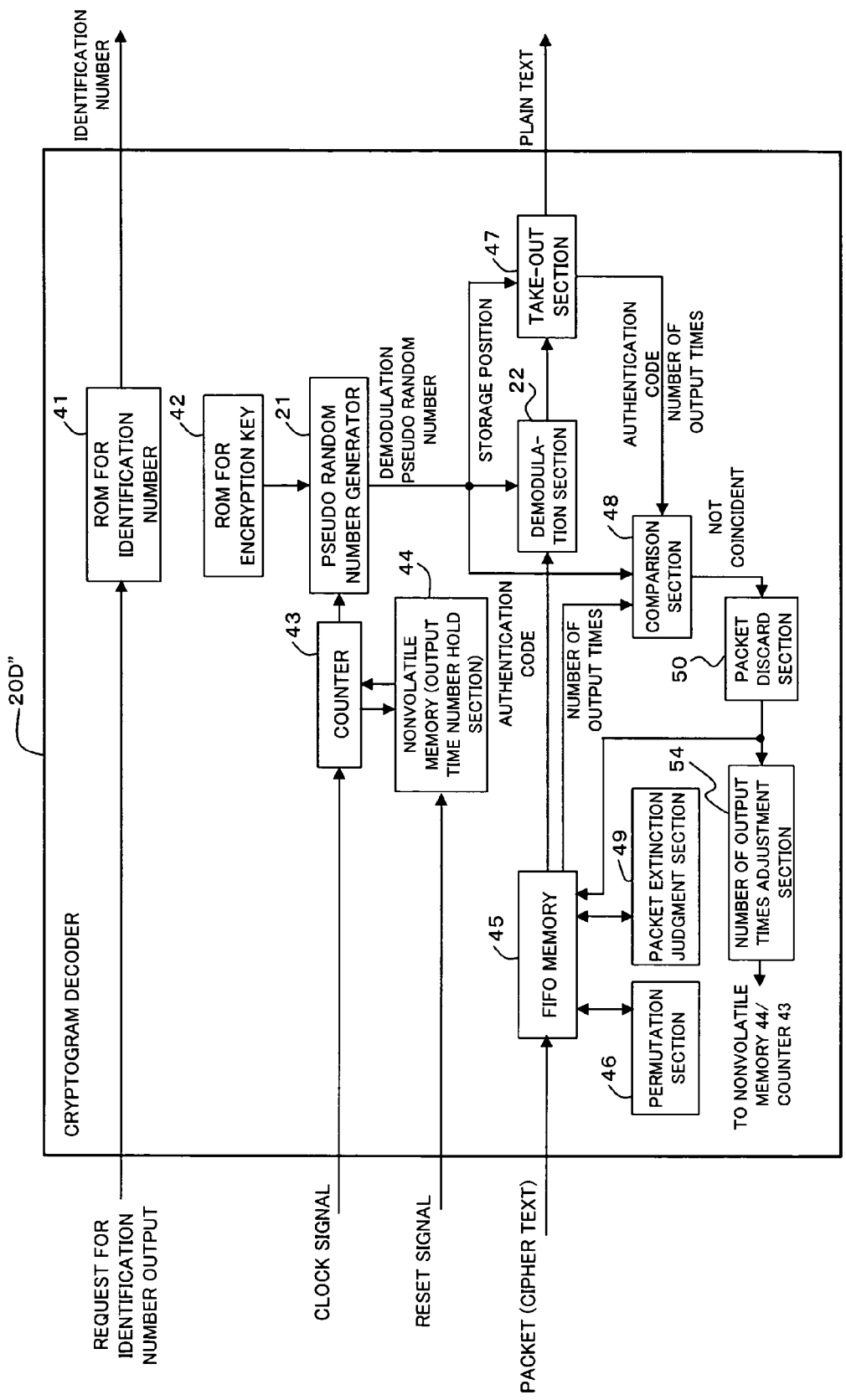
FIG. 36 is a block diagram showing a configuration of a cryptogram decoder as the eighth embodiment of the present invention.

Next, the configuration of the cryptogram decoder 20D" will be explained with reference to FIG. 36. FIG. 36 is a block diagram showing the configuration of the cryptogram decoder 20D" as the eighth embodiment of the present invention and in FIG. 36, the same symbols as the symbols already described denote the same or substantially the same portions. As shown in FIG. 36, the cryptogram decoder 20D" in the eighth embodiment has substantially the same configuration as that of the cryptogram decoder 20D' in the sixth embodiment shown in FIG. 31.

In the cryptogram decoder 20D" in the eighth embodiment also, however, like the seventh embodiment, the encryption key ROM 42 has a configuration with which the encryption key can be set again to the new encryption key in accordance with a direction from the transmission/reception section 52A and the counter 43 (nonvolatile memory 44) has a configuration with which the number of output times of pseudo random number $r_i$ can be reset to "0" in accordance with a reset signal from the transmission/reception section 52A. Further, the demodulation pseudo random number generator 21 has a configuration with which the number of output times can be returned (can be reset) to 0 when the nonvolatile memory 44, that is, the counter 43 is reset by the reset signal.

By the way, although the channel decoding section 23 (refer to FIG. 2, FIG. 12 and FIG. 15) is not shown schematically also in the cryptogram decoder 20D" shown in FIG. 36, the channel decoding section 23 is provided when the channel coding section 14 is provided on the encryptor 10C" side, like the first and second embodiments. When the channel decoding section 23 is provided, the channel decoding section 23 may be arranged in the tamper-resistant region 60 or outside the tamper-resistant region 60. As an interface between the inside and the outside of the tamper-resistant region 60 as to the cryptogram decoder 20D" in the present embodiment, like the seventh embodiment, one corresponding to the above-mentioned items (41) to (45) is necessary and the interface relating to the number of output times of pseudo random number $r_i$ (one corresponding to the above-mentioned items (46) to (48)) is no longer necessary.

By the way, in the eighth embodiment, the encryptor 10D" is configured similarly to the encryptor 10 shown in FIG. 1, however, it may also be configured so as to provide the same configuration as the encryptor 10A shown in FIG. 11 or the encryptor 10B shown in FIG. 14. Further, in the eighth embodiment, the cryptogram decoder 20D" is configured similarly to the encryptor 20 shown in FIG. 2, however, it may also be configured so as to provide the same configuration as the cryptogram decoder 20A shown in FIG. 12 or the cryptogram decoder 20B shown in FIG. 15.

According to the communication system 1A" (the encryptor 10D" and the cryptogram decoder 20D") thus configured as the eighth embodiment of the present invention, encryption communication to which the encryption technique in the present embodiment has been applied is mutually realized between the communication device 1a" and the communication device 1b" and the same function and effect as those in the first and second embodiments can be obtained and in addition, the same function and effect as those in the communication system 1A' (the encryptor 10D' and the cryptogram decoder 20D') in the sixth embodiment can also be obtained.

In each of the communication devices 1a" and 1b" in the communication system 1A" in the eighth embodiment, the encryptor 10D", the cryptogram decoder 20D", the nonvolatile memory 51, and the transmission/reception section 52A integrated into one are arranged in one of the tamper-resistant regions 60 that provide the structure in the above-mentioned items (51) to (61) on the chip and thus the tamper-resistant properties are secured and input/output between the tamper-resistant region 60 and its outside is limited to those shown in the above-mentioned items (21) to (28) and (41) to (48). Due to this, also in the communication system 1A" in the eighth embodiment, the same function and effect as those in the communication system 1" in the seventh embodiment can be obtained.

By the way, in the eighth embodiment, when there exit other means to confirm that the synchronization of pseudo random number is shifted or when confirmation that the synchronization of pseudo random number is shifted can be ignored, a modification is possible in which the same random number table held in the respective nonvolatile memories 51 and 51 in the respective communication devices 1a" and 1b" is not used as the encryption key for the Vernam cipher communication but as the new encryption key itself. In this modification, it is not necessary to perform the Vernam cipher communication, therefore, the transmission/reception section 52A can be omitted.

[15] MODIFICATION EXAMPLES

By the way, the present invention is not limited to the above-mentioned embodiments and a variety of modifications can be made without departing from the gist and scope of the present invention.

Figure 17:
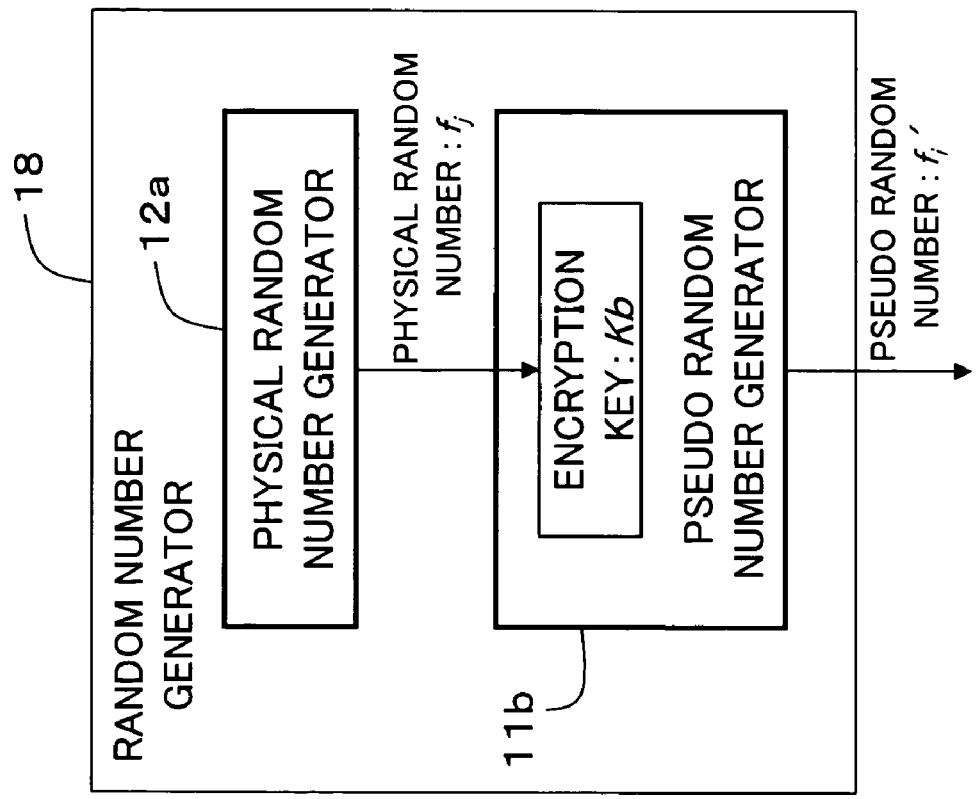
FIG. 17 is a block diagram showing a configuration of a pseudo random number generator used instead of a physical random number generator in the present embodiment.

For example, in the above-mentioned embodiments, the physical random number generator 12 is used, however, a pseudo random number generator or a random number generator 18 as shown in FIG. 17 may be used instead of the physical random number generator 12.

In the encryptors 10, 10A, 10B, 10C, 10D, 10C', 10D', 10C" and 10D", by using a pseudo random number generator (encryption key is fixed; not shown) different from the pseudo random number generators 11, 11', 11", 11a; 21, 21', 21" and 21a instead of the physical random number generator 12, it is no longer necessary to use an expensive physical random number generator and it is made possible to configure the encryptors 10, 10A, 10B, 10C, 10D, 10C', 10D', 10C" and 10D" at a low cost and in addition, an advantage that implementation is perfectly enabled only with software is obtained.

Further, the random number generator 18 shown in FIG. 17 is configured so as to provide a pseudo random number generator 11b different from the pseudo random number generators 11, 11', 11", 11a; 21, 21', 21" and 21a and a physical random number generator 12a. The pseudo random number generator (the second pseudo random number generation section, the modulation pseudo random number generation section) 11b generates and outputs a pseudo random number (a second pseudo random number) $f_i'$ instead of the above-mentioned physical random number $f_i$, and the physical random number generator (physical random number generation section) 12a generates the physical random number $f_i$, based on a physical phenomenon, like the above-mentioned physical random number generator 12. Then, the encryption key Kb of the pseudo random number generator 11b is configured so as to change periodically or non-periodically to a value determined by the physical random number $f_i$, generated by the physical random number generator 12a. At this time, the timing to change the encryption key Kb may be configured so as to be determined by the output value of the physical random number generator.

For the encryptor 10, it is necessary to generate one-bit physical random number $f_i$, for the one-bit plain text by the physical random number generator 12, therefore, a physical random number generator capable of high speed operation needs to be used, however, as the physical random number generator 12a in the random number generator 18, it is possible to use one with lower speed operation than that in the first embodiment. As described above, a physical random number generator capable of high speed operation is expensive, however, a physical random number generator with low speed operation is inexpensive, therefore, it is made possible to configure the encryptor of the present invention without sacrificing the safety (encryption strength) significantly when the pseudo random number generator 18 shown in FIG. 17 is used instead of the physical random number generator 12.

For example, when the encryptor of the present invention is realized by utilizing a personal computer etc., if a pseudo random number generator, which operates with data such as "the position on a screen pointed by a mouse pointer at a certain point of time" as an encryption key, is used instead of the physical random number generator 12, it is possible to realize an encryptor that secures substantially the same encryption strength (safety) as that when a physical random number generator is used without the need to mount an expensive physical random number generator.

On the other hand, by using the encryption/cryptogram decoding technique in the fourth embodiment of the present invention described above, it is made possible to provide a contents distribution service by a recording medium such as an optical disc, which has made clear the relationship between the number of reproduction times of the contents and the charge.

For example, when the contents distributor charges a user and provides the user with the contents recorded in an optical disc, the contents distributor uses, for example, the encryptor 10D as a contents recording device to an optical disc, on one hand, the user uses, for example, the cryptogram decoder 20D as an optical disc reproducing device (a player), on the other. By the way, at that time, the packets in the fourth embodiment are dealt with as those corresponding to the contents to be recorded in one optical disc.

To explain more specifically, the contents provider records the encrypted contents obtained by modulating the contents by the encryptor 10D in the encrypted region of an optical disc and at the same time, writes an identification number (a character string corresponding to the encryption key one-to-one, however, from which the encryption key cannot be predicted) and the number of output times of the pseudo random number (or information indicating what number optical disc) in the label on the optical disc surface or the non-encrypted region of the optical disc and provides the user with the optical disc.

At this time, as the identification number, for example, the identification number (ID number) held in the identification number ROM 31 is read and written into the above-mentioned non-encrypted region. Further, as the number of output times of pseudo random number, the number of output times (a numerical value indicating what order of number of the pseudo random number) of the modulation pseudo random number $r_i$ from the pseudo random number generator 11 used when modulating the first data $x_i$ of the contents to be provided by the modulation section 13 is read from the counter 33 (the nonvolatile memory 34) and written into the above-mentioned non-encrypted region. Into the encrypted region of the optical disc, in addition to the above-mentioned encrypted contents, the above-mentioned number of output times of pseudo random number is also embedded. It is preferable for the embedment position to be scrambled using the pseudo random number generated by the pseudo random number generator 11, like the fourth embodiment.

Then, upon receipt of the optical disc from the contents distributor, the user demodulates the contents of the optical disc by the cryptogram decoder 20D and reproduces them. When starting reproduction of the optical disc, the cryptogram decoder 20D reads the number of output times of pseudo random number written into the non-encrypted region and if there are some missing discs and when, for example, plural optical discs are reproduced in a predetermined sequence, if an attempt is made to reproduce without following the predetermined sequence but by skipping one or more optical discs, "warning" is issued to the user.

If the user exchanges the optical disc with a new one in accordance with the "warning", the cryptogram decoder 20D confirms the number of output times again and starts reproduction. Further, if the user refers to the "warning" and agrees to reproduce with one or more optical discs skipped, the cryptogram decoder 20D uses, for example, the function of the number of output times adjustment section 54 and adjusts the number of output times of the demodulation pseudo random number $r_i$ output to the demodulation section 22 from the pseudo random number generator 21 to the number of output times as to the optical disc to be reproduced next by setting the number of output times for the nonvolatile memory 44, or by performing dummy inputting of a clock signal for the pseudo random number generator 21. Due to this, it is made possible to correctly demodulate the encrypted contents in the next optical disc while maintaining the correspondence relationship between the modulation pseudo random number and the demodulation pseudo random number. However, the pseudo random number generator 21 of the cryptogram decoder 20D is configured so as to prohibit reset and repetition of the generation operation of the demodulation pseudo random number $r_i$, therefore, the encrypted contents of the skipped optical disc cannot be reproduce any longer.

At this time, as describe above, the pseudo random number generator 21 of the cryptogram decoder 20D is configured so as to prohibit reset and repetition of the generation operation of the demodulation pseudo random number $r_i$, therefore, if the user once reproduces the contents of the optical disc, the contents cannot be reproduced any longer again. Due to this, if the user desires reproduction of the contents two or more times, the user pays the fee corresponding to the number of reproduction times to the contents provider and by the number of reproduction times, the contents are modulated repeatedly and recorded in the optical disc as the encrypted contents. Therefore, it is made possible for the contents provider to make clear the relationship between the number of reproduction times of the contents and the charge and to charge the user in accordance with the number of reproduction times without fail.

By the way, the cryptogram decoder 20D may be configured so as to compare, when starting reproduction of an optical disc, the number of output times demodulated and taken out from the encrypted region and the number of output times written into the non-encrypted region and, if the numbers of output times do not coincide, regard that some tampering has been made to the contents of the optical disc and prohibit the reproduction of the optical disc in substantially the same manner like the fourth embodiment.

Further, if a reproduction device for converting the decoded digital signal into an analog image or voice signal is internally provided in the tamper-resistant region 60 of the cryptogram decoder 20D used as a contents reproducing device, the reproduced signal output from the tamper-resistant region 60 of the cryptogram decoder 20D can be converted into an analog signal, therefore, the duplication of the digital reproduction signal can be suppressed and therefore effective.

[16] Others

The functions (all of the functions or part of them) as the pseudo random number generator 11, the physical random number generator 12, the modulation sections 13 and 15, the channel coding section 14, the counter 33, the incorporation section 35 and the packet section 36 in the above-mentioned encryptors 10, 10A to 10D, 10C', 10D', 10C" and 10D", or the functions (all of the functions or part of them) as the channel decoding section 23, the pseudo random number generator 21, the demodulation sections 22 and 24, the counter 43, the permutation section 46, the take-out section 47, the comparison section 48, the packet extinction judgment section 49, the packet discard section 50 and the number of output times adjustment section 54 in the above-mentioned cryptogram decoders 20, 20A to 20D, 20C', 20D', 20C" and 20D", or the functions (all of the functions or part of them) as the transmission/reception section 52, 52A and the synchronization adjustment section 53 in the above-mentioned communication devices 1a and 1b can be realized by a computer (including a CPU, an information processing device, and various terminals) that executes a predetermined application program (encryption program/cryptogram decoding program).

The program is provided in a form recorded in a computer-readable recording medium such as a flexible disc, a CD (CD-ROM, CD-R, CD-RW, etc.), a DVD (DVD-ROM, DVD-RAM, DVD-R, DVD-RW, DVD+R, DVD+RW, etc.) etc. In this case, the computer reads the program from the recording medium, transfers it to an internal storage device or an external storage device, and stores it for use. Further, the program may be recorded in a storage device (a recording medium) such as a magnetic disc, an optical disc, an opto-magnetic disc and provided to a computer from the storage device via a communication line.

Here, a computer is a concept including hardware and an OS (operating system) and means hardware that operates under the control of the OS. Further, when hardware is operated with an application program alone without an OS, the hardware itself corresponds to a computer. Hardware is provided with at least a microprocessor such as CPU and a means to read a program recorded in a recording medium. An application program as the above-mentioned encryption program or the cryptogram decoding program includes program code for causing a computer to realize the functions (all of the functions or part of them) as the pseudo random number generator 11, the physical random number generator 12, the modulation sections 13 and 15, the channel coding section 14, the counter 33, the incorporation section 35, the packet section 36, the pseudo random number generator 21, the channel decoding section 23, the decoding sections 22 and 24, the counter 43, the permutation section 46, the take-out section 47, the comparison section 48, the packet extinction judgment section 49, the packet discard section 50, the transmission/reception section 52, 52A, the synchronization adjustment section 53 and the number of output times adjustment section 54. Alternatively, part of the functions may be realized not by an application program but by an OS.

Furthermore, as the recording medium in the present invention, in addition to the flexible disc, CD, DVD, magnetic disc, optical disc, or opto-magnetic disc, a variety of computer-readable media such as an IC card, ROM cartridge, magnetic tape, punch card, internal storage device (memory as RAM, ROM, etc.) of a computer, an external storage device, and a printing on which code such as bar code is printed may be used.

What is claimed is:

1. An encryption method comprising the steps of:
   modulating one-bit input data into a coded signal by associating said one-bit input data with a discrete value of at least two bits determined by a pseudo random number and a physical random number and for generating said discrete value as said coded signal based on a three-variable function for modulation; and
   channel-coding said coded signal and outputting said coded data channel-coded as encrypted data, wherein:
   the three-variable function, in which each combination includes a value of an input data selected as the one-bit input data from an input data stream, a value of the pseudo random number, and a value of the physical random number, and associated with one of plurality of discrete values serving as the coded signal, is previously determined by:
   1) said coded signal is operable to be demodulated into said input data by said pseudo random number irrespective of the physical random number;
   2) a number of cases where each of the plurality of discrete values is associated with a value of the input data being 1 is equal to a number of cases where each discrete value is associated with the value of the input data being 0; and 3) an equal number of different pseudo random numbers are associated with each pair of the value of the input data and discrete value.

2. An encryption method comprising the step a modulating one-bit input data into a coded signal by associating said one-bit input data with a discrete value determined by a pseudo random number and a physical random number and for generating said discrete value as said coded signal based on a three-variable function for modulation, wherein:

the three-variable function, in which each of combinations including a value of an input data selected as the one-bit input data from an input data stream, a value of the pseudo random number and a value of the physical random number is associated with one of a plurality of the discrete values serving as the coded signal, is previously determined such as:

1) said coded signal is operable to be demodulated into said input data by said pseudo random number irrespective of the physical random number;

2) the number of cases where each of the plurality of discrete values is associated with the value of the input data being 1 is equal to the number of cases where each said discrete value is associated with the value of the input data being 0; and 3) an equal number of different pseudo random number are associated with each pair of the value of the input data and discrete value, wherein:

said modulation step generates said coded signal premised that the number of states of said pseudo random number is 4, the number of states of said physical random number is 2, and the number of states of said discrete value is 4.

3. The encryption method according to claim 1, wherein a second pseudo random number generated based on an encryption key periodically or non-periodically changed to a value determined by a physical random number is used as said physical random number in said modulation step.

4. A cryptogram decoding method comprising:

a channel decoding step for channel-decoding encrypted data into a decoded signal, said encrypted data being obtained by channel-encoding an output, obtained by performing modulation to associate one-bit input data with a discrete value of at least two bits determined by a pseudo random number and a physical random number, into a desired coded word based on a three-variable function for modulation, wherein the three-variable function, in which each combination includes a value of an input data selected as the one-bit input data from an input data stream, a value of the pseudo random number, and a value of the physical random number, and associated with one of a plurality of discrete values serving as the coded signal, is previously determined by:

1) said coded signal is operable be demodulated into said input data by said pseudo random number irrespective of the physical random number;

2) a number of cases where each of the plurality of discrete values is associated with a value of the input data being 1 is equal to a number of cases where each discrete value is associated with the value of the input data being 0; and 3) an equal number of different pseudo random numbers are associated with each pair of the value of the input data and the discrete value; and a demodulation step for demodulating said decoded signal into said input data by the pseudo random number based on a same encryption key as an encryption key having generated said pseudo random number used in said modulation.

5. A cryptogram decoding method comprising a demodulation step for demodulating a coded signal, said coded signal being obtained by performing modulation to associate one-bit input data with a discrete value determined by a pseudo random number, and a physical random number, said modulation premising that:

the number of states of said pseudo random number is 4, the number of states of said physical random number is 2, and the number of states of said discrete value is 4; and said modulation based on a three-variable function for modulation, wherein the three-variable function, in which each combination includes a value of an input data selected as the one-bit input data from an input data stream, a value of the pseudo random number, and a value of the physical random number, and associated with one of a plurality of discrete values serving as the coded signal, said modulation previously determined by:

1) said coded signal is operable to be demodulated into said input data by said pseudo random number irrespective of the physical random number;

2) a number of cases where each of the plurality of discrete values is associated with a value of the input data being 1 is equal to a number of cases where each discrete value is associated with the value of the input data being 0; and 3) an equal number of different pseudo random numbers are associated with each pair of the value of the input data and discrete value, wherein said demodulation step demodulates said coded signal into said input data by the pseudo random number based on a same encryption key as an encryption key having generated said pseudo random number used in said modulation.

6. An encryptor comprising:

a pseudo random number generation section for generating a pseudo random number based on an encryption key;

a physical random number generation section for generating a physical random number based on a physical phenomenon;

a modulation section for generating a coded signal by performing modulation to associate one-bit input data with a discrete value of at least two bits determined by said pseudo random number generated by said pseudo random number generation section and said physical random number generated by said physical random number generation section based on a three-variable function for modulation ; and a channel coding section for channel-coding said coded signal generated by said modulation section into a desired coded word and outputting said coded signal channel-coded as encrypted data, wherein:

the three-variable function, in which each of combination includes a value of an input data selected as the one-bit input data from an input data stream, a value of the pseudo random number, and a value of the physical random number, and associated with one of plurality of discrete values serving as the coded signal, is previously determined such as:

1) said coded signal can be demodulated into said input data by said pseudo random number irrespective of the physical random number;

2) a number of cases where each of the plurality of discrete values is associated with a value of the input data being 1 is equal to a number of cases where each discrete value is associated with the value of the input data being 0; and
3) an equal number of different pseudo random numbers are associated with each pair of the value of the input data and discrete value.

7. An encryptor comprising:
a pseudo random number generation section for generating a pseudo random number based on an encryption key;
a physical random number generation section for generating a physical random number based on a physical phenomenon; and
a modulation section for generating a coded signal by performing modulation to associate one-bit input data with a discrete value determined by said pseudo random number generated by said pseudo random number generation section and said physical random number generated by said physical random number generation section based on a three-variable function for modulation, wherein:
said modulation section premises that the number of states of said pseudo random number is 4, the number of states of said physical random number is 2, and the number of states of said discrete value is 4; and
the three-variable function in which each of combination includes a value of an input data selected as the one-bit input data from an input data stream, a value of the pseudo random number and a value of the physical random number, and associated with one of plurality of discrete values serving as the coded signal, is previously determined such as:
1) said coded signal can be demodulated into said input data by said pseudo random number irrespective of the physical random number;
2) a number of cases where each of the plurality of discrete values is associated with a value of the input data being 1 is equal to a number of cases where each discrete value is associated with the value of the input data being 0; and
3) an equal number of different pseudo random numbers are associated with each pair of the value of the input data and discrete value.

8. An encryption method comprising a modulation step for modulating one-bit input data into a coded signal by associating said one-bit input data with a discrete value determined by a pseudo random number and a physical random number and for generating said discrete value as said coded signal based on a three-variable function for modulation,
wherein:
the three-variable function, in which each of combination includes a value of an input data selected as the one-bit input data from an input data stream, a value of the pseudo random number, and a value of the physical random number, and associated with one of plurality of discrete values serving as the coded signal, is previously determined such as:
1) said coded signal can be demodulated into said input data by said pseudo random number irrespective of the physical random number;
2) a number of cases where each of the plurality of discrete values is associated with a value of the input data being 1 is equal to a number of cases where each discrete value is associated with the value of the input data being 0; and
3) an equal number of different pseudo random numbers are associated with each pair of the value of the input data and discrete value.
wherein:
said modulation step generates said coded signal premised that the state of said pseudo random number is one of four states, that is, 0, 1, 2, and 3, the state of said physical random number is one of two states, that is, 0 and 1, and the state of said discrete value is one of four states, that is, 0, 1, 2, and 3,
wherein:
if it is premised that a serial number given to each one bit of said input data is i, a number assigned to a set pattern of input data, a pseudo random number, a physical random number, and a discrete number is k (k is an integer from 0 through 15), said input data is $X_{k,i}$, said pseudo random number is $r_{k,i}$, said physical random number is $f_{k,i}$, and said discrete value is $S_{k,i}$, and when k is any one of integers from 0 through 7, said input data $X_{k,i}=0$; when k is any one of integers from 8 through 15, said input data $x_{k,i}=1$; when k is any one of integers 0, 1, 8, and 9, said pseudo random number $r_{k,i}=0$; when k is any one of integers 2, 3, 10, and 11, said pseudo random number $r_{k,i}=1$; when k is any one of integers 4, 5, 12, and 13, said pseudo random number $r_{k,i}=2$; when k is any one of integers 6, 7, 14, and 15, said pseudo random number $r_{k,i}=3$; when k is an even number, said physical random number $f_{k,i}=0$; and when k is an odd number, said physical random number $f_{k,i}=1$, then a typical set $S_j=(s_{0,i}, s_{1,i}, s_{2,i}, s_{3,i}, s_{4,i}, s_{5,i}, s_{6,i}, s_{7,i}, s_{8,i}, s_{9,i}, s_{10,i}, s_{11,i}, s_{12,i}, s_{13,i}, s_{14,i}, s_{15,i})$ (j is an integer from 1 through 6) of said discrete value $s_{k,i}$ is
$S_1=(0,1,0,1,2,3,2,3,2,3,2,3,0,1,0,1)$
$S_2=(0,1,0,2,1,3,2,3,2,3,1,3,0,2,0,1)$
$S_3=(0,1,0,3,1,2,2,3,2,3,1,2,0,3,0,1)$
$S_4=(0,2,0,2,1,3,1,3,1,3,1,3,0,2,0,2)$
$S_5=(0,2,0,3,1,2,1,3,1,3,1,2,0,3,0,2)$
$S_6=(0,3,0,3,1,2,1,2,1,2,1,2,0,3,0,3)$, and
wherein:
said modulation step generates said coded signal using any one of said six kinds of the typical sets $S_1$ to $S_6$.

9. The encryption method according to claim 8, wherein:
two numerical values respectively given as any one of integers from 0 through 3 are defined as u and v, respectively, and a numerical value given as an integer not selected as said numerical value u or v among integers from 0 through 3 is defined as w; and
said modulation step generates said coded signal using a set $S'_j=(s'_{0,i}, s'_{1,i}, s'_{2,i}, s'_{3,i}, s'_{4,i}, s'_{5,i}, s'_{6,i}, s'_{7,i}, s'_{8,i}, s'_{9,i}, s'_{10,i}, s'_{11,i}, s'_{12,i}, s'_{13,i}, s'_{14,i}, s'_{15,i})$ obtained by performing the following replacement as to said discrete value $s_{k,i}$ of said six kinds of the typical set $S_j$
$s'_{2u,i}=s_{2v,i}$
$s'_{2u+1,i}=s_{2v+1,i}$
$s'_{2u+8,i}=s_{2v+8,i}$
$s'_{2u+9,i}=s_{2v+9,i}$
$s'_{2w,i}=s_{2w,i}$
$s'_{2w+1,i}=s_{2w+1,i}$
$s'_{2w+8,i}=s_{2w+8,i}$
$s'_{2w+9,i}=s_{2w+9,i}$.

10. The encryption method according to claim 9, wherein:
a numerical value given as an integer among integers from 0 through 7 is defined as m and a numerical value given as an integer not selected as said numerical value m among integers from 0 through 7 is defined as n; and
said modulation step generates said coded signal using a set $S''_j=(s''_{0,i}, s''_{1,i}, s''_{2,i}, s''_{3,i}, s''_{4,i}, s''_{5,i}, s''_{6,i}, s''_{7,i}, s''_{8,i}, s''_{9,i}, s''_{10,i}, s''_{11,i}, s''_{12,i}, s''_{13,i}, s''_{14,i}, s''_{15,i})$ obtained by performing the following replacement as to said discrete value $s'_{k,i}$ of said six kinds of the typical set $S'_j$
$s''_{2m+1,i}=s'_{2m,i}$
$s''_{2m,i}=s'_{2m+1,i}$
$s''_{2n,i}=s'_{2n,i}$
$s''_{2n+1,i}=s'_{2n+1,i}$.

11. The encryptor according to claim 6, wherein said pseudo random number generation section, said physical random number generation section, and said modulation section are arranged in a tamper-resistant region for suppressing the probability distribution variations by physical disturbance in the physical random number generated by said physical random number generation section as well as suppressing the leakage of said encryption key and said pseudo random number.

12. The encryptor according to claim 11, wherein said pseudo random number generation section is configured so as to prohibit reset and repetition of said pseudo random number generation operation.

13. The encryptor according to claim 12, comprising:
a nonvolatile first hold section for holding the number of input times of a clock signal for causing said pseudo random number generation section to perform said pseudo random number generation operation as said number of output times of pseudo random number and outputting said number of output times to the outside of said tamper-resistant region in response to a command from the outside of said tamper-resistant region; and
a synchronization adjustment section for adjusting said number of output times of pseudo random number from said pseudo random number generation section based on said number of output times read from said first hold section in order to synchronize said pseudo random number generation operation by said pseudo random number generation section with a demodulation pseudo random number generation operation by a demodulation pseudo random number generation section of a cryptogram decoder in a destination communication device of said coded signal.

14. The encryptor according to claim 13, comprising:
a nonvolatile second hold section for holding the same random number table as that of said destination communication device;
a cryptogram transmission section for encrypting said number of output times of pseudo random number read from said first hold section into encrypted synchronization information based on said random number table held in said second hold section and transmitting said encrypted synchronization information to said destination communication device; and
a decoding reception section for decoding the encrypted synchronization information received from said destination communication device into the number of output times of demodulation pseudo random number based on said random number table held in said second hold section,
wherein
said synchronization adjustment section, when said number of output times of demodulation pseudo random number on said destination communication device side decoded by said decoding reception section is greater than said number of output times of pseudo random number read from said first hold section, adjusts said number of output times of pseudo random number from said pseudo random number generation section to said-number of output times of demodulation pseudo random number on said destination communication device side.

15. A cryptogram decoder for demodulating a coded signal, said coded signal being obtained by performing modulation to associate one-bit input data with a discrete value determined by a pseudo random number and a physical random number, said modulation premising that:
the number of states of said pseudo random number is 4, the number of states of said physical random number is 2, and the number of states of said discrete value is 4; and
said modulation based on a three-variable function for modulation, wherein the three-variable function, in which each of combination includes a value of an input data selected as the one-bit input data from an input data stream, a value of the pseudo random number, and a value of the physical random number, and associated with one of plurality of discrete values serving as the coded signal, is previously determined by:
1) said coded signal can be demodulated into said input data by said pseudo random number irrespective of the physical random number;
2) a number of cases where each of the plurality of discrete values is associated with a value of the input data being 1 is equal to a number of cases where each discrete value is associated with the value of the plain text being 0; and
3) an equal number of different pseudo random numbers are associated with each pair of the value of the input data and discrete value,
into said input data: comprising:
a demodulation pseudo random number generation section for generating a demodulation pseudo random number based on a same encryption key as an encryption key having generated said pseudo random number used in said modulation; and
a demodulation section for demodulating said coded signal into said input data by said demodulation pseudo random number generated by said demodulation pseudo random number generation section.

16. The cryptogram decoder according to claim 15, wherein said demodulation pseudo random number generation section and said demodulation section are arranged in a tamper-resistant region for preventing leakage of said encryption key and said demodulation pseudo random number.

17. The cryptogram decoder according to claim 16, wherein said demodulation pseudo random number generation section is configured so as to prohibit reset and repetition of said demodulation pseudo random number generation operation.

18. The cryptogram decoder according to claim 17, comprising:
a nonvolatile first hold section for holding the number of input times of a clock signal for causing said demodulation pseudo random number generation section to perform said demodulation pseudo random number generation operation as said number of output times of demodulation pseudo random number and outputting said number of output times to the outside of said tamper-resistant region in response to a command from the outside of said tamper-resistant region; and
a synchronization adjustment section for adjusting said number of output times of demodulation pseudo random number from said demodulation pseudo random number generation section based on said number of output times read from said first hold section in order to synchronize said demodulation pseudo random number generation operation by said demodulation pseudo random number generation section with a pseudo random number generation operation by a pseudo random number generation section of an encryptor in a sender communication device of said coded signal.

19. The cryptogram decoder according to claim 18, comprising:

a nonvolatile second hold section for holding the same random number table as that of said sender communication device;

a cryptogram transmission section for encrypting said number of output times of demodulation pseudo random number read from said first hold section into encrypted synchronization information based on said random number table held in said second hold section and transmitting said encrypted synchronization information to said sender communication device; and a decoding reception section for decoding the encrypted synchronization information received from said sender communication device into the number of output times of pseudo random number based on said random number table held in said second hold section, wherein said synchronization adjustment section, when said number of output times of pseudo random number on said sender communication device side decoded by said decoding reception section is greater than said number of output times of demodulation pseudo random number read from said first hold section, adjusts said number of output times of demodulation pseudo random number from said demodulation pseudo random number generation section to said number of output times of pseudo random number on said sender communication device side.

20. A communication system comprising:

an encryptor configured so as to comprise a pseudo random number generation section for generating a random number based on an encryption key, a physical random number generation section for generating a physical random number based on a physical phenomenon, and a modulation section for generating a coded signal by performing modulation to associate one-bit input data with a discrete value of at least two bits determined by said pseudo random number generated by said pseudo random number generation section and said physical random number generated by said physical random number generation section based on a three-variable function for modulation, comprised in a sender communication device of said coded signal, and transmitting said coded signal to a destination communication device as a plurality of packets; and a cryptogram decoder configured so as to comprise a demodulation pseudo random number generation section for generating a demodulation pseudo random number based on a same encryption key having generated said pseudo random number used in said modulation and a demodulation section for demodulating said coded signal into input data by said demodulation pseudo random number generated by said demodulation pseudo random number generation section, comprised in said destination communication device of said coded signal, and demodulating said coded signal in each packet received from said encryptor of said sender communication device into said input data, wherein:

the three-variable function, in which each of combinations including a value of an input data selected as the one-bit input data from a plain text stream, a value of the pseudo random number, and a value of the physical random number ,and associated with one of a plurality of the discrete values serving as the coded signal, is previously determined by:

1) said coded signal is operable to be demodulated into said input data by said pseudo random number irrespective of the physical random number;

2) a number of cases where each of the plurality of discrete values is associated with a value of the input data being 1 is equal to a number of cases where each discrete value is associated with the value of the input data being 0; and 3) an equal number of different pseudo random numbers are associated with each pair of the value of the input data and discrete value, wherein a serial number about said plurality of packets or said number of output times of pseudo random number used in said modulation of said coded signal in the container section of each packet is described in the header section of each packet to be transmitted from said encryptor to said cryptogram decoder; and wherein said cryptogram decoder comprises:

a packet hold section for holding said plurality of packets from said encryptor; and a permutation section for permutating said plurality of packets held in said packet hold section into an order in accordance with said serial number or said number of output times described in the header section of each packet and inputting it to said demodulation section.

21. The communication system according to claim 20, wherein:

in said coded signal in the container section of each packet to be transmitted from said encryptor to said cryptogram decoder, said serial number or said number of output times is included; and said cryptogram decoder comprises:

a first comparison section for comparing said serial number or said number of output times described in the header section of each packet with said serial number or said number of output times included in the demodulation result of said coded signal by said demodulation section; and a packet discard section for discarding the packet when the result of comparison by said first comparison section is that said serial numbers or said numbers of output times do not coincide.

22. The communication system according to claim 20, wherein:

in said coded signal in the container section of each packet to be transmitted from said encryptor to said cryptogram decoder, a pseudo random number sequence generated by said pseudo random number generation section is included as an intrinsic authentication code about said packet; and said cryptogram decoder comprises:

a second comparison section for comparing said authentication code included in the demodulation result of said coded signal by said demodulation section with a demodulation pseudo random number sequence corresponding to said authentication code generated by said demodulation pseudo random number generation section; and a packet discard section for discarding the packet when the result of comparison by said second comparison section is that said authentication codes do not coincide.

23. The communication system according to claim 21, wherein said cryptogram decoder comprises:

a packet extinction judgment section for judging, after receiving one of said plurality of packets and when a packet to be received in accordance with said serial number or said number of output times is not received within a predetermined time, that the packet has become extinct; and a number of output times adjustment section for adjusting, if said packet discard section has discarded the packet or if said packet extinction judgment section has judged that the packet has become extinct, said number of output times of demodulation pseudo random number from said demodulation pseudo random number generation section to a number of output times in accordance with said serial number or said number of output times of a packet normally received after the discarded packet or the packet judged to have become extinct.

24. The communication system according to claim 21, wherein:

said encryptor comprises an incorporation section for determining a storage position in said container section of each packet of said serial number or said number of output times included in each of said packets based on said pseudo random number generated by said pseudo random number generation section and incorporating said serial number or said number of output times into said input data so that said serial number or said number of output times is arranged in said determined storage position; and said cryptogram decoder comprises a take-out section for taking out said serial number or said number of output times from the demodulation result by said demodulation section based on said demodulation pseudo random number generated by said demodulation pseudo random number generation section.

* * * * *